United States Patent
Faris et al.

(10) Patent No.: US 10,901,765 B2
(45) Date of Patent: Jan. 26, 2021

(54) SYSTEMS AND METHODS OF SOCIALLY-DRIVEN PRODUCT OFFERINGS

(71) Applicant: NIKE, Inc., Beaverton, OR (US)

(72) Inventors: Ron Faris, New York, NY (US); Aaron Uhrmacher, New York, NY (US); Robert Reed, Hammonton, NJ (US); Jonathan Apostoles, Somerset, NJ (US)

(73) Assignee: NIKE, Inc., Beaverton, OR (US)

( * ) Notice: Subject to any disclaimer, the term of this patent is extended or adjusted under 35 U.S.C. 154(b) by 402 days.

(21) Appl. No.: 14/603,124

(22) Filed: Jan. 22, 2015

(65) Prior Publication Data
US 2015/0205894 A1    Jul. 23, 2015

Related U.S. Application Data

(60) Provisional application No. 61/930,367, filed on Jan. 22, 2014.

(51) Int. Cl.
*G06F 9/455* (2018.01)
*G06Q 30/02* (2012.01)

(52) U.S. Cl.
CPC ......... *G06F 9/455* (2013.01); *G06Q 30/0207* (2013.01)

(58) Field of Classification Search
CPC ......... G06F 17/50; G06F 9/455; G07C 11/00; G06Q 30/0207
USPC ........................................................ 703/21
See application file for complete search history.

(56) References Cited

U.S. PATENT DOCUMENTS

| | | | |
|---|---|---|---|
| 6,769,010 B1 * | 7/2004 | Knapp | G06F 17/30867 707/E17.109 |
| 7,729,951 B2 * | 6/2010 | Dawson | G06Q 30/02 705/27.2 |
| 8,095,400 B2 * | 1/2012 | Herde | G06Q 10/02 705/5 |
| 8,334,871 B2 * | 12/2012 | Hamilton, II | G06F 3/04815 345/473 |
| 8,510,163 B2 | 8/2013 | Hess et al. | |
| 8,777,732 B2 * | 7/2014 | Robbins | G07F 17/3225 463/1 |

(Continued)

FOREIGN PATENT DOCUMENTS

WO    2007098105 A2    8/2007

OTHER PUBLICATIONS

Notification of Transmittal of the International Search Report and the Written Opinion of the International Search Authority from corresponding application PCT/US2015/012489 dated May 1, 2015.

(Continued)

*Primary Examiner* — Justin C Mikowski
(74) *Attorney, Agent, or Firm* — Banner & Witcoff, Ltd.

(57) ABSTRACT

According to one aspect, a system comprising a memory, at least one processor coupled to the memory, and a virtual line simulator executable by the at least one processor is provided. The virtual line simulated may be configured to receive information identifying at least one virtual line, add, in response to receiving the information, an identifier of a user to a position in the at least one virtual line, receive data indicating that the user completed at least one activity, and reposition, in response to receiving the data, the user to a new position in the at least one virtual line.

20 Claims, 89 Drawing Sheets

(56) References Cited

U.S. PATENT DOCUMENTS

| | | | |
|---|---|---|---|
| 8,777,742 B2* | 7/2014 | Sato | A63F 13/428 |
| | | | 463/32 |
| 2007/0244731 A1 | 10/2007 | Barhydt et al. | |
| 2009/0287587 A1 | 11/2009 | Bloebaum et al. | |
| 2011/0307547 A1* | 12/2011 | Backer | G06Q 10/02 |
| | | | 709/203 |
| 2012/0157177 A1 | 6/2012 | Hughes et al. | |
| 2012/0158934 A1 | 6/2012 | Xiao et al. | |
| 2012/0214515 A1 | 8/2012 | Davis et al. | |
| 2013/0024216 A1* | 1/2013 | Fink | G06Q 30/06 |
| | | | 705/5 |
| 2013/0332208 A1* | 12/2013 | Mehta | G06Q 10/02 |
| | | | 705/5 |
| 2013/0332274 A1 | 12/2013 | Faith et al. | |
| 2014/0025535 A1* | 1/2014 | Douglas | G06Q 30/0633 |
| | | | 705/26.8 |
| 2014/0207509 A1* | 7/2014 | Yu | G06Q 10/1095 |
| | | | 705/7.19 |
| 2014/0316878 A1* | 10/2014 | McLaughlin | G06Q 30/0261 |
| | | | 705/14.35 |
| 2014/0363059 A1* | 12/2014 | Hurewitz | G06Q 30/0201 |
| | | | 382/118 |

OTHER PUBLICATIONS

Jun. 21, 2017—(EP) ESR—App. No. 15741015.0.

* cited by examiner

800

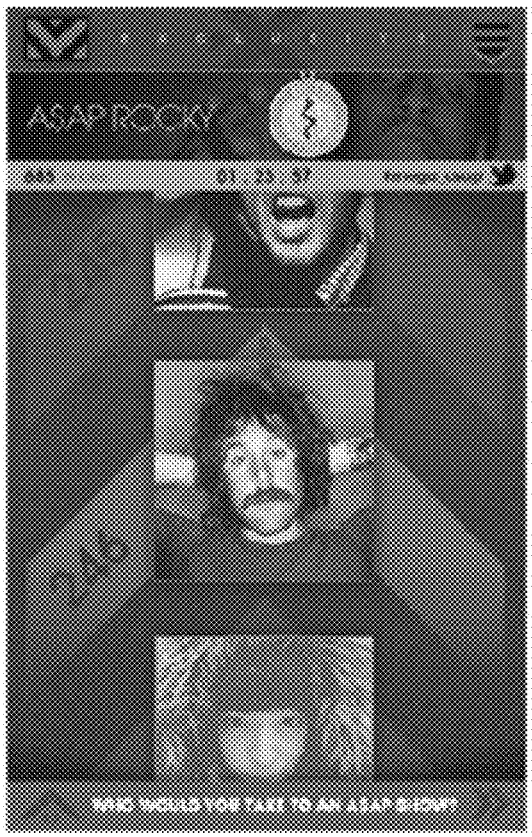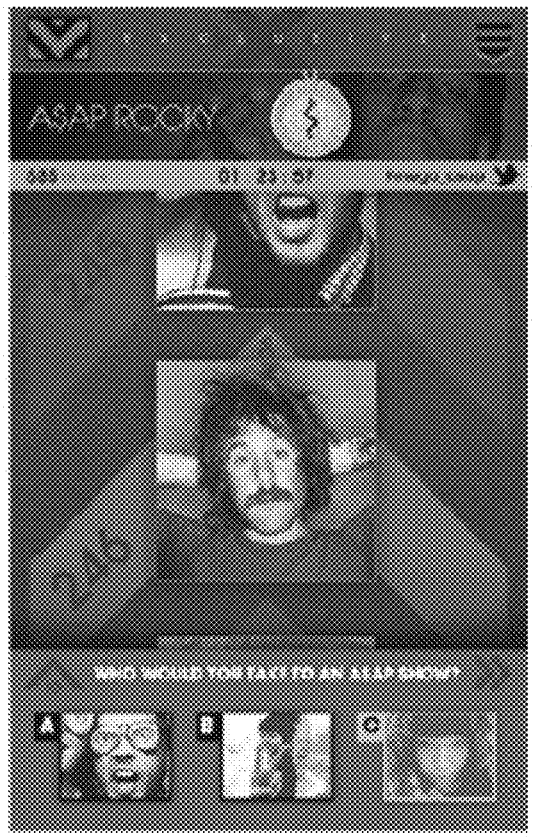
FIG. 27

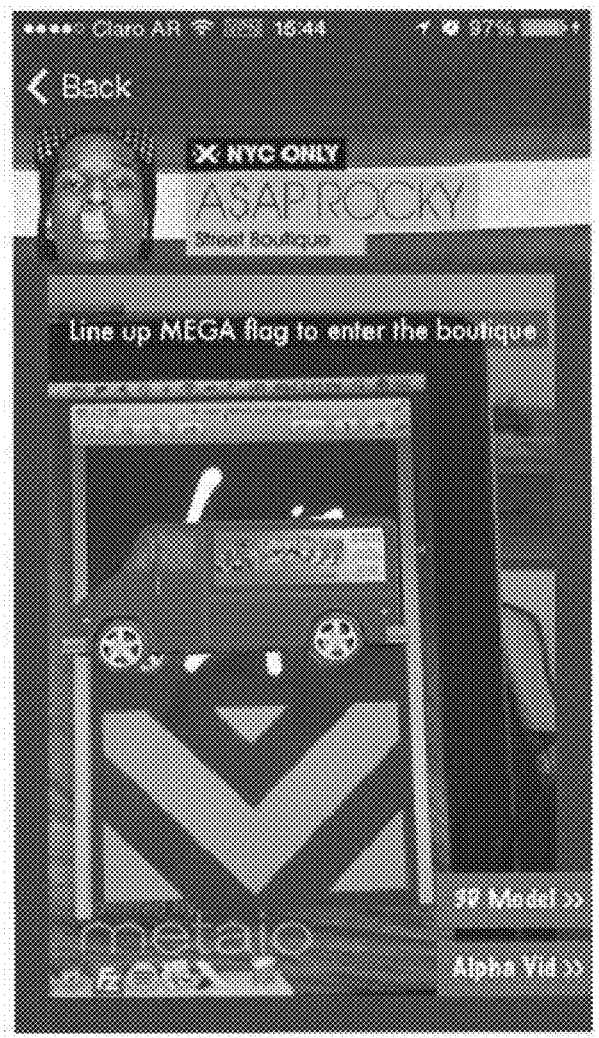 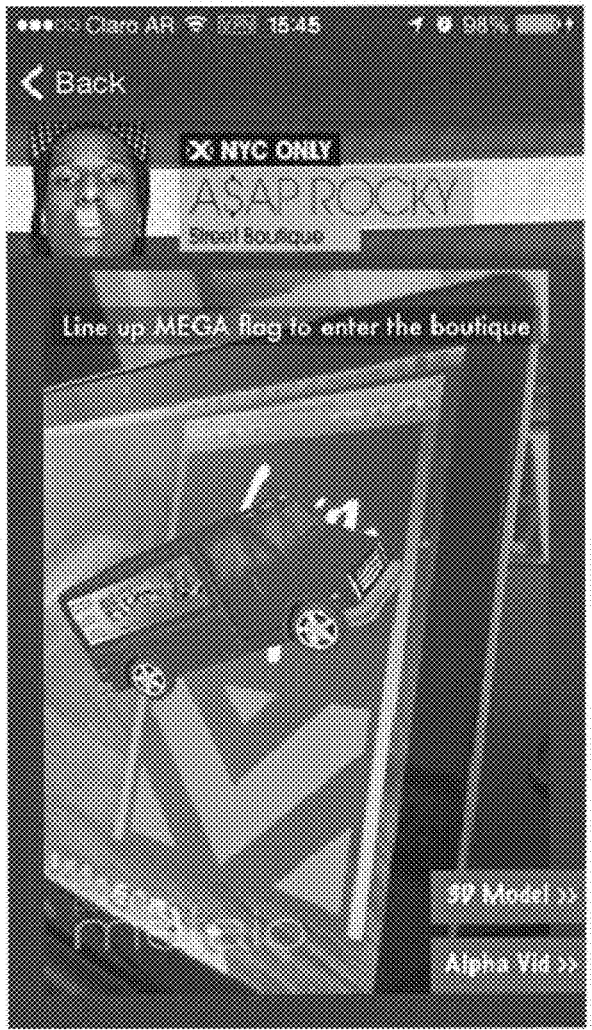
FIG. 62AFIG. 62B

SYSTEMS AND METHODS OF SOCIALLY-DRIVEN PRODUCT OFFERINGS

RELATED APPLICATIONS

This application claims priority under 35 U.S.C. 119(e) to U.S. Provisional Patent Application Ser. No. 61/930,367 titled "SYSTEMS AND METHODS OF SOCIALLY-DRIVEN PRODUCT OFFERINGS," filed on Jan. 22, 2014, which is hereby incorporated herein by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Technical Field

The technical field of the embodiments disclosed herein generally relates to improved reward systems and methods of offering products and promotions to users.

Background

Currently, limited run products and tickets tend to be bought and resold very quickly after being released to the public. Websites quickly run out of bandwidth from an excess number of users attempting to buy a product at the moment of release, causing many users who want the product but do not have the time to get it at release to resort to spend more money buying the item from a reseller.

SUMMARY

Some aspects and embodiments disclosed herein include a system for presenting product offerings to a user based on a user's social interactions, physical location, and attentiveness. In some embodiments, the system includes an application or "app" with a virtual line manager executed by a smart-phone or other mobile computing device (e.g., a tablet, a laptop, etc). In this embodiment, the application may be configured to display product promotions and perform user registration for special time-sensitive promotions. In other embodiments, the system may be controlled by "Admins" who have special privileges over normal users. These privileges include the ability to manage lines (e.g., create a new line, remove users from a line, etc.).

According to one aspect, a system comprising a memory, at least one processor coupled to the memory, and a virtual line simulator executable by the at least one processor is provided. The virtual line simulated may be configured to receive information identifying at least one to virtual line, add, in response to receiving the information, an identifier of a user to a position in the at least one virtual line, receive data indicating that the user completed at least one activity, and reposition, in response to receiving the data, the user to a new position in the at least one virtual line.

According to one embodiment, the virtual line simulator is further configured to add the identifier of the user to the position in the at least one virtual line in response to determining that the user is within a range of a geographic location. According to another embodiment, the virtual line simulator is further configured to receive an image of a physical identifier within a physical context and display virtual content within an image of the physical context.

According to another embodiment, the virtual line simulator is further configured to offer a reward to users in a top predetermined percentage of the at least one virtual line, the offer having a duration limited to a predetermined period of time. According to another embodiment, the virtual line simulator is further configured to rescind the offer when the offer is not redeemed within the predetermined period of time. According to another embodiment, the virtual line simulator is further configured to receive a swipe on a user's avatar and display a user's spot number in the virtual line responsive to receiving the swipe.

According to another embodiment, the virtual line simulator is further configured to receive data indicating that the user has found a hidden spot and offer a reward to the user. According to another embodiment, the virtual line simulator is further configured to receive at least one interaction from the user addressed to at least one other user within the virtual line and forward the at least one interaction to a device associated with the at least one other user.

According to another embodiment, the virtual line simulator is further configured to add the identifier of the user to the position of the at least one virtual line in response to receiving data indicating that the user completed at least one other activity. According to another embodiment, the identifier of the user is received from at least one of Facebook, Twitter, Google+, and an email. According to another embodiment, the virtual line simulator is further configured to associate a reward with the identifier of the user in response to the data indicating that the user completed the at least one activity.

According to one aspect, a method is provided. The method may include acts of receiving information identifying at least one virtual line, adding, in response to receiving the information, an identifier of a user to a position in the at least one virtual line, receiving data indicating that the user completed at least one activity, and reposition, in response to receiving the data, the user to a new position in the at least one virtual line.

According to one example, the method further includes acts of determining that the user is within a range of an event of geo-targeted product, receiving an image of a visual identifier, and displaying virtual content in the physical space of the virtual identifier. According to another example, the method further includes acts of offering, for a predetermined period of time, a reward to users in a top predetermined percentage of the virtual line and rescinding the offer when the offer is not redeemed within the predetermined period of time.

According to another example, the method further includes an act of allowing the user to interact with other users from different parts of the line while staying in the position. According to another example, the method further includes an act of adding at least one identifier of at least one user to a waitlist in response to the at least one virtual line being full. According to another example, the identifier of the user is received from at least one of Facebook, Twitter, Google+, and an email account. According to another example, the method further includes an act of associating a reward with the identifier of the user in response to the data indicating that the user completed the at least one activity.

According to one aspect, a non-transitory computer readable medium having stored thereon sequences of instruction is provided. According to one embodiment, the sequences of instruction including executable instructions that instruct at least one processor to receive information identifying at least one virtual line, add, in response to receiving the information, an identifier of a user to a position in the at least one virtual line, receive data indicating that the user competed at least one activity, and reposition, in response to receiving the data, the user to a new position in the at least one virtual line.

According to another embodiment, the computer readable medium further includes instructions that instruct the at least one processor to determine that the user is within a range of an event of geo-targeted product, receive an image of a visual identifier, and display virtual content in the physical space of the virtual identifier. According to another embodiment, the computer readable medium further includes instructions that instruct the at least one processor to offer, for a predetermined period of time, a reward to users in a top predetermined percentage of the virtual line and rescind the offer if the offer is not redeemed within the predetermined period of time.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework to for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment. It is to be appreciated that the user interface designs illustrated in the FIGS. comprise a plurality of component designs in which one or more solid lines or colors of the illustrated user interface design are omitted.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 27 is one example of a user interface for a mobile application in a mission mode;

FIGS. 62A-62B is one example of a plurality of user interfaces illustrating an augmented reality view;

DETAILED DESCRIPTION

Figure 1:
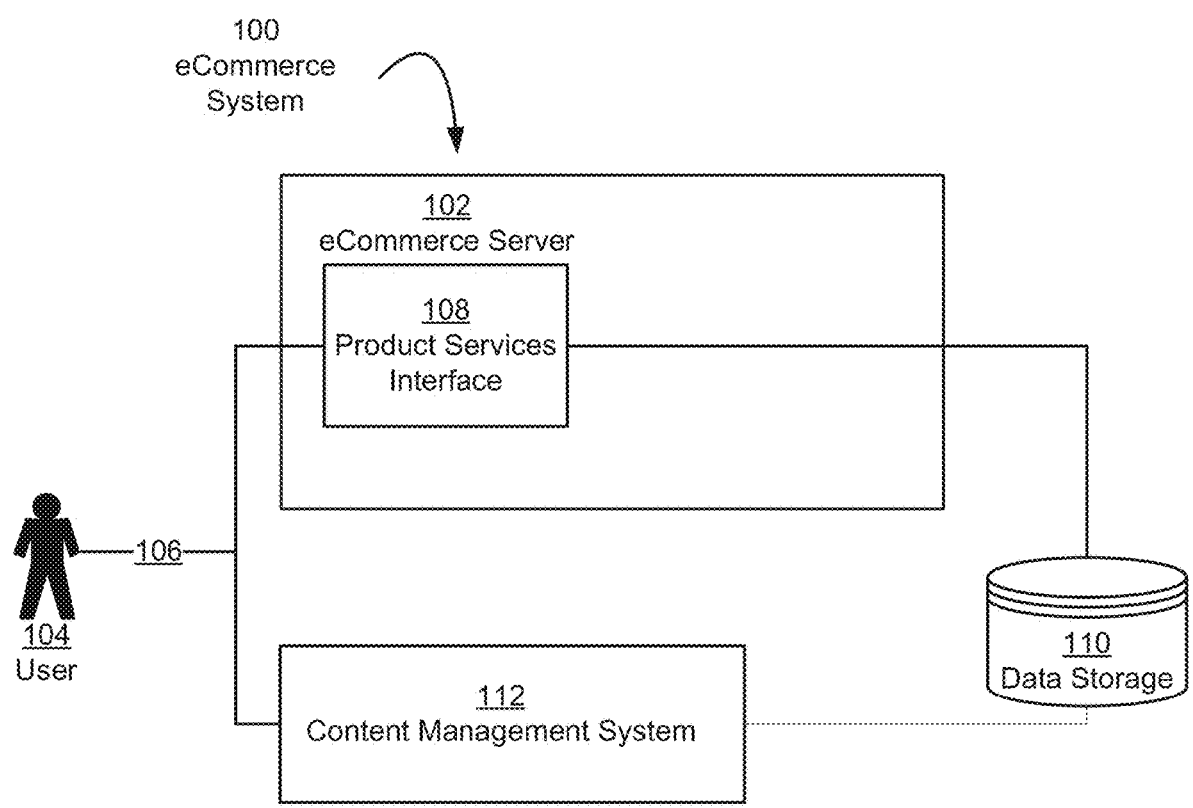
FIG. 1 is a context diagram of an eCommerce system.

Various embodiments disclosed herein provide for a system that presents a shopping experience augmented by a user's social interactions, peer users, physical location, and attentiveness during time-sensitive promotional offers. For instance, at least one embodiment includes a system configured to present special products only available for purchase by a subset of users who successfully vie for the right to purchase the special product. These special products may be of limited quantity (e.g., a limited-run, exclusive, or one of a kind product or experience) and may be referred to herein as a "hero product." A hero product may be associated with a "bodega," also known as a basket of goods. A bodega may be a store with multiple products for sale. Currently, when a limited-run product or event ticket is released, users, including resellers, refresh a webpage at the time of release and purchase multiple tickets. There is a surplus of resellers who buy a limited run product with the sole intention of reselling it. In the case of concert tickets, resellers buy a maximum amount of tickets to resell on popular reselling websites. A website may not allow an excessive number of users to log on at one time, and as a result may block out some users. Users who want to buy tickets for themselves end up unable to because they cannot access a website (e.g., due to a bandwidth capacity that is exceeded) and once they are able to access the website, the product may be sold out. Some websites produce queues for buyers, but those queues have users wait on a loading page for hours and may subsequently display a sold out message or a timeout due to too many users trying to access the website. One embodiment disclosed herein solves the problem of overloading the bandwidth of a limited quantity product website by limiting a number of users into a virtual line. For example, if 100 limited quantity products are available, 400 users may be allowed to enter a virtual line. Additional users may be added to a secondary line or waitlist that joins the virtual line as users leave the virtual line. This way, the bandwidth used to create a line and sell a limited run product is minimized.

When users are waiting on a line for a product (e.g., tickets to a concert, or a limited-run product), they often post status updates or pictures while waiting in the line. In a way, users waiting in line advertise a product by posting about the line on various social networks. Other users may view the status updates and go on to join subsequent lines for products. Using a virtual line may help increase overall purchase intent across the hero product relating to the as well as other hero products with other virtual lines.

Additionally, users may complete missions to join a line or to move up in a line. A mission may act as a human verification such that when a user interacts with a mission that user may be identified as a human. If a bot is submitted into a virtual line to purchase hero products and spam the virtual line, that bot may not successfully complete missions. A mission may comprise trivia questions, votes, invitations for other users to join a virtual line, or questions about other users in a virtual line. When a user selects another user in a virtual line, both the user and the other user may receive jumps in the line. The selected user may receive a notification that the user has received a jump. Each time a user interacts with a mission, there may be an opportunity to draw one or more other users to interact with the engaged user to gain jumps. In some embodiments, a user may challenge another user in a line to a time-sensitive trivia quiz. Whichever user answers the trivia quiz correctly first may receive jumps.

In some examples, users may also message, tweet, or chat with other users in the line. Also, users may give "props" other users to thank the other users for helping them in a mission. Props may be used as currency in a virtual line and may be redeemed for more jumps.

In one embodiment, the system registers users on a first-come, first-serve basis for an opportunity to purchase hero products, and orders a virtual line of users in a sequence based on the order in which registration to the line occurred. In this embodiment, users may advance their position within the virtual line based on recorded social interactions and activities. For instance, activities may include purchasing standard products (e.g., non-hero products, t-shirts, content, hats), submitting data (e.g., zip code, credit card info), and completing missions. In addition, some embodiments allow the user to "gift" their position in the line to other users. In at least one embodiment, the system determines eligibility to purchase hero products based on a user's position within a line. After a period of time, the time-sensitive promotion elapses. Responsive to the elapsed promotion, the system presents to those users who have reached "top" spots in the line the opportunity to purchase the hero product.

In one embodiment, a user may be removed from a virtual line based on inattention. For instance, a user who has not viewed a virtual line within a period of time (e.g., twice per a promotional period), may be removed from the virtual line or demoted to a lower position in the virtual line.

In one embodiment, content can be a line-exclusive music download or special information about the focus entity that is generally unavailable.

In other embodiments, the system is configured to leverage image recognition to present an augmented reality "pop-up" store in physical environments. In these embodiments, a mobile computing device with an integrated camera may be configured to detect one or more fiducials, and present a 2D or 3D representation of select products for sale near the fiducial on to the display of the mobile computing device. The system may be configured to receive information from the mobile computing device and determine which products will be displayed to the user based on the user's social graph (described below), GPS coordinates, and time of to day.

One or more social media profiles of a user may be analyzed to determine a user's social graph. In one embodiment, a social graph may be used to refine a selection of products that may be offered to a user based on, for example, a user's location (e.g., current geographical location, hometown, etc), recent music interests (e.g., on Pandora, Spotify, etc), interests, "liked" content, gender, age, shared links, relationship status, and similar activity of their friends based on, in part, what lines their friends have joined and what hero products their friends purchased. According to some aspects, a user may filter a virtual line based on Facebook friends or persons of interest. For example, if a user engages with five people on a previous virtual line, the application may receive input to filter the users on the line to users that a user has engaged with. In this example, a subset of the line may be displayed to show which familiar users are on a virtual line.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

In addition, some embodiments provide for the following:

an ability to visualize users in a virtual line (e.g., by profile picture, Twitter handle, etc.), all waiting for a hero product to go on sale;

an ability to allow users to move up spaces in the line based on certain social, peer-to-peer, or gameplay-based activities they perform to get closer to being able to purchase that product;

an ability to provide a unique hero product identifier (e.g., Twitter hash tag) for each line so that the users in one line can communicate with one another via a messaging service (e.g., Twitter);

an ability to hide Easter eggs (e.g., products, content, or promotions, within spots of the line occupied by user profiles and allow other users to unlock them (achieved via the eCommerce server, described below in the sections discussing Easter eggs), thereby giving the user who finds the Easter egg and the user who is registered to the user profile the benefit of the unlocked Easter egg;

an ability for users to give discounts and product sales to other users, as opposed to the traditional model where the company offers the discount;

an ability to create trivia with choices comprising other user's profile pictures and to reward both the user who answered the question, and the user in the profile picture with identical rewards (e.g., "jumps," 10% off, free shipping);

an ability to allow users to discover new trends by serving new exclusive or non-exclusive products in the line (herein referred to as "satellite products");

an ability to allow users to discover new trends by serving new exclusive or non-exclusive content in the line (herein referred to as "satellite content"); and an ability to view the profile of other users in line and browse data elements such as: hometown, preferred music genre, favorite bands, last 3 tweets to the line, cumulative Jump score (e.g., "Jump IQ", calculated as the total number of jumps achieved), the percentage of times the user is picked by other users to help in missions (e.g., "Hype" score, calculated by how many times a user is chosen to help in missions).

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

eCommerce System

Some embodiments disclosed herein implement an eCommerce system using one or more computer systems, such as the computer systems described below with reference to FIG. 28. According to these embodiments, the eCommerce system manages a plurality of hero products, satellite products, satellite content, their associated unlock requirements (e.g., how they are unlocked), and the duration the unlock requirements are operated before ending promotions. FIG. 1 illustrates one example of an eCommerce system 100. As shown, FIG. 1 includes an eCommerce server 102, a user 104, and a network 106, a data storage, and a content management system (CMS) 112. The eCommerce server 102 includes a product services interface 108. The eCommerce server 102 and the CMS 112 may connect to a data storage In one embodiment, a user may access the eCommerce system 100 using the network 106 (e.g., via a smart phone or other computer system associated with the user 104 and executing an application or web-based interface). Examples of the eCommerce system 100 may include a variety of hardware and software components configured to perform the functions described herein and examples are not limited to a particular hardware component, software component, or particular combination thereof.

According to various embodiments, the data storage includes user profiles, multi-media content, and product data. In one embodiment, product data includes hero product data. In this embodiment, hero product data may include product characteristics (e.g., product name, product size, product color, etc), product images, and product videos. The product images and product videos may be used to visually represent apparel, merchandise, and unique one-time experiences (e.g., back-stage passes) offered by bands, celebrities and other entities having a fan base for sale to a user. In other embodiments, a hero product may be any product or service which is offered to a limited subset of users. In still other embodiments, the product data may additionally include non-hero product data for products that are not limited to a small subset of users. The product data may also include satellite product data, relating to product characteristics, product images, product videos, and other information relating to satellite products.

Figure 19A:
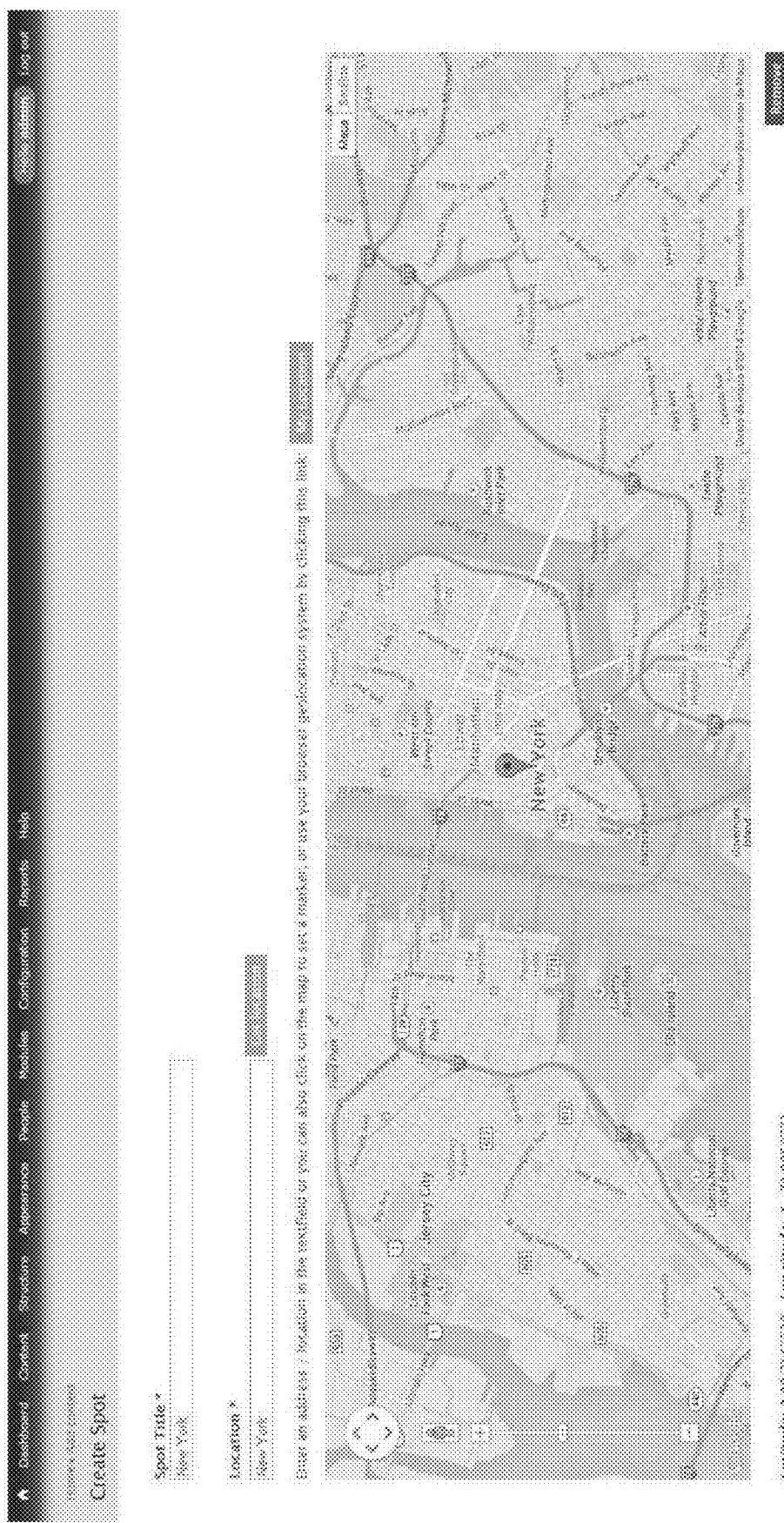
FIGS. 19A-19B are example user interfaces for administration of the CMS architecture of FIG. 18.
Figure 19B:
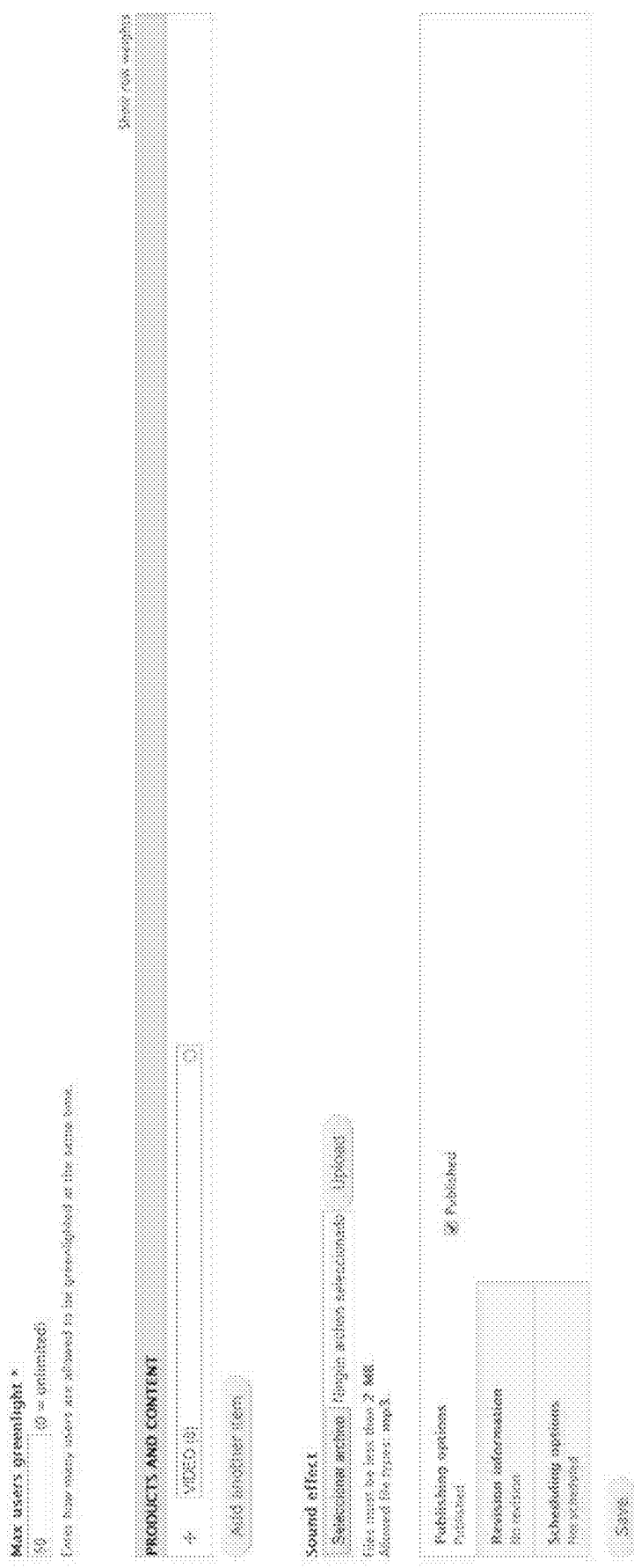
Figure 20A:
FIGS. 20A-20B are other example user interfaces for administration of the CMS architecture of FIG. 18.
Figure 20B:
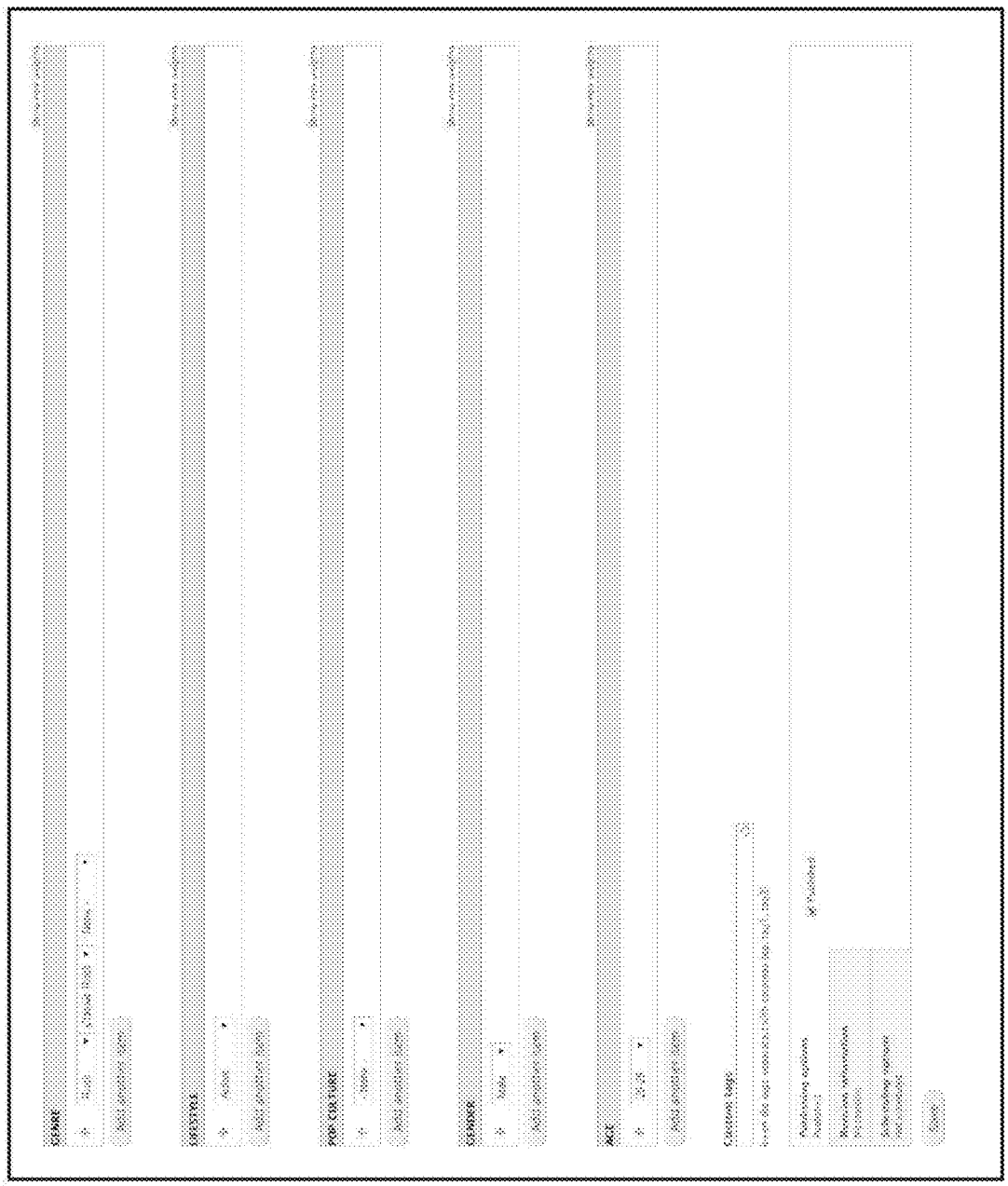

In at least one embodiment, the data storage may include a database and content management system (CMS). Some examples of CMS's are described further below with reference to FIGS. 18-20. In one embodiment, the database may store the user profiles and product data.

In one embodiment, the data storage may include user profiles and other user-specific information. For instance, a user profile may contain a user's username and password to access the eCommerce system 100. In at least one embodiment, the data storage includes a information identifying a user's social media accounts. For example, the data storage may include a user's Google+ID, Facebook ID, and Twitter ID. According to these embodiments, a user may expedite registration through providing a $3^{rd}$ party social network username and password. A profile may be initially assembled based on these $3^{rd}$ party social networks and later augmented based on interactions with the eCommerce system 100. These interactions may include user input directed to the profile or other user input monitored by the eCommerce system 100.

Still referring to FIG. 1, the network 106 may include any communication network through which computer systems exchange (i.e. send or receive) information. For example, the network 106 may be a public network, such as the internet, and may include other public or private networks such as LANs, WANs, extranets, and internets. As shown, the user 104 may utilize the network 106 to exchange data with the eCommerce system 100. For example, the user 104 may access the eCommerce system 100 using the network 106 from a remote computer system or from a mobile device such as a laptop or smart phone.

Figure 2:
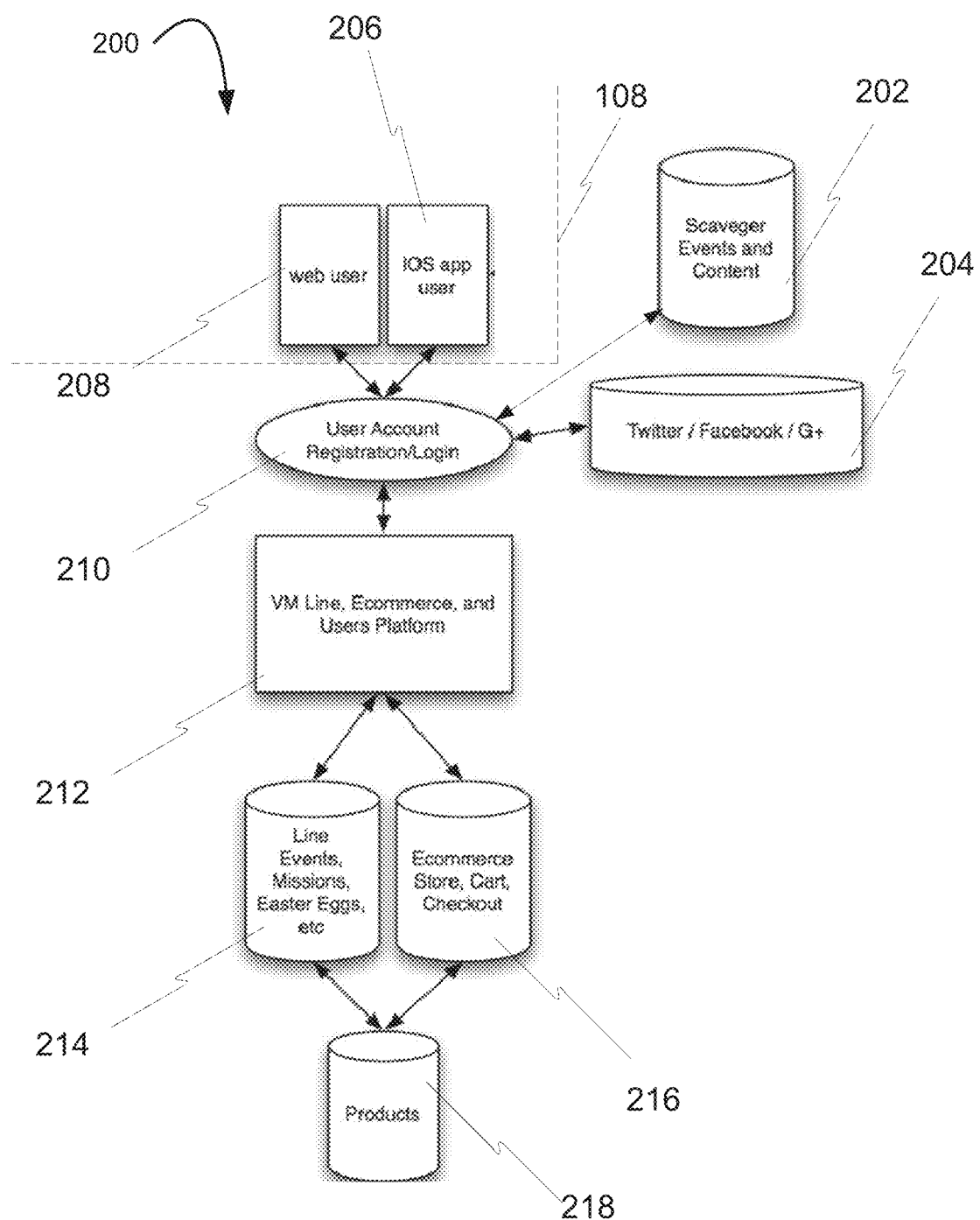
FIG. 2 is an example of a system architecture for an eCommerce server.

FIG. 2, with additional reference to FIG. 1, illustrates one example diagram of a CMS architecture for the eCommerce system 100. In the embodiment shown, the components of the product services interface 108 (i.e., the web-based client interface 208 and the mobile application interface 206) are configured to send data to and receive data from one or more clients. In one embodiment, the product services interface 108 is configured in accordance with a RESTful client-server model. The product services interface 108 may be configured to process various requests from a user 104 via a web-based client interface 208 or a mobile application interface 206. These requests may be received as application programming interface (API) requests. Examples of these API requests include:

Register user
Update user
Authenticate User
Retrieve hero product list
Retrieve product line
Join line
Leave line
Purchase Product (e.g., hero products and non-hero products)
Submit chat (e.g., Twitter)
Submit photo
Perform Mission In the embodiment shown, some API requests may require authentication. Authentication may be performed by an authentication service, such as the authentication service 210. In this embodiment, the authentication service 210 may perform an authentication party by consulting a local data store (not shown) or by accessing $3^{rd}$ party social media profiles, such as the $3^{rd}$ party profile data store 204. For instance, the $3^{rd}$ party profile data store 204 may include a reference to a Twitter, Facebook, or Google+ account. Utilizing this third-party data, the authentication service 210 may contact third-party sites to perform authentication of users. Additionally, data from content database 202 may be associated with the authentication service 210.

In other embodiments, some API requests may not require authentication. For instance, to attract new users, some embodiments include modes where an API request returns a list of active promotions and content. Active promotions may include upcoming hero products, soon-ending hero product lines, past hero products, etc.

In the embodiment shown, the eCommerce system 100 may manage hero product offerings via a virtual line engine 212. The virtual line engine 212 may manage the duration during which a virtual line is open, user placement within the virtual line, and all other aspects of virtual line management. The virtual line engine 212 may interact with various data repositories within the data storage of FIG. 1, including a virtual line database 214, an eCommerce database 216, and a products database 218. The virtual line database 214 may include data representing virtual lines, events, missions, and Easter eggs.

The data stores, the content database 202, the third party data store 204, the virtual line database 214, the eCommerce database 216, and the products database 218 and 202 may take the form of any logical construction capable of storing information on a computer readable medium including flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance. In at least one embodiment, the data stores 200 and 202 are implemented using MICROSOFT ACCESS, which is commercially available from Microsoft Corporation of Redmond, Wash.

Various embodiments may implement the components described above using a variety of hardware components, software components and combinations of hardware and software components. Thus embodiments disclosed herein are not limited to the particular configuration illustrated in FIGS. 1 and 2 and may utilize alternative or additional components configured to perform the processes and functions described herein.

Figure 3A:
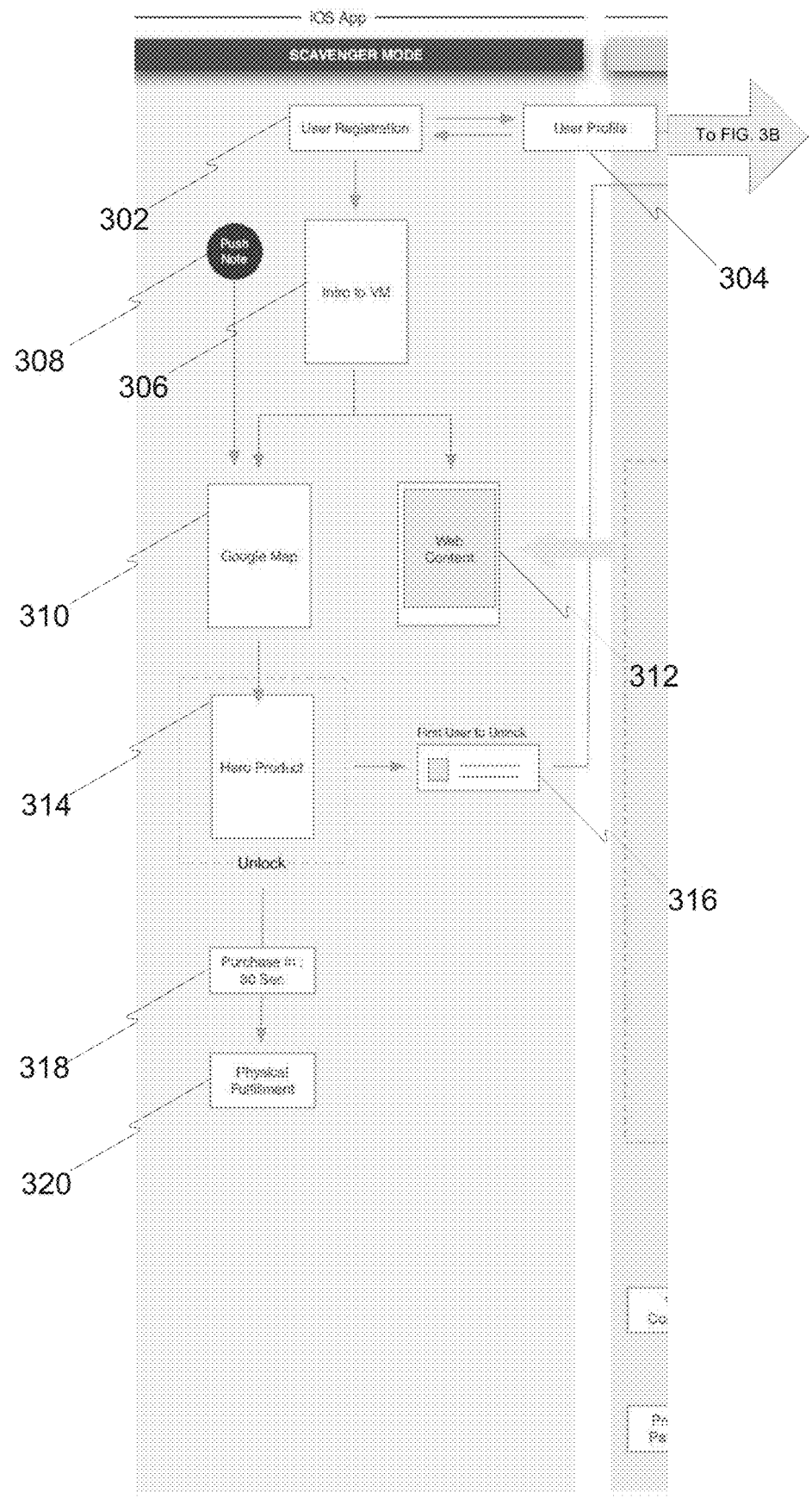
FIGS. 3A-3D illustrate one example navigation diagram for the eCommerce system according to one embodiment.
Figure 3B:
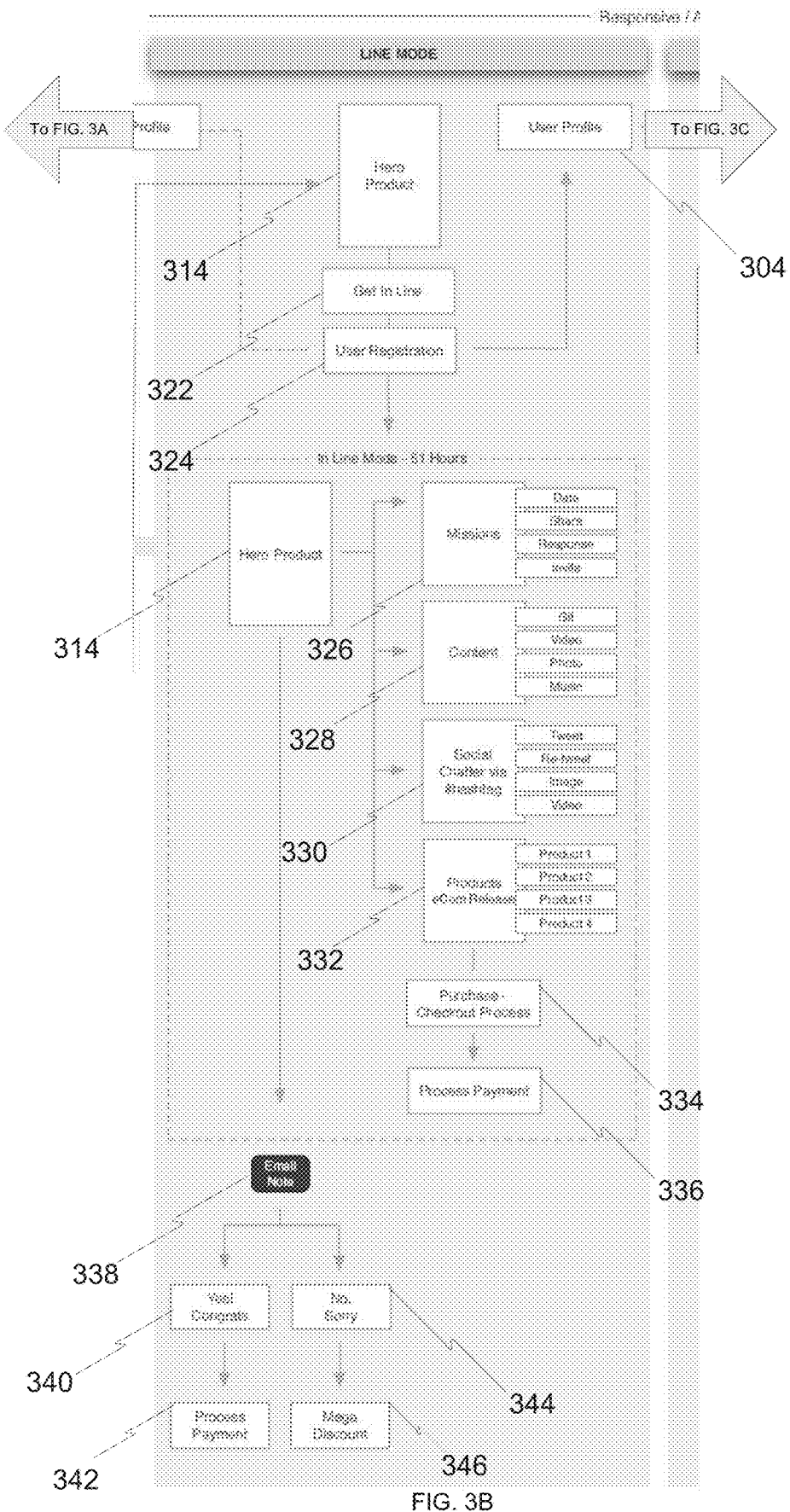
Figure 3C:
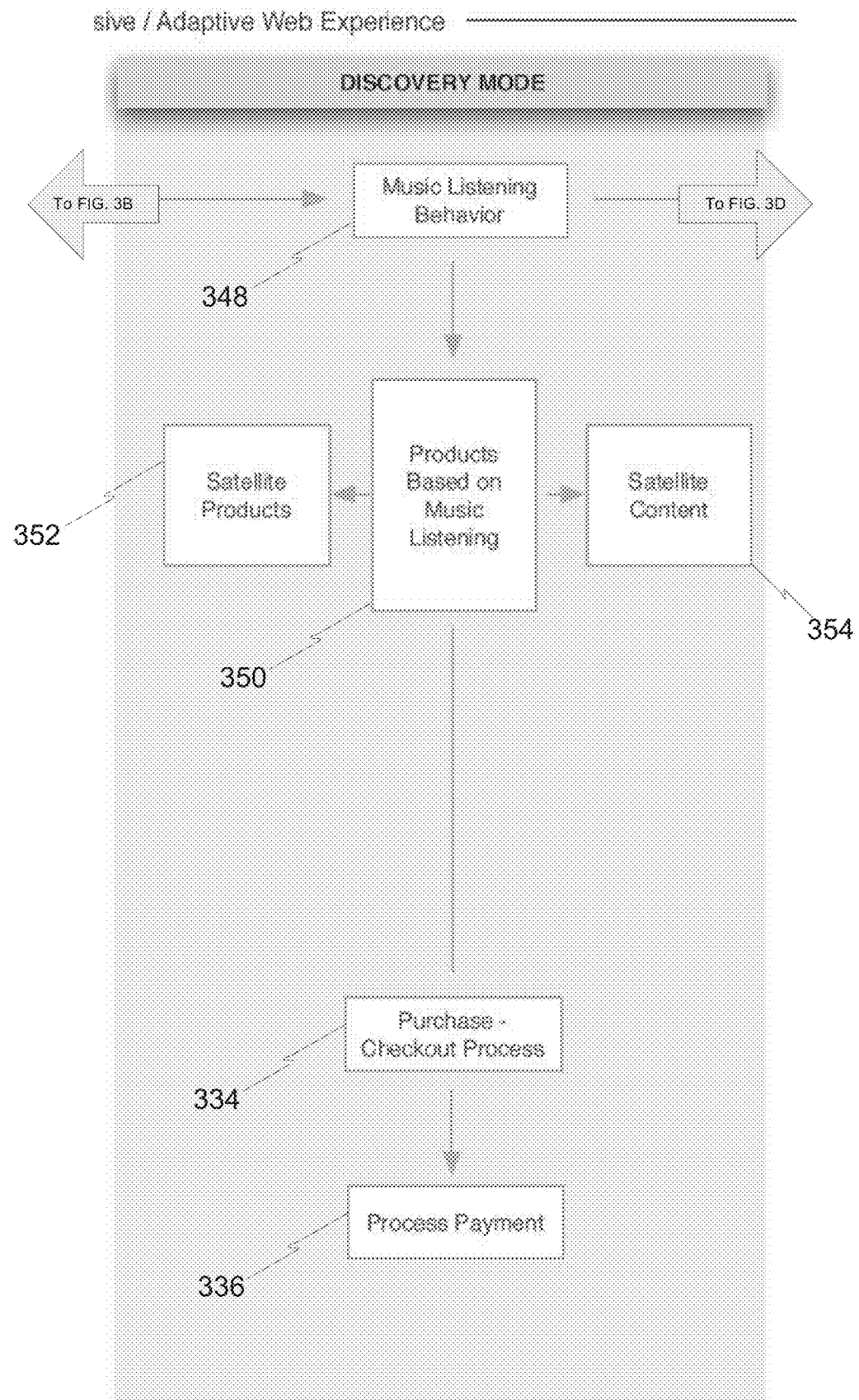
Figure 3D:
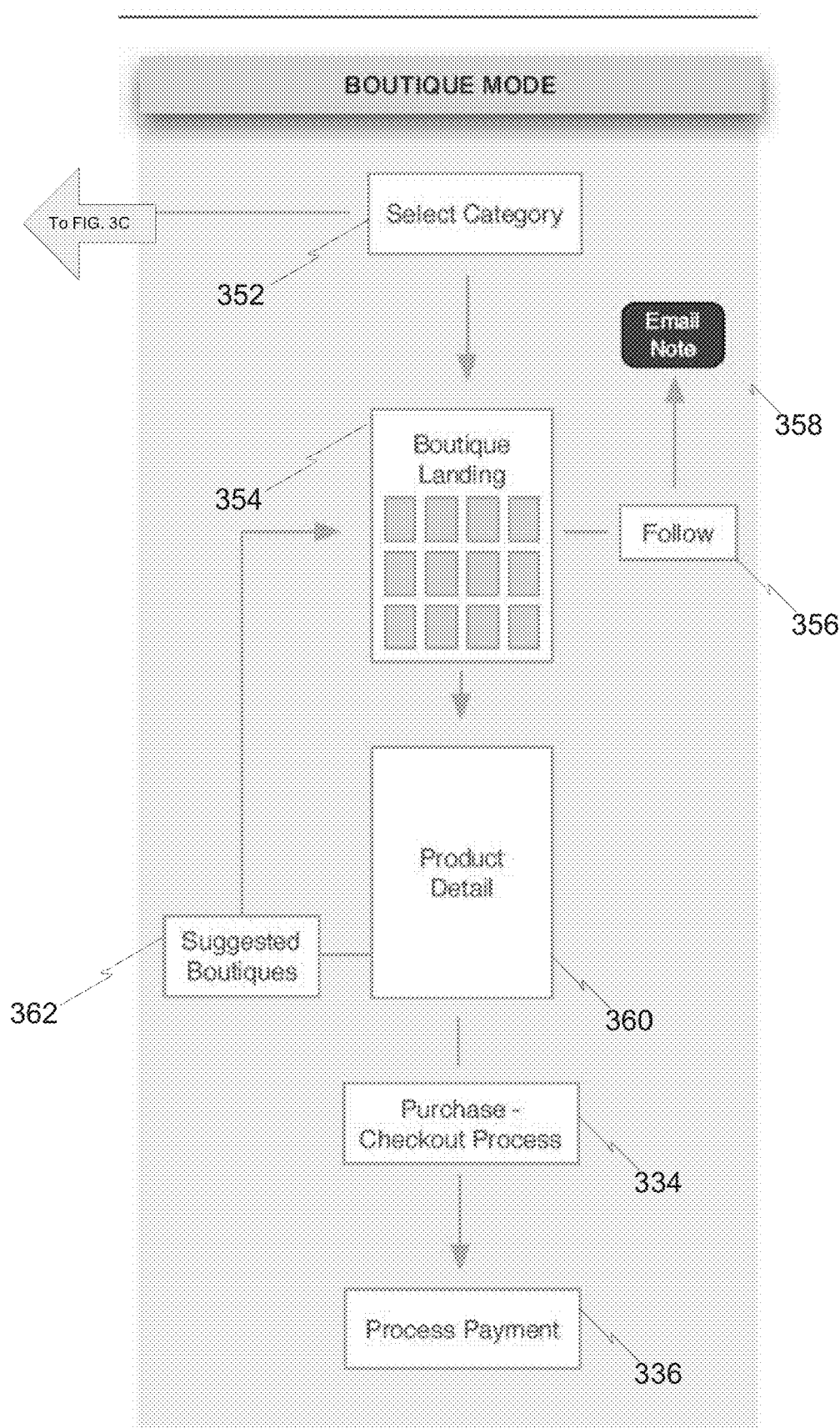

FIGS. 3A-3D show an example navigational diagram of the system according to one embodiment. More specifically, FIGS. 3A-3D include a scavenger mode diagram (FIG. 3A), a line mode diagram (FIG. 3B), a discovery mode diagram (FIG. 3C), and a boutique mode diagram (FIG. 3D).

Scavenger mode is a mode wherein the application unlocks a hero product leading to either a purchase of the hero product or a line for the hero product. The system may enter Scavenger mode in response to receiving information indicating a user is in a certain location or performing a specific action. The user may, for example, scan a fiducial to unlock a hero product, which may allow a user to join a line for the hero product or allow the user to directly buy the hero product.

Line mode is a mode wherein the application allows a user to register for a line and complete missions to reach a spot to purchase the hero product. The user's spot in line may change based on the user's activities as well as the activities of other users.

Discovery mode is a mode wherein the application offers satellite products or satellite content if the user, for example, listens to a certain song or focus entity. Discovery mode may activate while a user is listening to a song in the application or via a third party application that is connected to the system. Discovery mode may also activate and offer satellite products or satellite content as a result of a user listening to music from a video or song while in line mode or boutique mode (described below).

Boutique mode is a mode wherein the application displays items for purchase and lines to join sorted by categories. The application may display a landing page in response to receiving input selecting a category. The landing page may display hero products for sale and open or upcoming lines to join. Boutique mode may also suggest items and landing pages based on a user's previous activity (e.g., from a user's social graph).

FIG. 3A illustrates an example navigational diagram of scavenger mode. The application may register a user at user registration 302. The user may register at any type of device with web access, including a laptop computer or a cell phone. The system creates a user profile 304 based on the information received from the user registration 302. Each user profile 304 has an associated fan profile page that is viewable by any registered user. When a user registers on an application, the application displays an introduction to VirginMega 306 and may link to web content 312 or Google Maps 310 relating to VirginMega and "FlagTag" locations. A push note 308 including FlagTag information may be put into Google Maps 310. FlagTags, as described further below, are fiducials that may be scanned to unlock a hero product 314. A user may travel to a FlagTag location and scan it to join a line. Once the FlagTag is scanned, the application may generate augmented reality content near the FlagTag. In some examples, scanning the FlagTag automatically allows a user to purchase an item within a time frame (at 318). Once an item is purchased, the item is delivered to the user (at 320). In other examples, the FlagTag may unlock a line for an item. If the FlagTag is scanned for the first time, that user may become the first user to join the line for the hero product 314 in line mode. In one example, after a first user scans the FlagTag, other users within range of the FlagTag are allowed to register for the line directly (e.g., without having to scan the FlagTag). In one example, to register for a line, users may have to complete a "stampede mission." A stampede mission is a mission used by the application to confirm that the registrants are humans and not bots trying to fill the line. In current offerings, bots may overload a website to buy tickets automatically via different generated user accounts. The application improves on those offerings by preventing nonhuman users from buying the hero products.

FIG. 3B illustrates an example navigational diagram of line mode. Once a user clicks an option to get in line 322 and register for the line 324, the line is linked to the user's user profile 304. The application then adds the user to the line, and may offer missions 326 and content 328 to the user. The user may complete missions 326 or view content 328 to improve his spot in the line. The application may also move a user up the line in response to the user submitting an update (e.g., Facebook status update or Twitter tweet) using the hash tag generated for the line. Some missions may require a user to team up with a user to receive points. In one example, a user may designate another user in a line to be a soul mate. In this example, the application may run soul mate missions that require two users to work together to complete a challenge and gain prizes (e.g., jumps, points, products, etc.). In some examples, each mission, content, and hash tag post may contribute a number of points to a user's profile. Once a user passes a threshold number of points, he gets jumps to skip users who are less active. Users may also be rewarded with various types of line currency such as "props," which are described further below. In other examples, the application periodically scans the line and inactive users lose spots while active users gain spots. The period of time between scanning iterations may be stored in a configurable parameter. For example, the value of the period of time may be set to 20 hours. In one example, users may retain their spots if they complete one activity (e.g., missions 326, view content 328, use hash tag 330) every set period of time. A user may also stay active by periodically checking-in to a line. According to some examples, the application may also offer eCommerce product releases 332 to a user and move the user up if he chooses to purchase the product. The eCommerce product may be a satellite product (e.g., a t-shirt for a focus entity in a line whose hero product is concert tickets for the focus entity). If a user chooses to purchase the product, the application's virtual line manager may begin a checkout process at 334 and process a payment at 336.

Once a time period for the line ends, an communication (e.g., an email) 338 is sent to the users in the line indicating if they won (e.g., they reached the top part of the line eligible for the hero product) 340 and may purchase the hero product 314 or if they lost (e.g., they did not reach the top percentage of the line) 344 and may receive a mega discount 346 for another product or line. The mega discount 346 may include jumps for another line or prioritized entry for another line. If the user won, the application may process a payment 342 and exchange the payment for the hero product.

FIG. 3C illustrates an example navigational diagram of discovery mode. The application may track a user's music listening behavior 348 by tracking music videos watched on the application or connecting to a user's music library (e.g., a user's Spotify profile) and tracking metadata relating to which songs a user plays. While being tracked, the user may be in a line or in boutique mode. The application may then display products based on the tracked music listening 350 such as satellite products 352 and satellite content 354. In some examples discovery mode may also display and offer products based on various actions in the application by the user. For example, if a user is browsing through a line, the application may display a "magic spot" on the line that, when clicked, offers a satellite item or satellite content as a reward for the user finding the magic spot. The magic spot may be a hidden spot with, for example, a sparkle or indication distinguishing it from the surrounding area. If a user chooses to buy the satellite item or satellite content, the application may begin a checkout process 334 and process a payment 336 for the item. Discovery mode helps satellite products and satellite content sell specifically to users who may be interested in them. If a satellite product has a limited run, under current systems, resellers may purchase it and resell it. Discovery mode may only offer a satellite product to users whose behavior shows an interest in the satellite product. As a result, satellite products are offered directly to fans, as opposed to anyone attempting to resell an item.

FIG. 3D illustrates an example navigational diagram of boutique mode, which allows a user to explore lines and products by category. A user selects a category at 352 and goes to a boutique landing page 354. The category may be a type (e.g., concert tickets), a genre (e.g., alternative music), a focus entity (e.g., Miley Cyrus), or others. The boutique landing page 354 may display products that may be purchased, lines that may be joined, and a follow option 356 that may be used so the application sends a user updates on the content of the boutique landing page 354 via, for example, an email 358. If a user clicks on a product, the application displays a product detail page 360 that includes information about the product (e.g., photos, videos, price, etc.) and suggests other boutiques 362. The suggested boutiques 362 may be suggested based on boutiques that a user's friends have visited or boutiques that similar users tend to view. If the user wants to purchase a product, the application runs a checkout process 334 and processes a payment at 336.

User Interface

In some embodiments, the user interface screen includes links to: a home screen, a hero product link, a previous lines link, a scavenger link, a current line update link, a user profile link, a cart view link, a notifications link, a boutique link, and an overall global navigation link. Each of these sections is described further below.

Some examples of the home screen are illustrated in FIGS. 4, 12, 29, and 50. In these examples, the home screen is an activity hub and communicates a variety of opportunities to get in line for hero products and browse boutique mode. The home screen consists of updates, information regarding products for purchase, available lines, and links to notifications.

Figure 30:
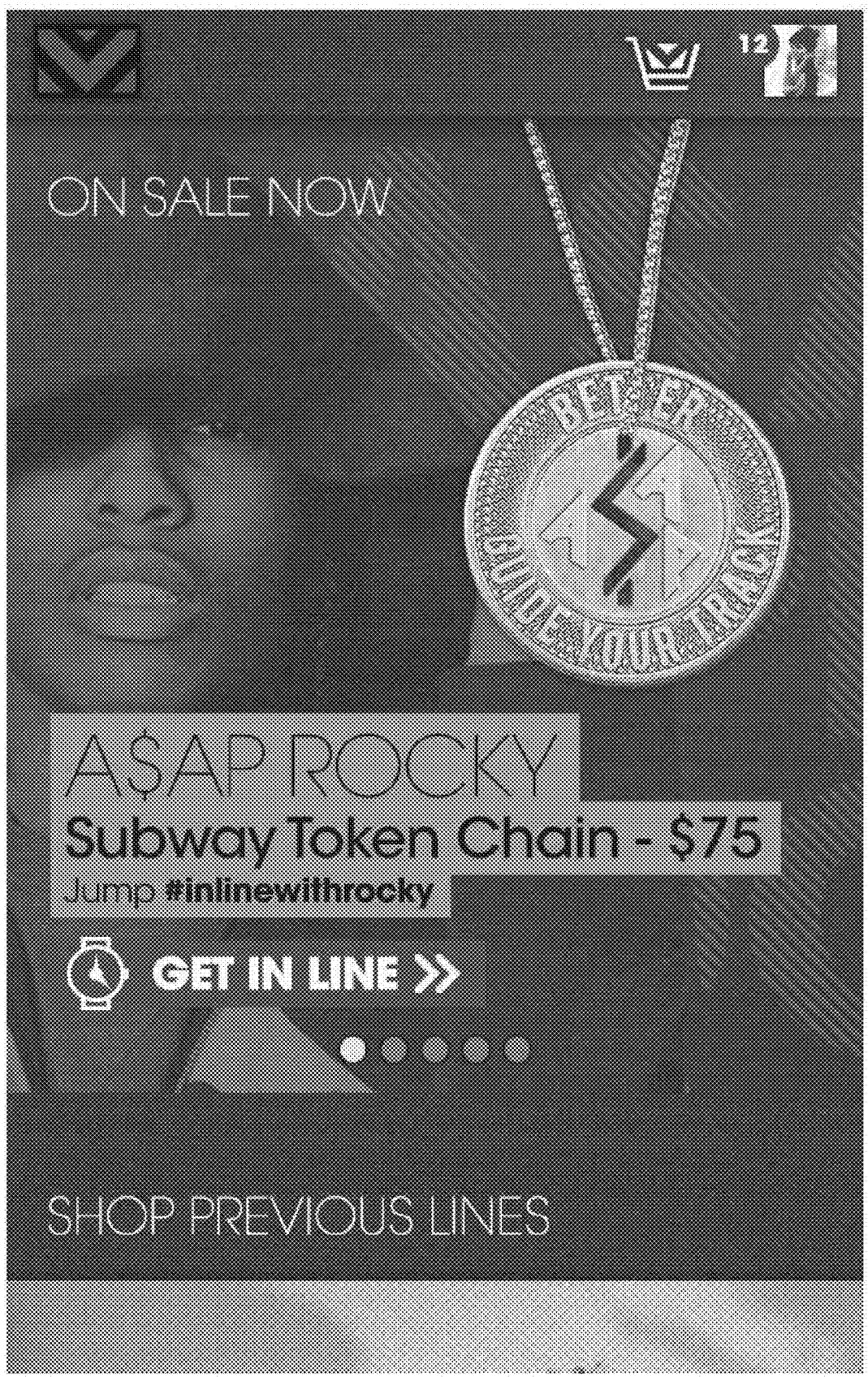
FIG. 30 is one example of a user interface for a home screen of a mobile device.
Figure 31:
FIG. 31 is one example of a user interface for a home screen of a mobile device.
Figure 32:
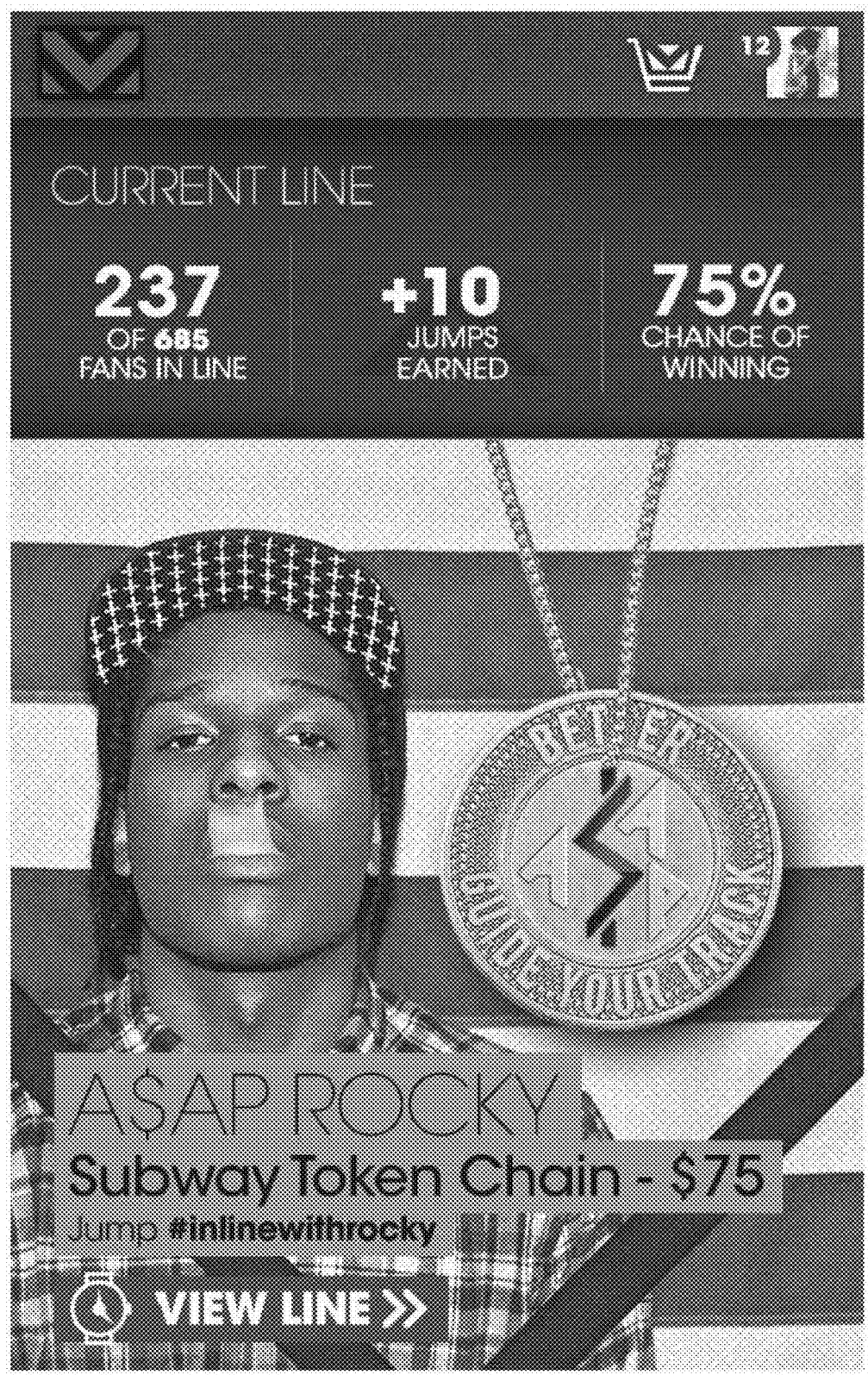
FIG. 32 is one example of a user interface configured to summarize virtual line details.
Figure 33:
FIG. 33 is one example of a user interface configured to summarize a plurality of previous virtual lines.

FIGS. 30-33 illustrate additional examples of user interfaces that may be presented as a Home screen. FIG. 30 illustrates one embodiment of a Home screen wherein a user has yet to join a virtual line. Additional virtual lines may be viewed by scrolling up and down. FIG. 31 illustrates scrolling (e.g., swiping up and down) between virtual lines which may have been previously available. For instance, a promotion may still be available to be viewed by a boutique shop after the promotion has ended. FIG. 32 illustrates one embodiment of a Home screen wherein a user previously joined or registered to a virtual line. In the embodiment shown, line details are displayed. Line details may include the size of a virtual line, the spot of the user in that line, the number of spots the user has moved up or down since the user last visited the app, and the percentage chance that the user has of purchasing a hero product. The percentage chance may be calculated based on the number of products that are available, the user's spot in line, and the user's previous activity. If a user is in a good spot and has been very active, his percentage chance may be higher than a user who is in a good spot but has not been very active. FIG. 33 illustrates another embodiment of a Home screen that allows scrolling between virtual lines that were previously joined by the user. In this embodiment, a "view line" option appears instead of a "get in line" or a "shop now" option. The "view line" option may appear for an ongoing line relating to the displayed hero product, which the user may or may not already be in.

In some examples, the application may allow a user on a line to enter a "Peek Mode" that displays statistics relating to the user by slightly swiping his avatar on the virtual line to the right. When a user enters Peek Mode, the application may display the number of spaces in front of the user, the number of spaces behind the user, a hint on how to move forward in the line, the probability of claiming a product based on the user's current spot and previous activity, and the user's nearest contact in the virtual line.

When a user peeks at his percentage change of receiving a hero product, the friend nearest him in the virtual line (e.g., friend on Facebook, follower on Twitter, etc.) may perform a small animation. Additionally, in response to a peek, the application may display In at least one embodiment, many users simultaneously perform missions to advance their position in the virtual line. In this embodiment, a user interface, such as the user interface of FIG. 5, includes animations that indicate changes in a user's position within a virtual line. FIG. 8 illustrates one example user interface 800 demonstrating a scrolling animation. In the embodiment shown, the eCommerce system may receive an indication that a user completed a mission, such as the mission discussed above with regard to FIG. 7, causing the user's position with the virtual line to change. In this embodiment, the user interface 800 may initiate a scrolling animation as the user's profile rises in virtual line position. Once the user's profile reaches the new position within the virtual line, the animation ends and the user's profile is displayed relative in the new position.

Figure 53:
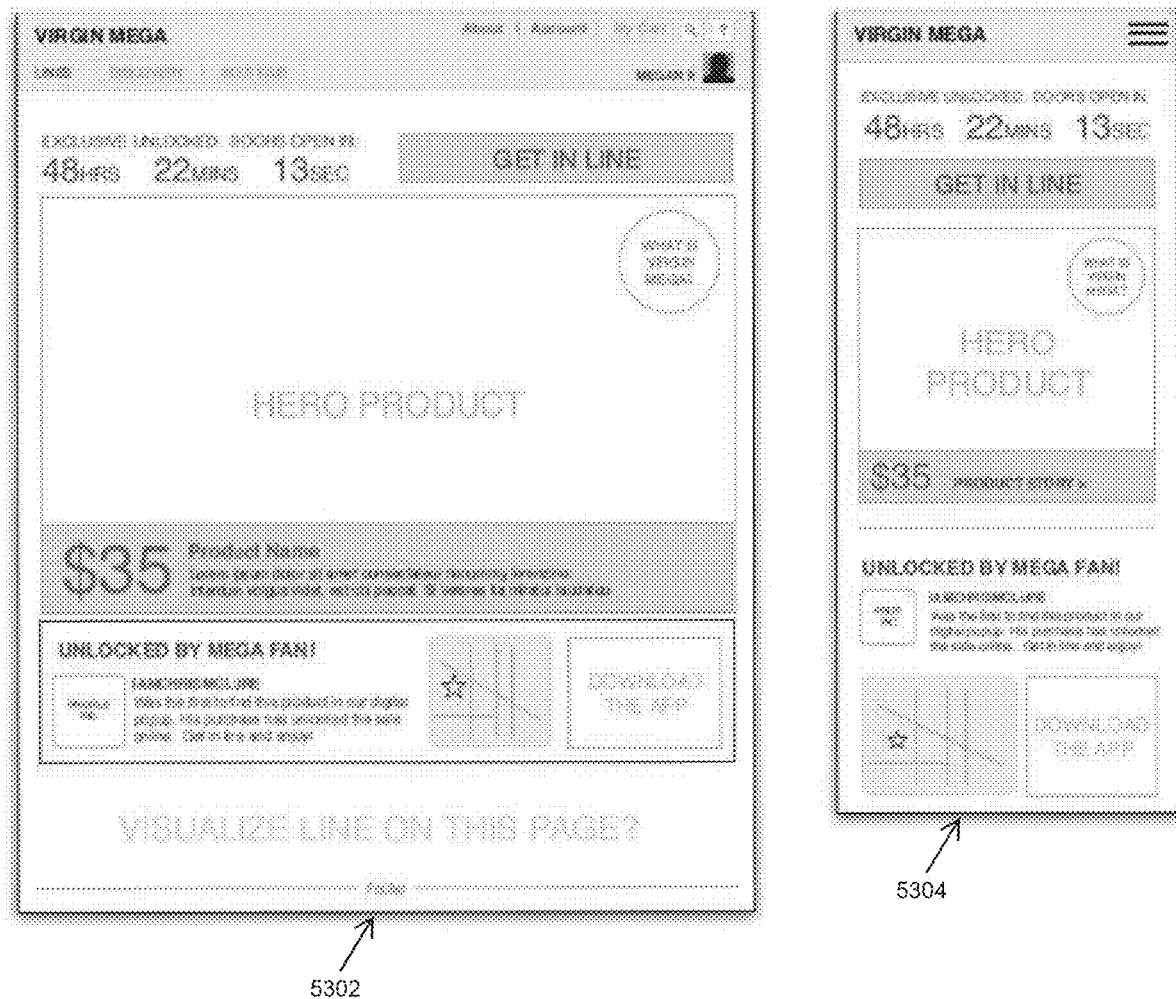
FIG. 53 is one example of a plurality of user interfaces illustrating a plurality of hero product home views.

FIG. 53 illustrates a plurality of additional example user interface views for a hero product home screen, which may represent alternative views of a home screen. In the embodiment of FIG. 53, a wide-view 5302 (e.g., for a tablet or desktop) is illustrated next to an abbreviated view 5304 (e.g., for a mobile phone).

Figure 55:
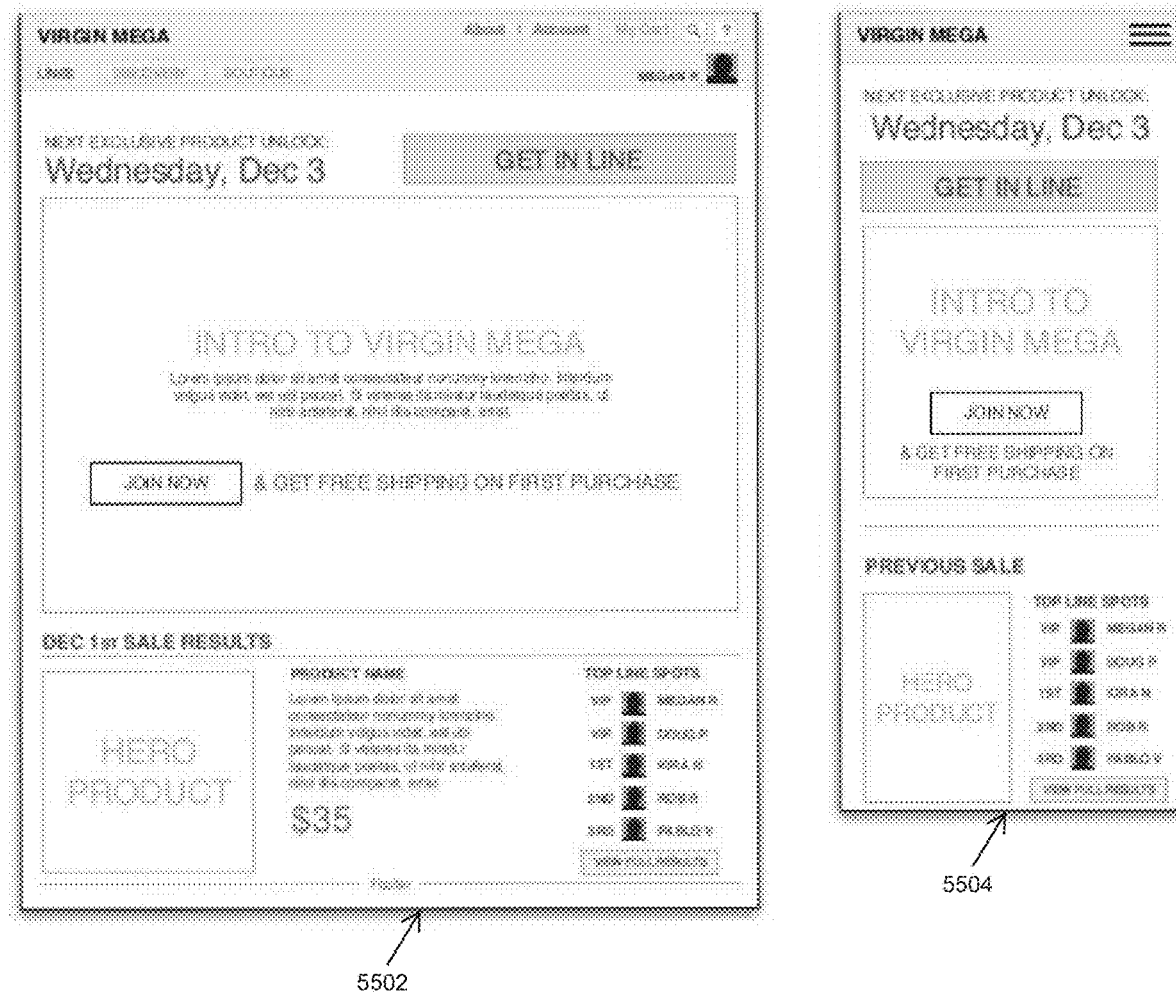
FIG. 55 is one example of a plurality of user interfaces illustrating a plurality of home views between hero promotions.

FIG. 55 illustrates a plurality of additional example user interface views for an eCommerce system between (e.g., when no hero product offer is pending) product offerings. In the embodiment of FIG. 55, a wide-view 5502 (e.g., for a tablet or desktop) is illustrated next to an abbreviated view 5504 (e.g., for a mobile phone).

User Profile Page

Figure 39:
FIG. 39 is one example of a user interface visualizing a user profile.
Figure 40:
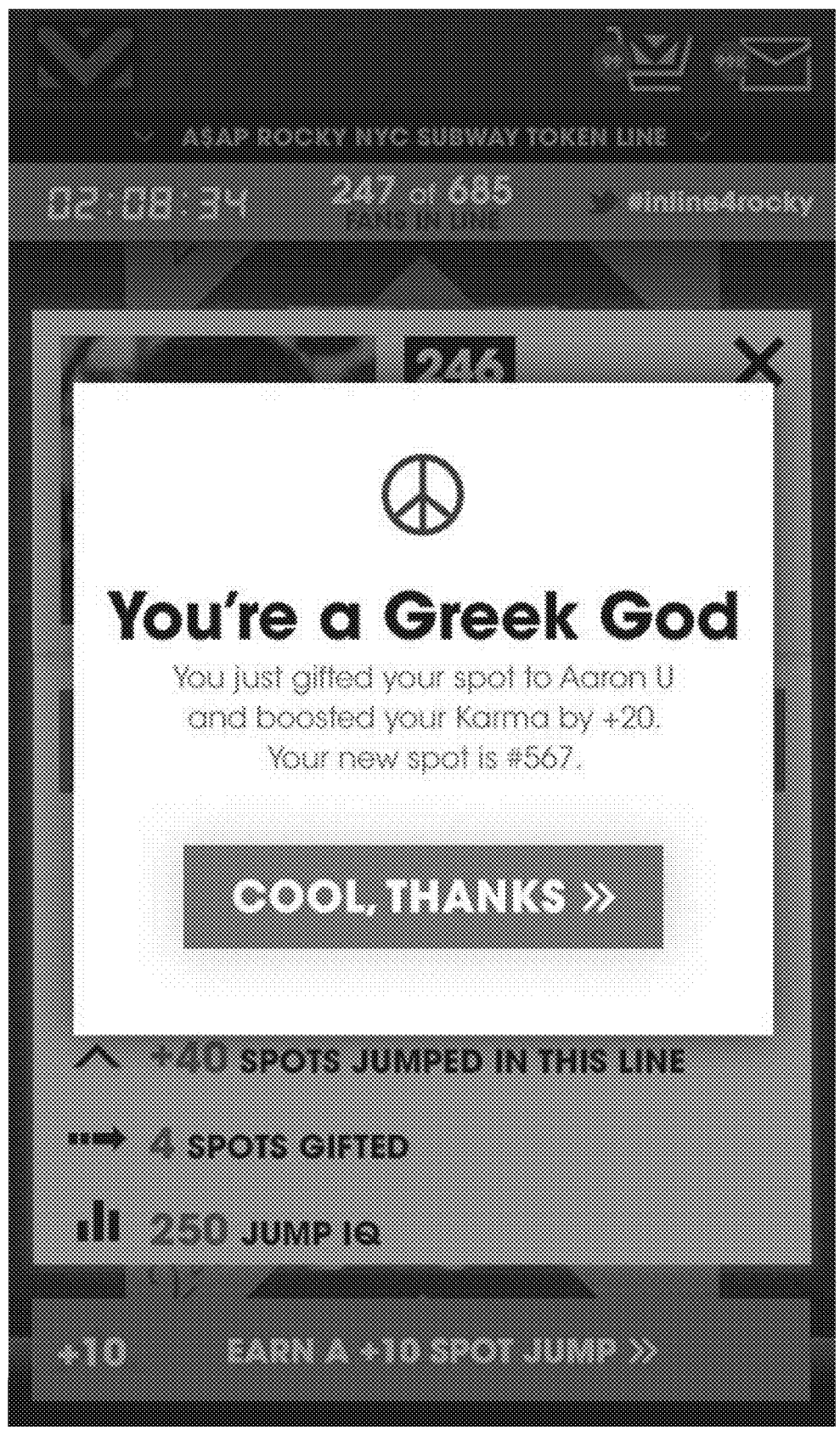
FIG. 40 is an example user interface for gifting a spot.

FIG. 39 illustrates an embodiment of a user profile view. In the embodiment shown, user statistics are displayed. User statistics include Jump IQ (e.g., the total number of jumps performed across all virtual lines) and record/highest jumps per virtual line. A Jump IQ may be updated by one every time a user jumps a spot in a line. In addition, content unlocked while in virtual lines may be displayed.

Fan Profile Page

Figure 41:
FIG. 41 is one example of a user interface visualizing a virtual line.
Figure 42:
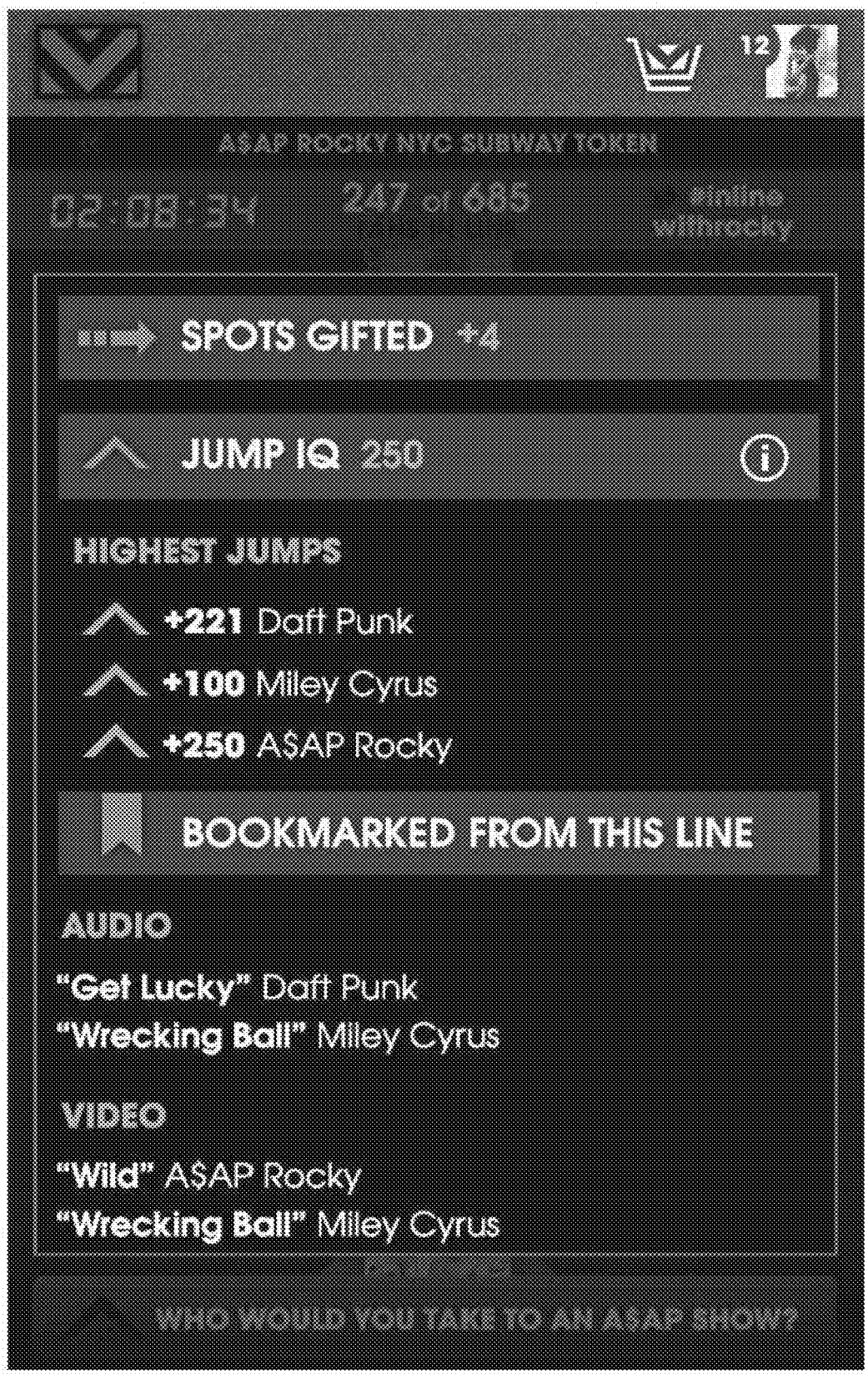
FIG. 42 is another example of a user interface visualizing a fan profile.

FIGS. 41-42 illustrate an example fan profile view. A fan profile view may be visualized when a user selects another user's profile to view. Public information about the other user may be visualized. Public information may include the other user's number of jumps per virtual line, the number of times the other user gifted/gave away a line position and the other user's total number of jumps across all virtual lines. Additional information may be displayed such as the other user's record/highest jumps and unlocked content.

Current Line Update Page

Figure 34:
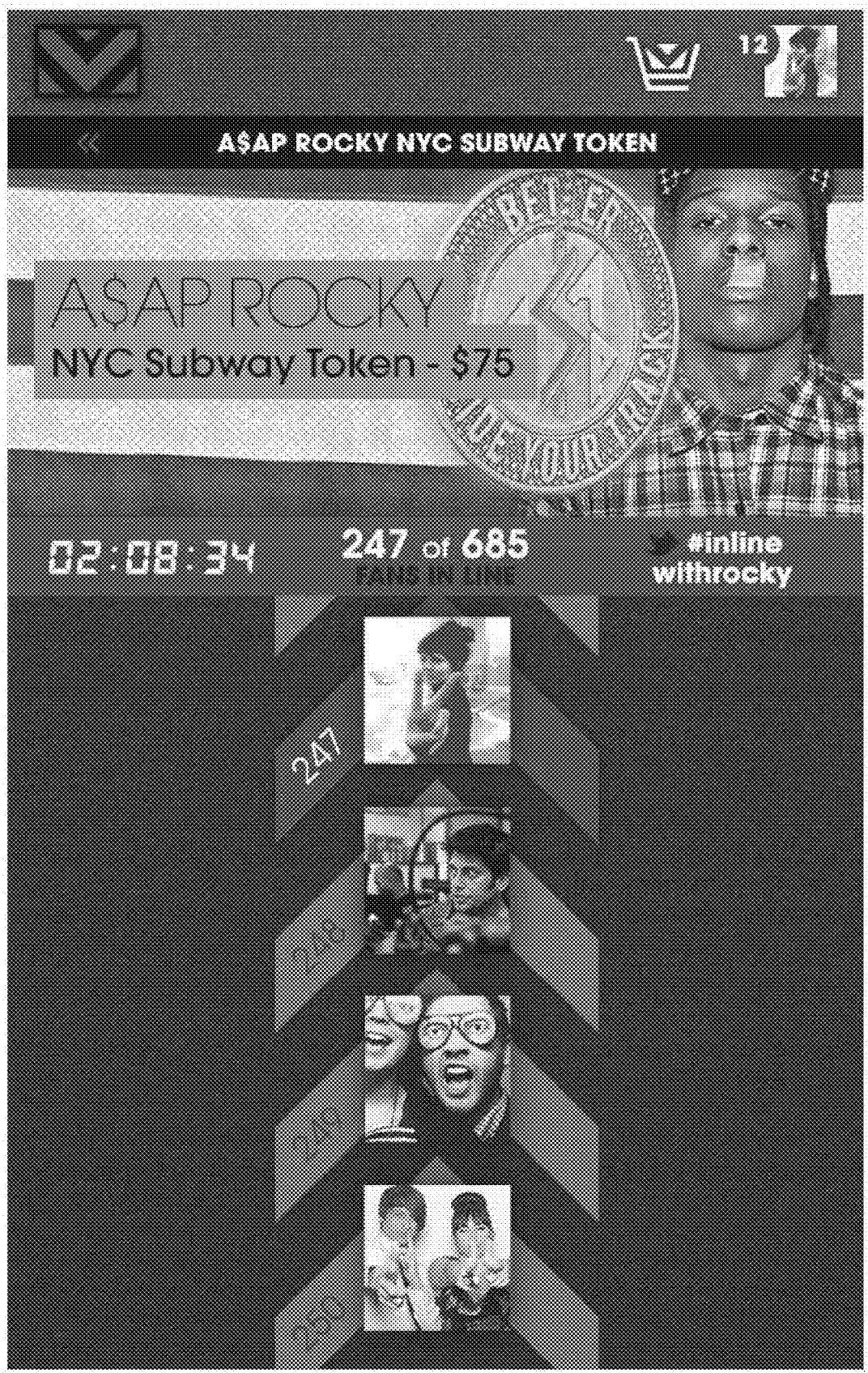
FIG. 34 is one example of a user interface visualizing a virtual line.

FIG. 34 illustrates an example user interface displaying a virtual line. In the embodiment shown, hero product details and a countdown may be visualized in relation to a zoomed in view of a virtual line.

Figure 35:
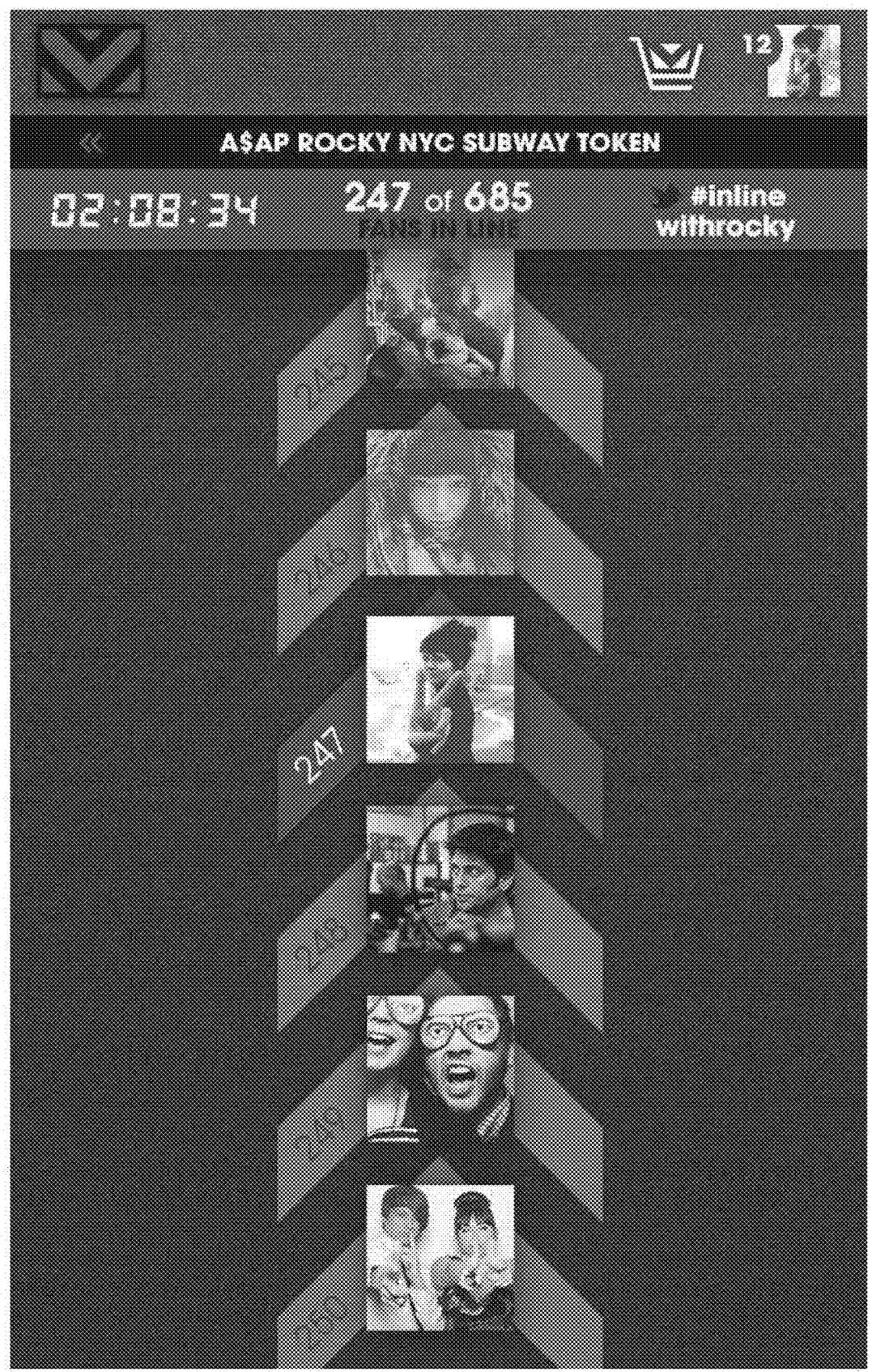
FIG. 35 is one example of a user interface visualizing a virtual line.
Figure 36:
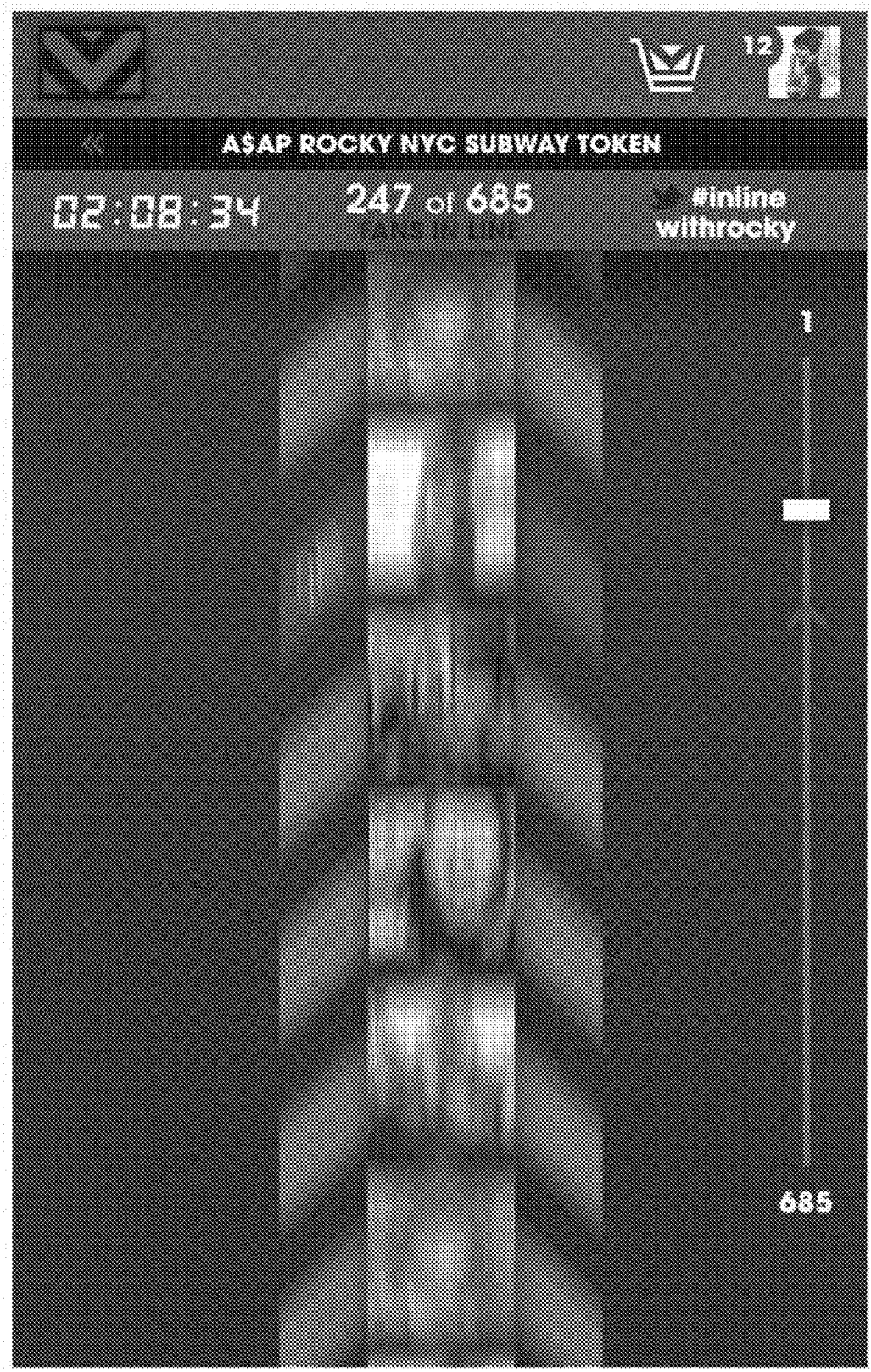
FIG. 36 is an example of a user interface visualizing virtual line animations.

FIG. 35 illustrates another example user interface displaying a virtual line. As discussed above with regard to FIG. 8, a virtual line may be animated to demonstrate movement (e.g., jumping after completing a mission). As illustrated in FIG. 36, a virtual line may be animated to mimic a user scrolling (e.g., swiping) up and down.

Figure 65:
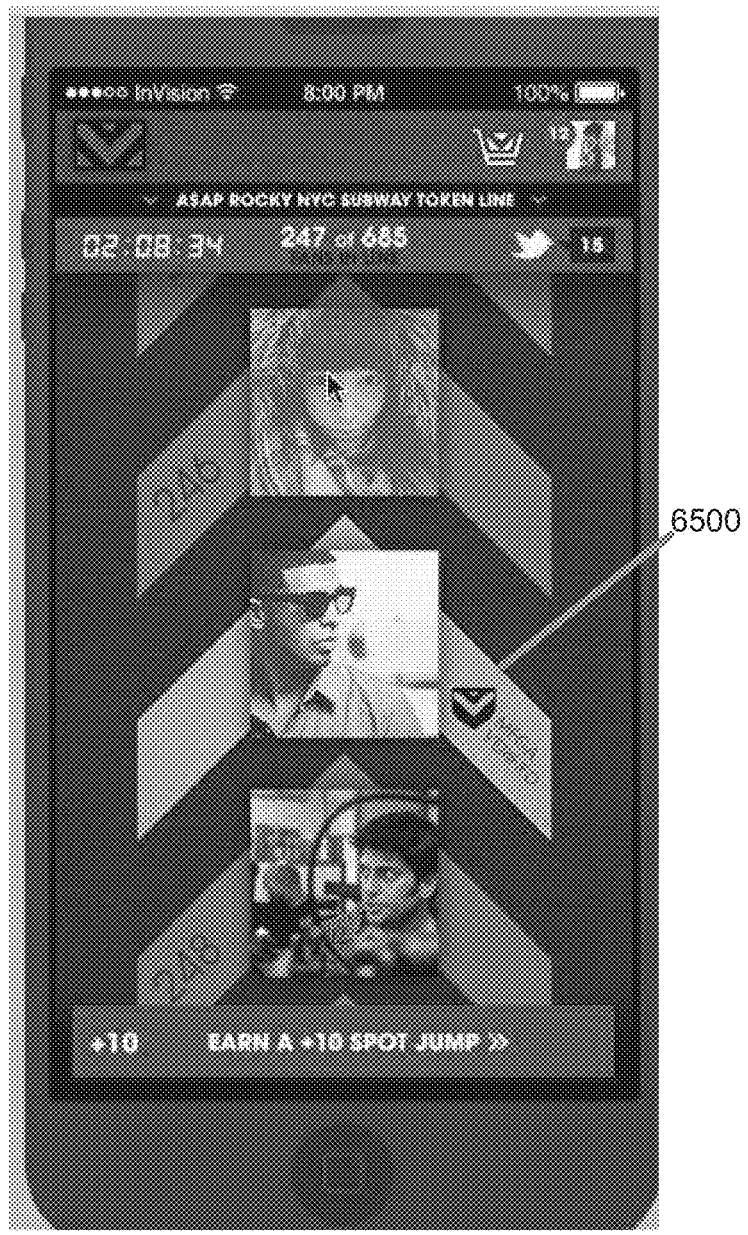
FIG. 65 is another example of a user interface visualizing a virtual line.
Figure 66:
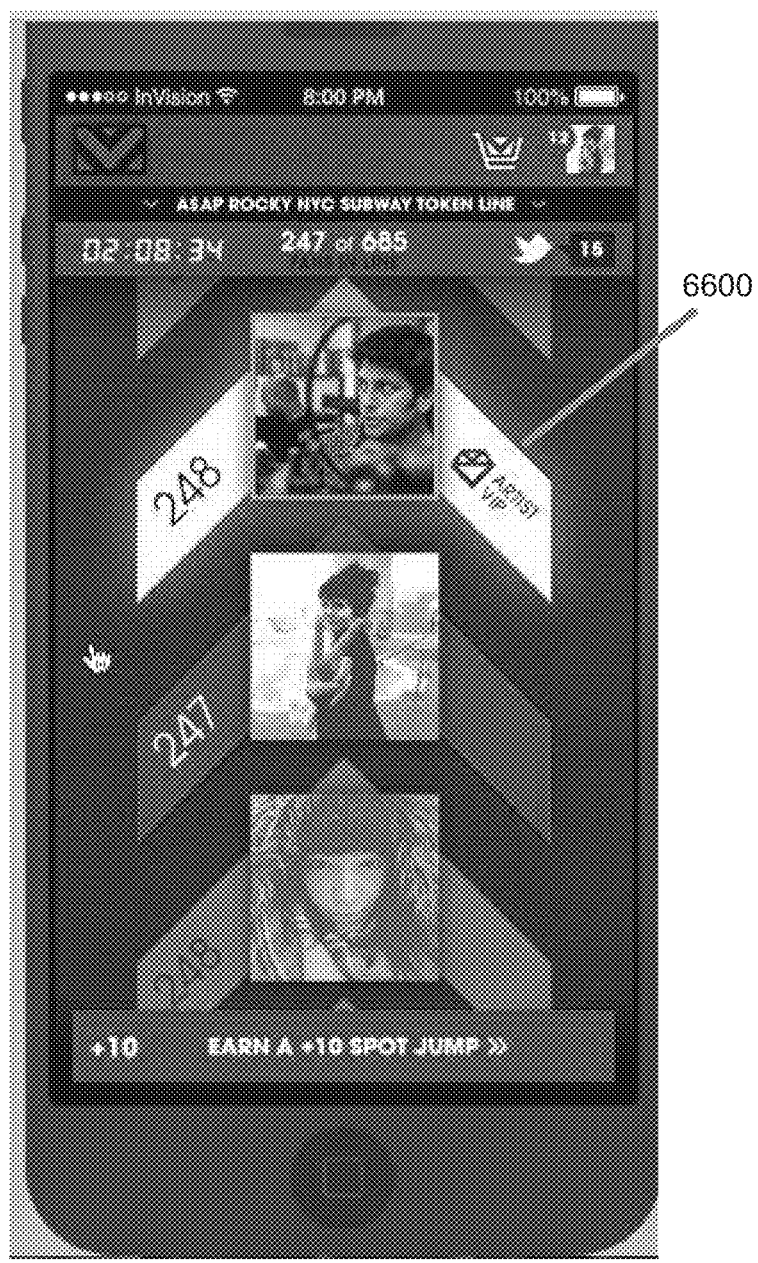
FIG. 66 is another example of a user interface visualizing a virtual line.

FIG. 65 illustrates another example of a user interface displaying a virtual line in which a spot 6500 is highlighted to indicate that the user associated with the spot 6500 has been in electronic contact with the focus entity since the formation of the virtual line. This electronic contact may include any sort of communication traceable by a computer system (e.g., hot tub mode, discussed further below). FIG. 66 illustrates another example of a virtual line in which the spot 6600 is highlighted to indicate that the user positioned in the spot 6600 is the focus entity (e.g., a focus entity associated with the hero product of a virtual line).

Figure 37:
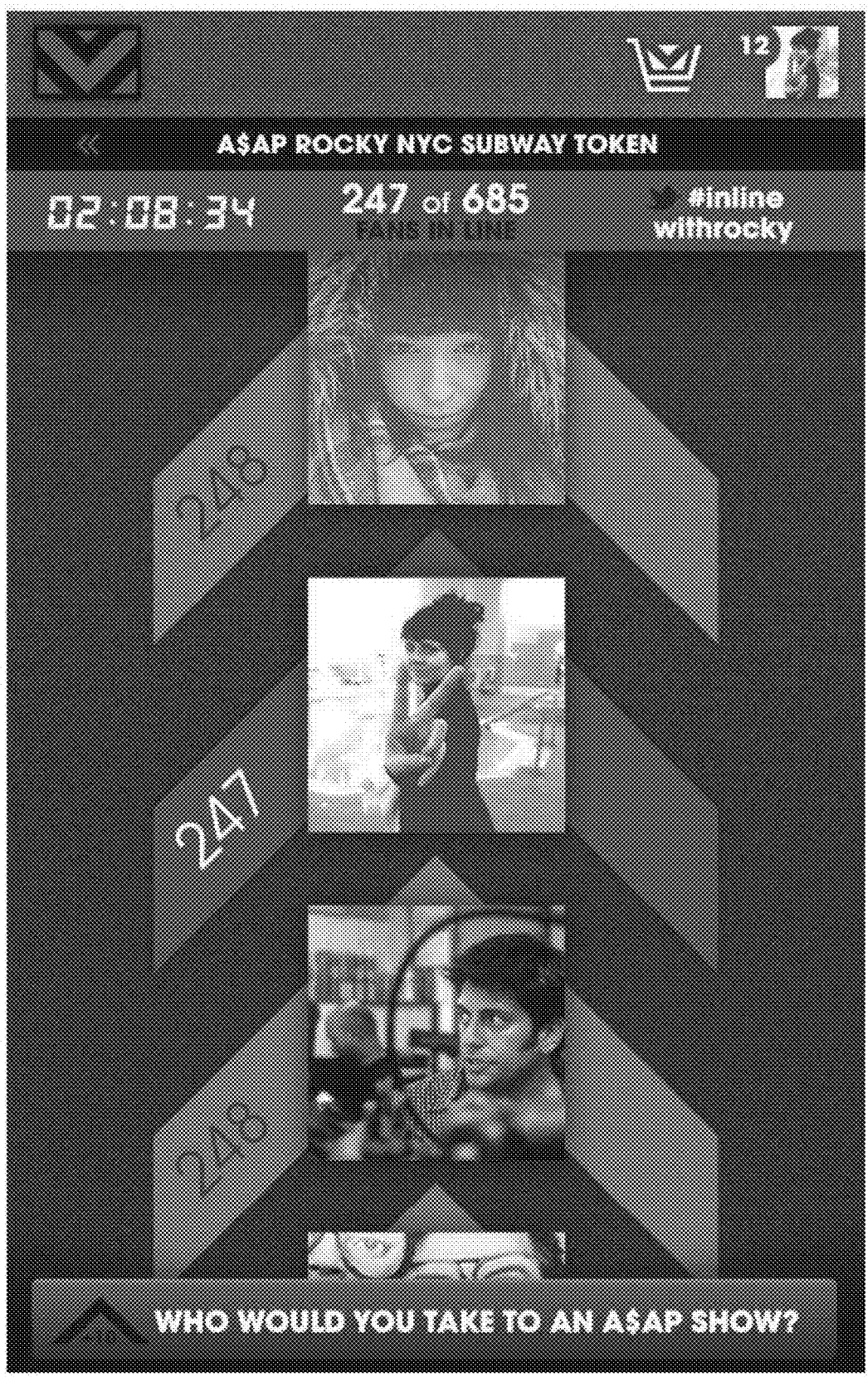
FIG. 37 is one example of a user interface visualizing a zoomed in virtual line.

FIG. 37 illustrates another example of a user interface displaying a virtual line. In the embodiment shown, a small subsection of the virtual line is displayed in a "zoomed in mode." As discussed below, the "zoomed in" view may be referred to as a "macro mode."

Figure 38:
FIG. 38 is one example of a user interface visualizing a virtual line with an associated Twitter feed.

FIG. 38 illustrates one example of a user interface displaying a virtual line with an integrated Twitter feed. In the embodiment shown, a user may review "tweets" associated with a dedicated Twitter hash tag or hash tags related to a hero product. Each virtual line of a hero product for sale may have a dedicated Twitter hash tag so that users in that virtual line can communicate.

Get In Line Via Web

In some embodiments, users may join a virtual line during a countdown for the virtual line from a webpage or via a "GET IN LINE" widget embedded on any webpage. The widget may be embedded, for example, in a $3^{rd}$ party webpage or advertisement. A webpage may be displayed to create a profile, reserve a spot in a virtual line, and receive a confirmation of the spot number a user has reserved in the virtual line. The webpage may be displayed on a computer, mobile device, or any other machine that can access the web. The spot in the virtual line may be actively improved via an application downloaded on a user's mobile device.

Once a user has registered, emails may be sent to the user and if the user has downloaded and installed the application, push notifications with content or offers that allow him to jump up the virtual line may be sent. For example, the application may display an offer to jump a user a number of spots if the user shares the virtual line with non-registered users. The application may also display a news feed with live updates about the virtual line's status and activity to users waiting in the virtual line.

Figure 71:
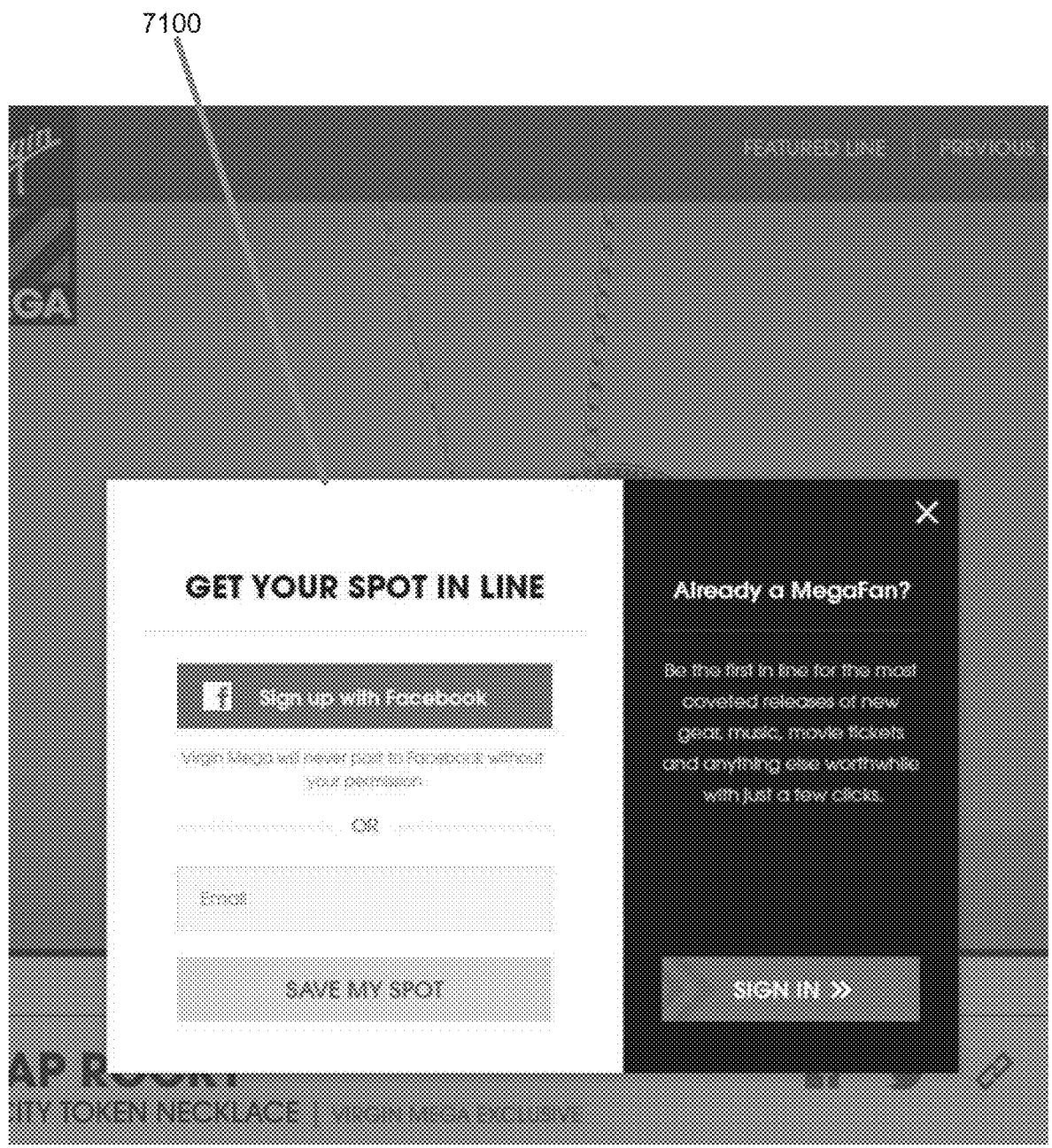
FIG. 71 is an example user interface for joining a line via a webpage.
Figure 72:
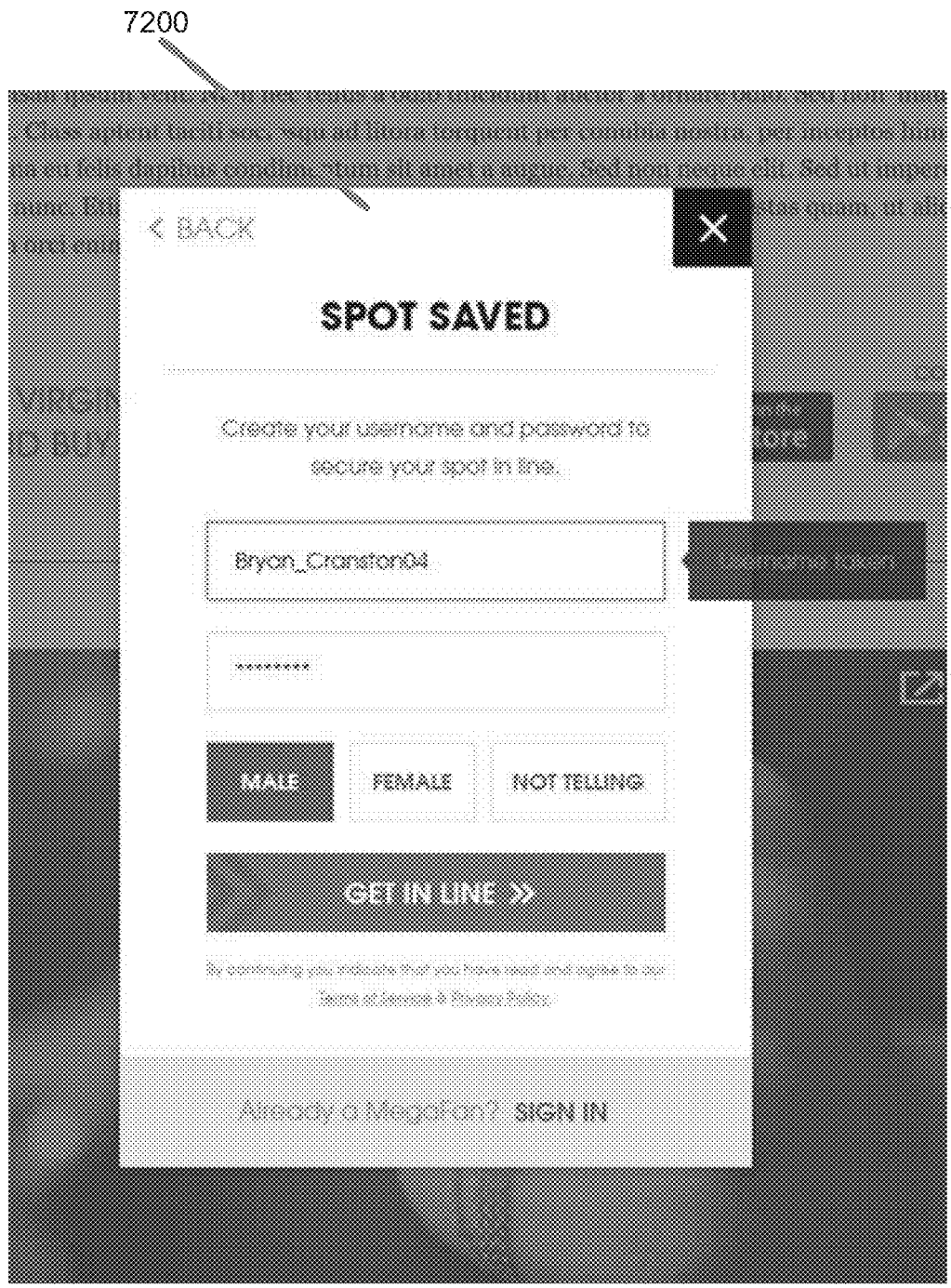
FIG. 72 is an example user interface for creating an account via a webpage.
Figure 73:
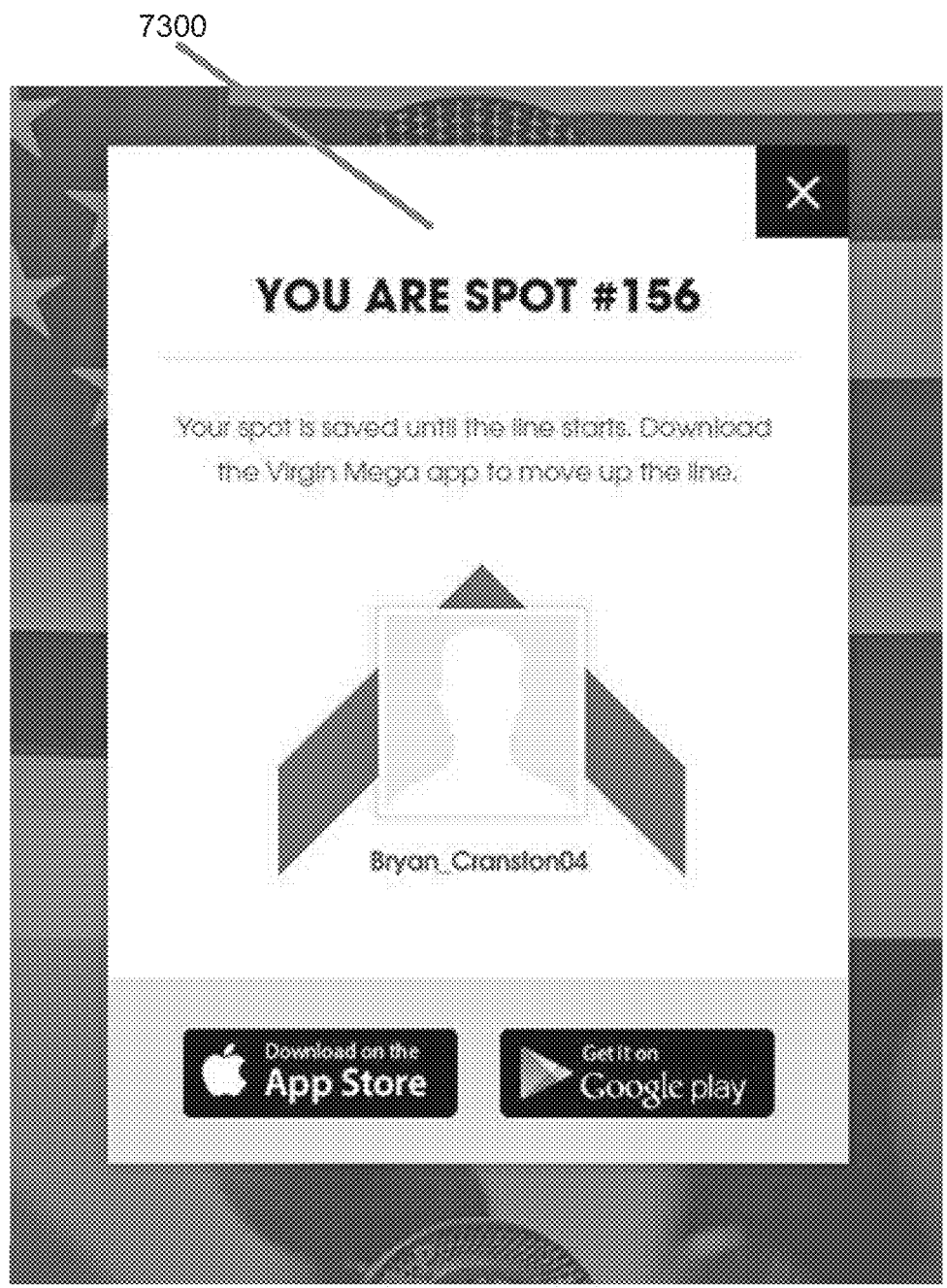
FIG. 73 is an example user interface for confirming a created account via a webpage.

FIG. 71 illustrates one example of a signup page 7100 shown in a webpage. The user may sign up via Facebook, Twitter, Google+, or an email account. Once a user signs up for a virtual line, the user receives a spot in the virtual line. FIG. 72 illustrates an example registration page 7200. The username and password may be automatically imported from the user's Facebook, Twitter, or Google+ account and may be edited before the user gets in line. The webpage 7200 may also receive user information indicating, for example, a user's gender. FIG. 73 illustrates an example confirmation page 7300 that displays the spot number of the new users in a virtual line. The spot in the virtual line may be actively increased via the mobile application, which may be downloaded to a mobile device. The mobile application account of the user may be linked to the account on a webpage and use the same credentials as the account on the webpage. For example, if a user makes an account and registers for a line on a webpage, that user may login to the mobile application using the login information from the webpage. In some embodiments, a user may keep his position in the virtual line by logging in via the webpage or the application.

Cart and Checkout Page

The cart and checkout page and the billing information page allow the user to enter data to effectively buy the hero product. The user has the chance to review all product and billing details entered before submitting an order. For line mode, the cart may have a timer at the product level, meaning any hero product that has a countdown timer is viewable in the cart. If there are satellite products (e.g., non-hero products, third party product offers, etc) in the cart that do not have an associated time, no time is shown.

Order Confirmation Page

At successful submission, the product interface 108 of FIG. 1 displays an Order Confirmation page, indicating to the user that the payment is being processed. If the user did not win the hero product, he receives a consolation prize. The consolation prize may be, for example, an email with a mega discount for the next sale or a "jump" to use at the beginning of the next virtual line so that the user can start off at a better spot.

As discussed above, various embodiments are directed to visualizing a virtual line in which a user, such as the user 104 of FIG. 1, may view an associated current spot in the virtual line, and perform certain interactions to advance the associated current spot within the virtual line.

Figure 50:
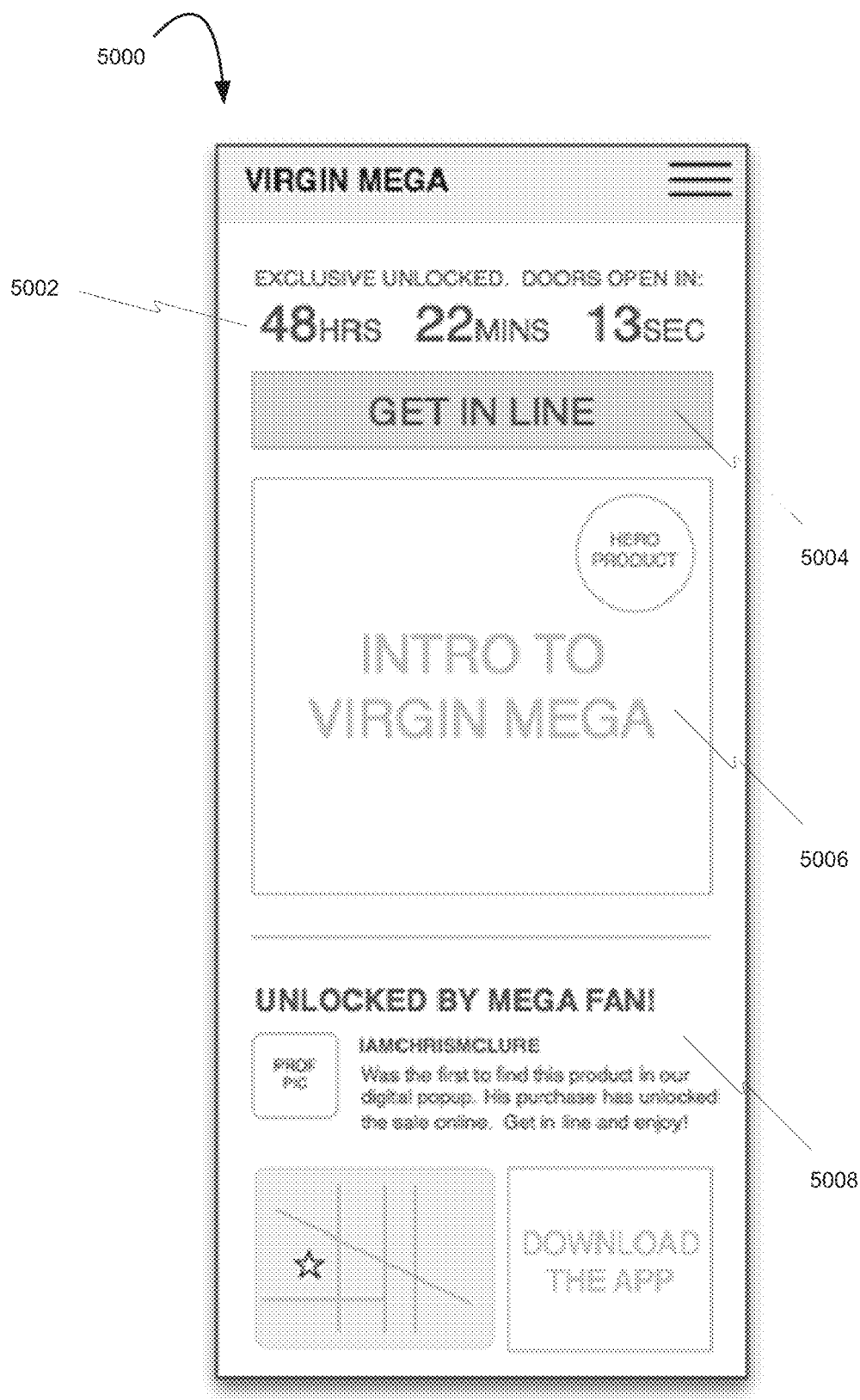
FIG. 50 is an example of a user interface of the eCommerce system.

FIG. 50 is one example of a user interface 5000. In the embodiment shown, the user interface 5000 includes a count-down timer 5002, a "get in line" button 5004, and hero product details 5006. As discussed below, a hero product and its associated virtual line may be unlocked (i.e., opened) based on a user "discovering" a machine readable code or fiducial. These unlock details 5008 may also be visualized in the user interface 5000.

Figure 4:
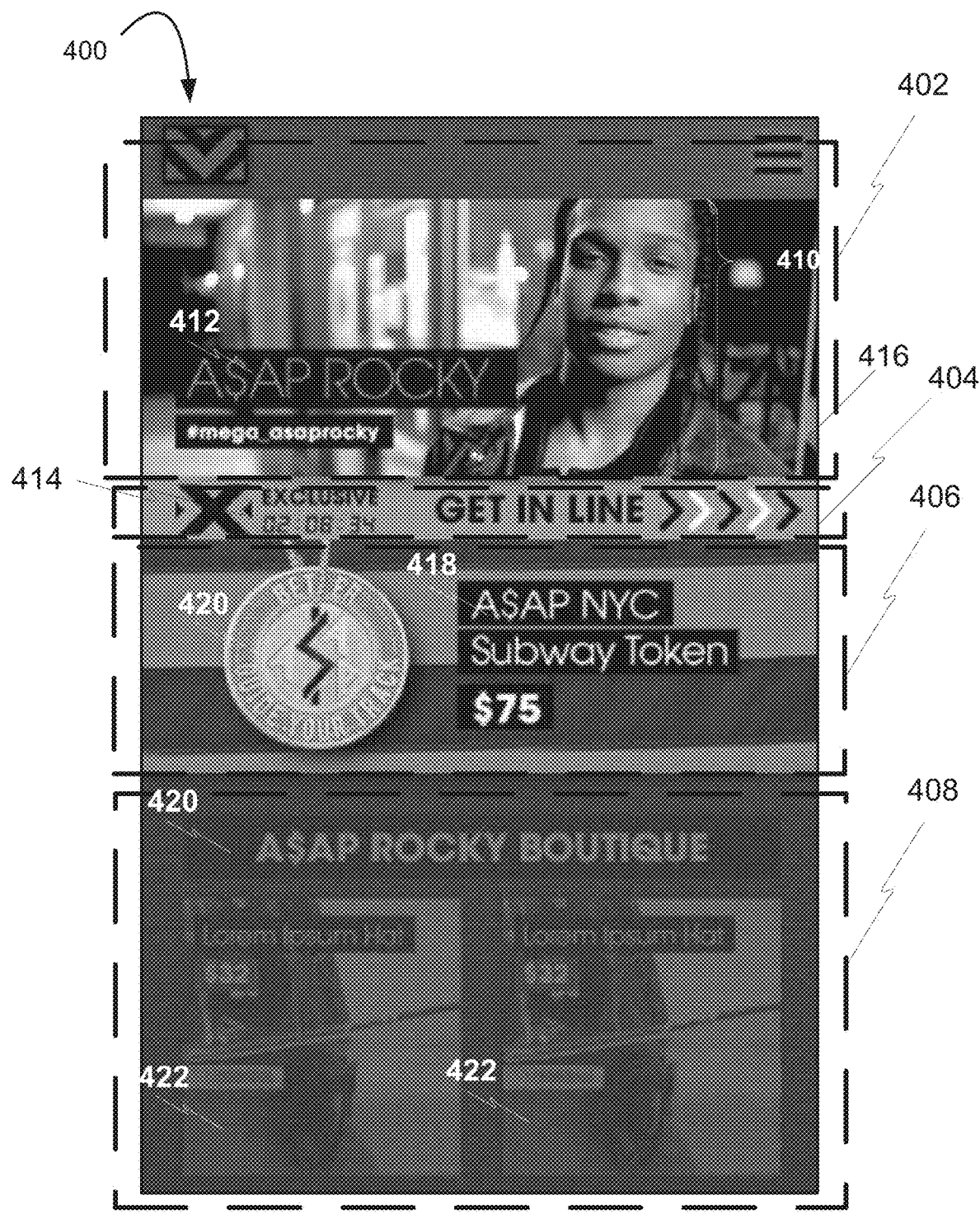
FIG. 4 is an example of a user interface for the eCommerce system.

FIG. 4 is another example of a user interface 400. In one embodiment, the user interface 400 is designed to entice an unregistered user to register with the eCommerce system 100 and to join a virtual line. Similarly, the user interface 400 may entice registered users to join a virtual line. Enticements may include aesthetically pleasing elements that are themed to a particular focus entity. As used herein, a focus entity is any artist, group, or organization on which the eCommerce system 100 is offering a hero product. For instance, a focus entity may be a hip-hop artist in which the eCommerce system 100 schedules a flash sale to offer exclusive products (e.g., a signed jersey).

In the embodiment shown in FIG. 4, the user interface 400 is divided into four regions, a focus entity region 402, a call to action region 404, a hero product information region 406, and a focus entity boutique 408.

In the embodiment shown, Rakim Mayers, better known by his stage name, ASAP Rocky, is a focus entity for the user interface 400. The focus entity region 402 of the user interface 400 is branded with stylized imagery 410 and focus entity information 412. Focus entity information 412 may include the focus entity's name, the focus entity's latest album name, the focus entity's latest single, and a focus entity handle. A focus entity handle may be a hash tag (e.g., a Twitter handle) that identifies a particular focus entity promotion (e.g., a hero product), and enables users to communally interact via chat messages about the promotion. For instance, "tweets" (i.e., text messages with 140 characters or less) from users directed at the hash tag "#mega_asaprocky" would appear in a dedicated Twitter feed for a promotion.

In one embodiment, the call to action region 404 of the user interface 400 includes a count-down clock 414 and a "get in line" button 416. In one embodiment, the count-down timer 414 indicates the amount of time before the virtual line of the hero product begins. For instance, once the count-down clock 414 reaches "00:00:00," the virtual line for the hero product may begin. The "get in line" button 416 is prominently displayed next to the count-down clock 414. The combination of count-down timer 414 and the "get in line" button 416 may be visualized in a manner that is designed to illicit a sense of urgency, expectation, and excitement within a user. In one embodiment, the user interface 400 may add a user to a virtual line in response to receiving an indication that the user has selected the "get in line" button 416.

In one embodiment, the hero product information region 406 includes hero product details 418 and several hero product teaser images 420. In this embodiment, hero product details may include a brief description of what the hero product is and a suggested retail value as well as several alternate images to swipe through to attract the user to "get in line" to purchase the product. For instance, in the shown embodiment, a user would be enticed to "get in line" to have the opportunity to purchase an ASAP NYC Subway Token.

In one embodiment, a user may join the back of a virtual line by selecting the "get in line" button 416.

In one embodiment, the focus entity boutique 408 region may include a boutique title and product offerings.

Figure 5:
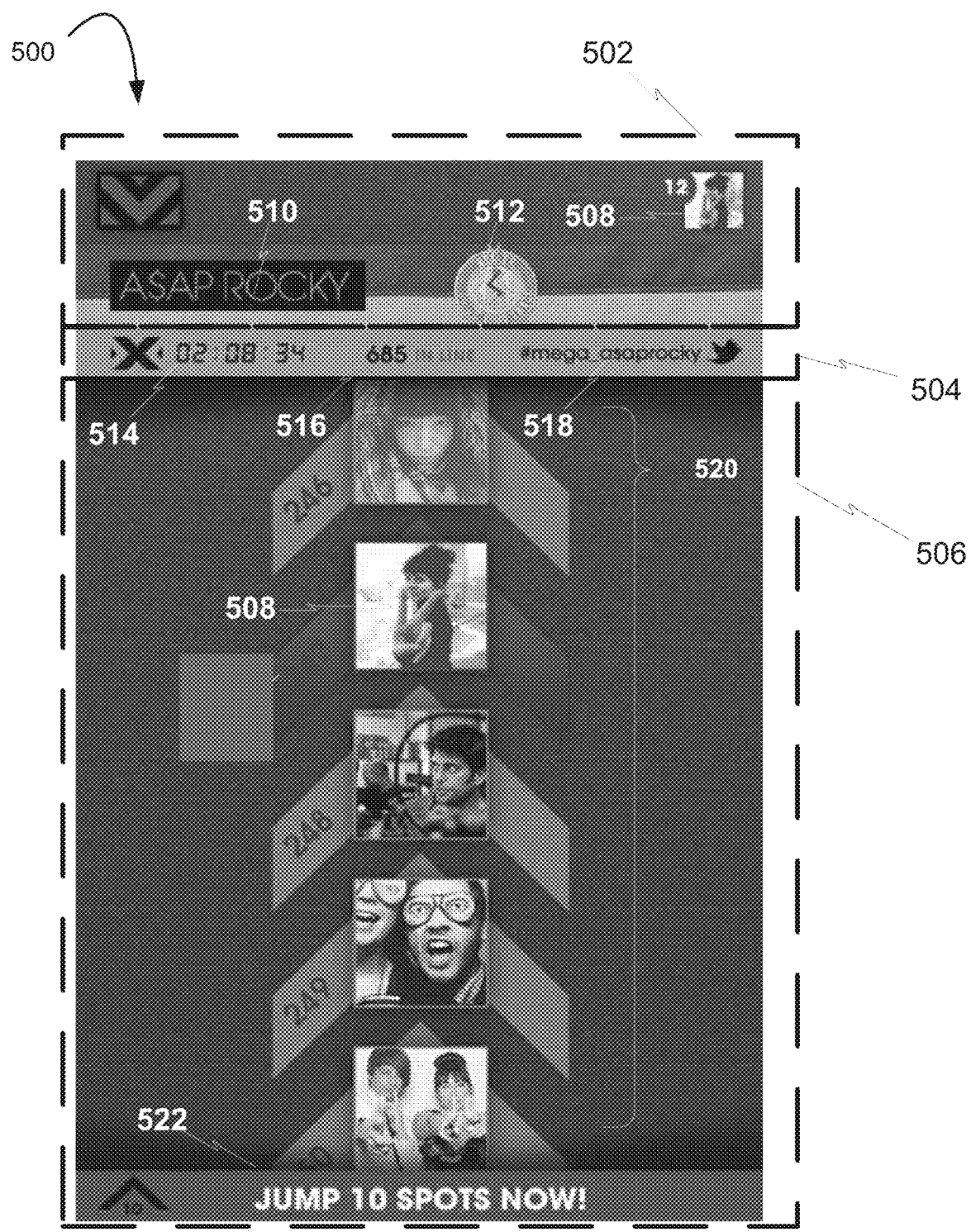
FIG. 5 is one example of a user interface visualizing a virtual line.

FIG. 5 is one example of a user interface 500 presented in a "macro mode" for visualizing a virtual line. As used herein, a "macro mode" may include a "zoomed in" view of a user's position within a virtual line relative to other users waiting in the same virtual line. In one embodiment, the user interface 400 of FIG. 4 may receive user input indicating the user has registered for a virtual line (e.g., selected the "get in line" button 404 of FIG. 4), and may navigate to the user interface 500. In the embodiment shown, the user interface 500 includes a top region 502, a virtual line information region 504, and a virtual line view 506. In some embodiments, a user may scroll the virtual line up or down using touch gestures or other user inputs.

In one embodiment, the top region 502 includes a representation of a user profile 508, a focus entity representation 510, and a hero product representation 512.

In one embodiment, the virtual line information region 504 includes a count-down timer 514, a virtual line position indicator 516, and a hash tag indicator 518.

In one embodiment, the virtual line view 506 includes a plurality of users (shown by their social media profile pictures) 520 visualized in a descending order. In various embodiments, the closer a user is to the number 1 spot at the end of a hero product promotion (e.g., when the count-down timer 514 reaches zero), the more likely the user is to have the opportunity to purchase the hero product. In the embodiment shown in FIG. 5, the user may be registered with the eCommerce system 100 of FIG. 1 and may be represented in the virtual line by a profile picture, such as the user profile picture 508. In this embodiment, the user profile picture 508 is positioned relative to an associated spot in the virtual line. For instance, in the embodiment shown, the user is visualized in position 247 in a virtual line totaling 685 people. In various embodiments, a virtual line may be created with a maximum capacity. For instance, a virtual line may have only a few hundred spots. In this instance, a wait list may be joined for a virtual line.

As discussed above, a user may advance their position within the virtual line through social interactions, and other activities. In the embodiment shown, a "jump 10 spots now!" button 522 is visualized at the bottom of the user interface 500. The user interface 500 may communicate with the eCommerce system 100 to provide one or more missions for a user to complete to advance his spot within the virtual line.

Figure 6:
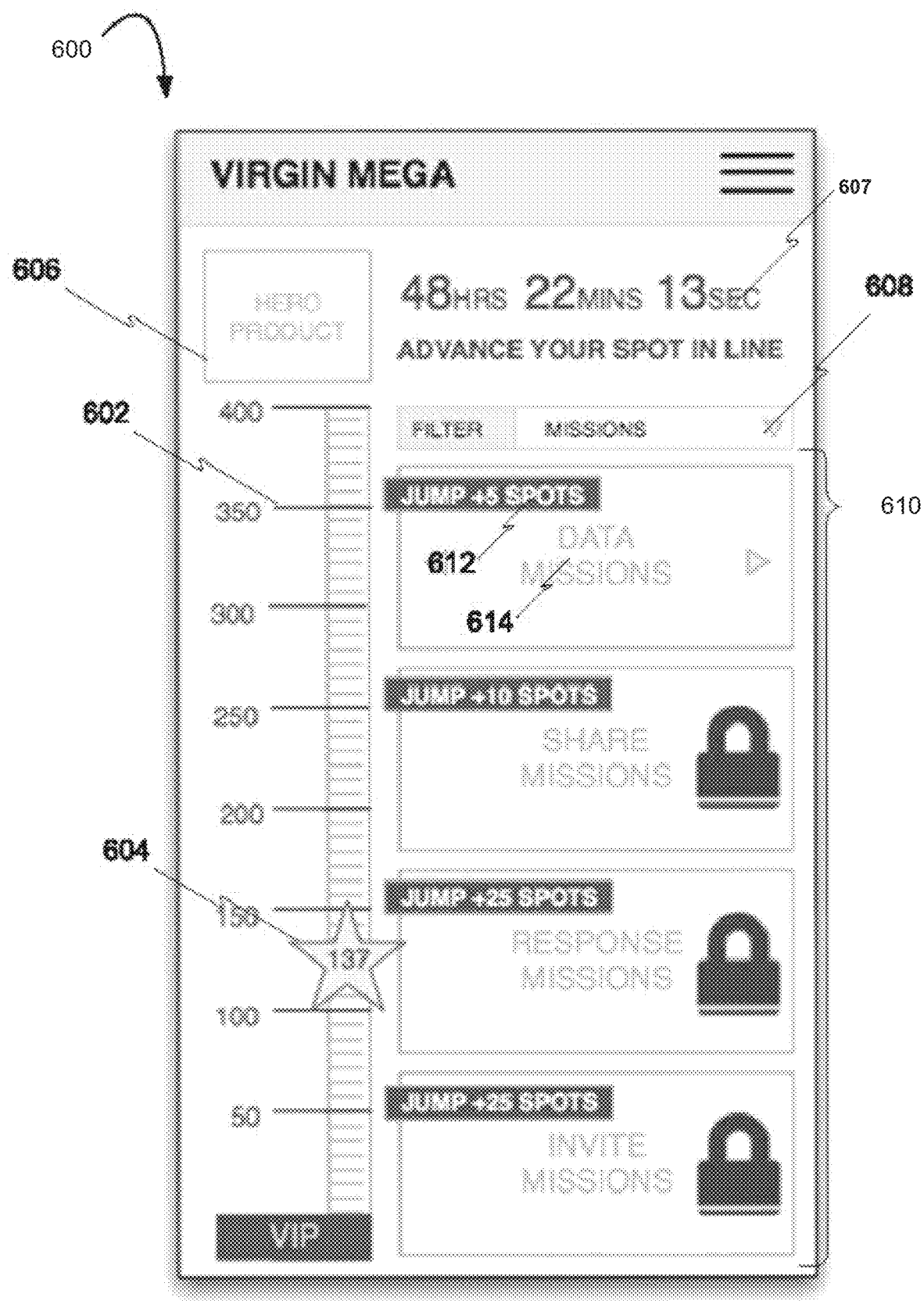
FIG. 6 is another example of a user interface visualizing a virtual line.

FIG. 6 is one example of a user interface 600 presented in a "mega mode" for visualizing a virtual line. As used herein, a "mega mode" may include a "zoomed out" or "bird's eye"

view of a user's position within a virtual line relative to other users waiting in the same virtual line. The user interface 600 includes a virtual line representation 602, a current spot indicator 604, a hero product teaser image 606, a countdown timer 607, a "call to action" filter 608, and a plurality of mission tiles 610 to "swipe" through. Each mission tile includes a mission title 612 and mission details 614.

Figure 57:
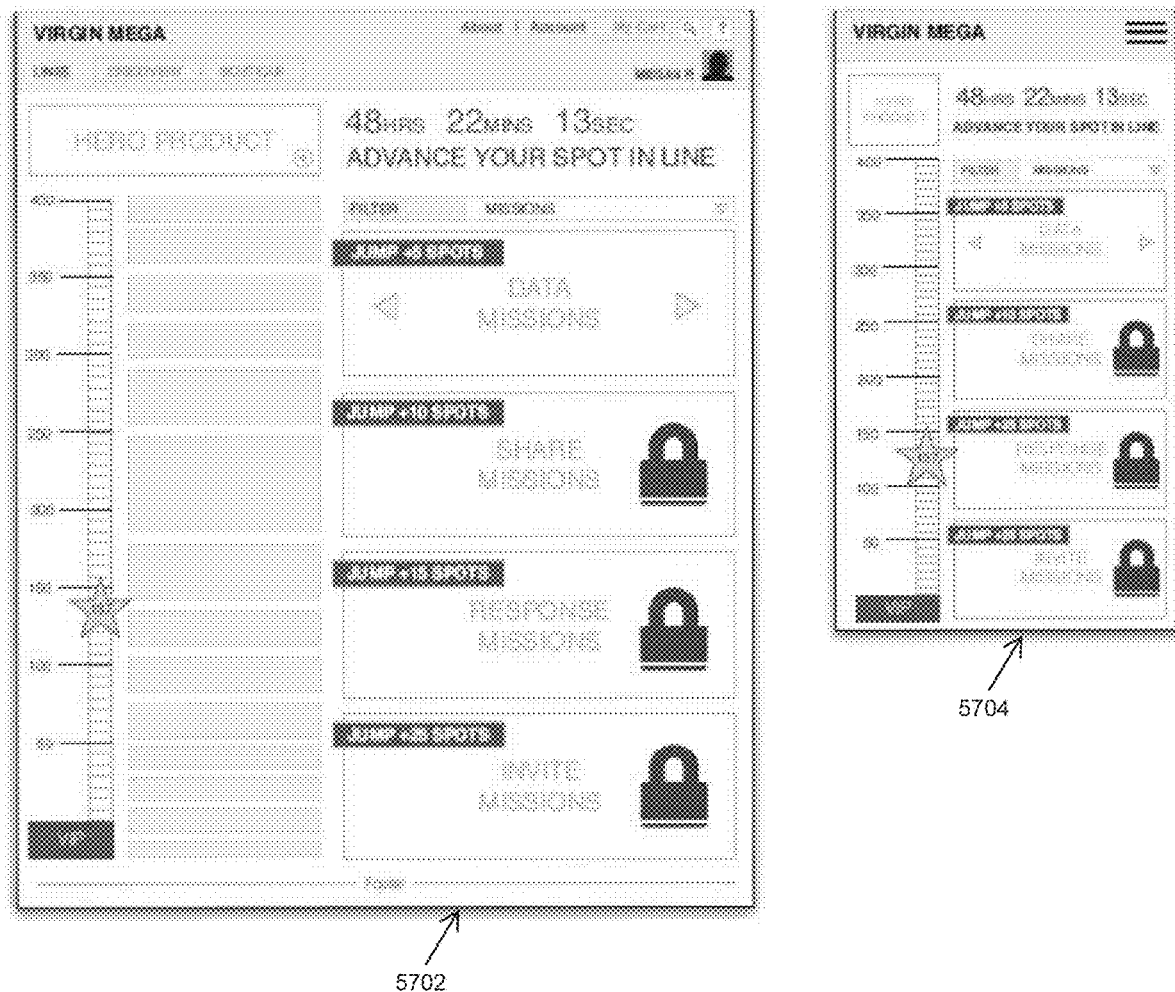
FIG. 57 is one example of a plurality of user interfaces illustrating a plurality of line-mode views.

FIG. 57 illustrates a plurality of additional examples of the view of the "mega mode" view of FIG. 6. In the embodiment of FIG. 57, a wide-view 5702 (e.g., for a tablet or web) is illustrated next to an abbreviated view 5704 (e.g., for a mobile phone).

In the embodiment shown in FIG. 6, the virtual line is shown in an ascending order. The current spot indicator 604 visualizes a user's present position in the virtual line. In one embodiment, a user achieving a position in the first fifty spots may qualify for an opportunity to purchase the hero product. In other embodiments, only a user in the very top spot (e.g., spot 1) will qualify for an opportunity to purchase the hero product.

In one embodiment, the user interface 500 may receive user input indicating that a user wishes to advance his position in the virtual line (e.g., by a user clicking on a mission tile). In this embodiment, the user interface 500 may navigate to one or more user interface screens visualize one or missions.

Figure 7:
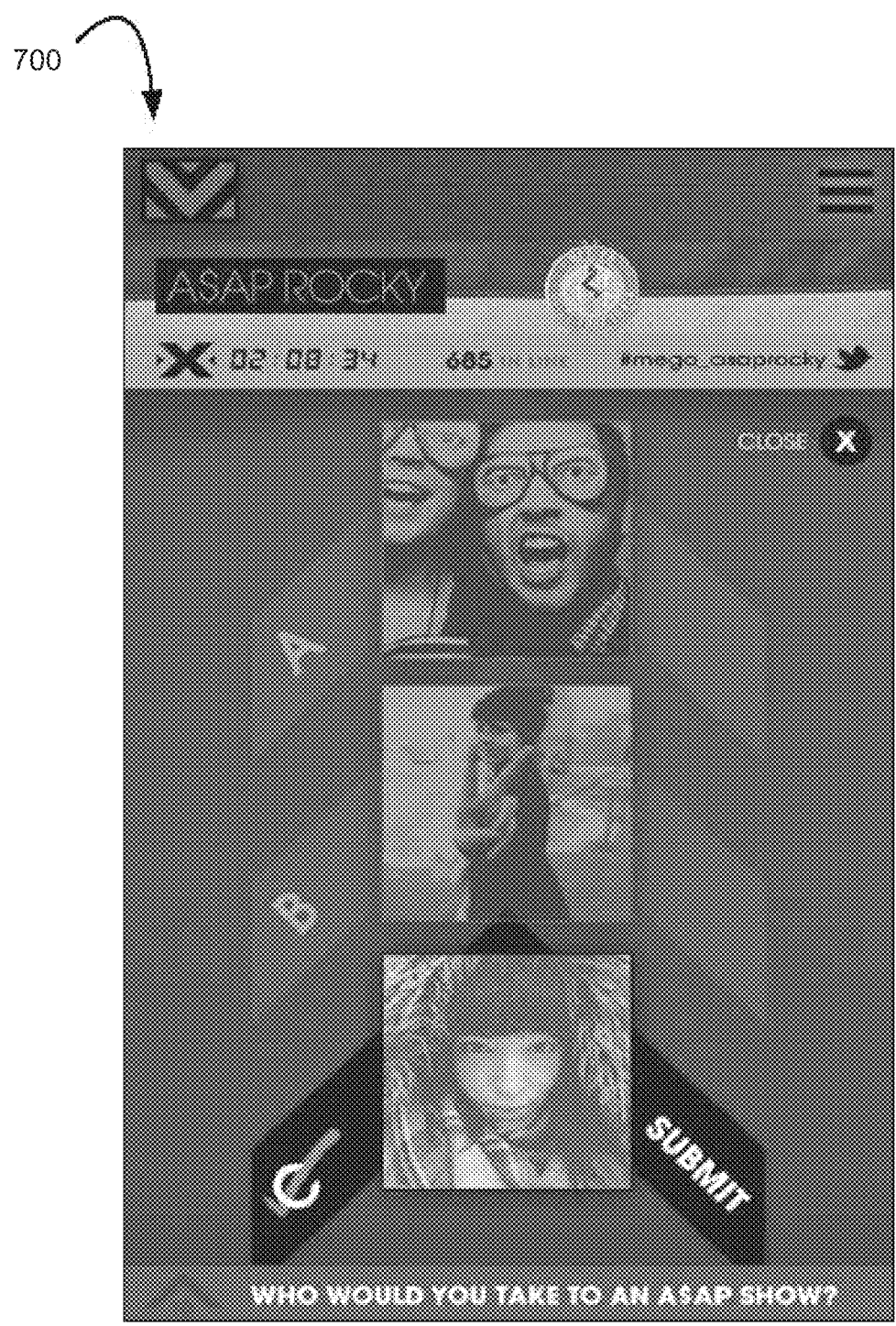
FIG. 7 is an example of a user interface visualizing a mission.
Figure 8:
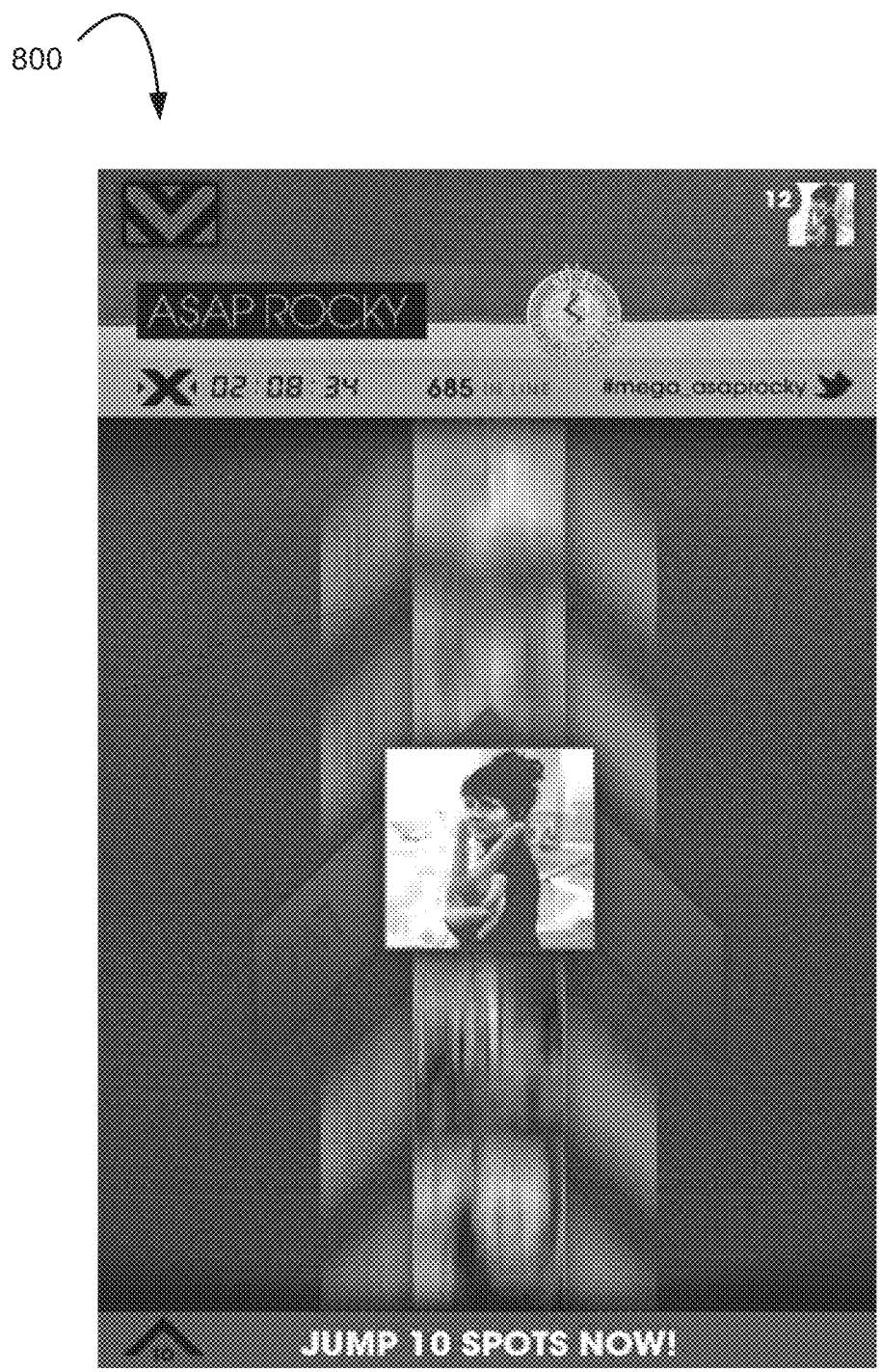
FIG. 8 is an example of a user interface visualizing virtual line animations.

Referring now to FIG. 7, one example mission user interface screen 700 is shown. In one embodiment, a mission may include performing a challenge. FIGS. 27 and 37 illustrate additional examples of user interfaces configured in a mission-mode. In the embodiments shown, a user may be presented with a challenge that includes answering a prompt. For instance, a user may be required to select a profile of another user whom the user would prefer to take to a particular show. In this instance, the user and the other user both receive an award. Awards may include advancing both of the user's positions further up in the virtual line (e.g., the number of jumps indicated by the mission tile) or offers to buy satellite products. In one embodiment, both of the users receive an identical award. In another embodiment, both users are invited to interact with each other to deliver, for example, a virtual "high-five," "wink," or a congratulatory notification message to each other.

Figure 44:
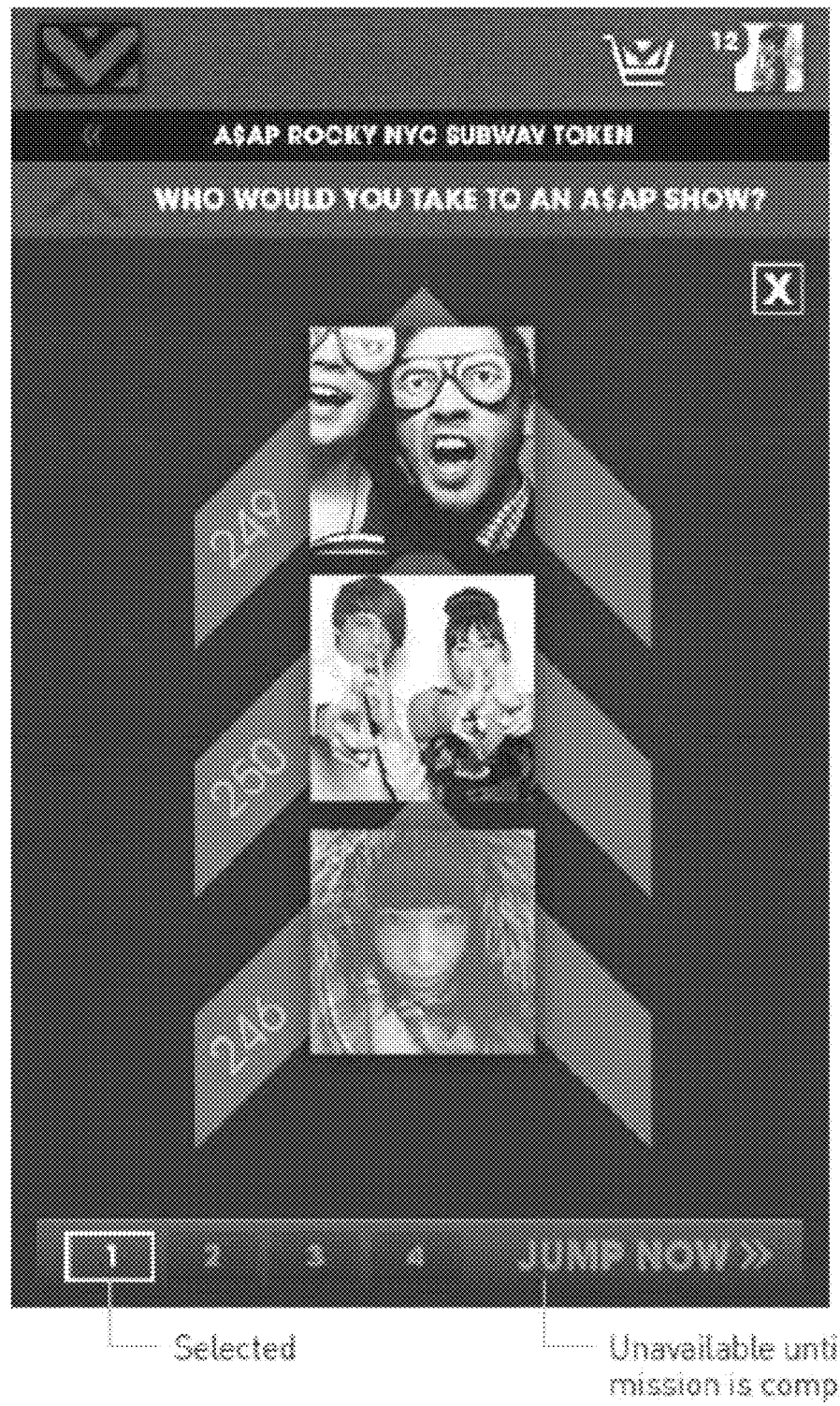
FIG. 44 is one example of a user interface visualizing a mission navigation view.
Figure 45:
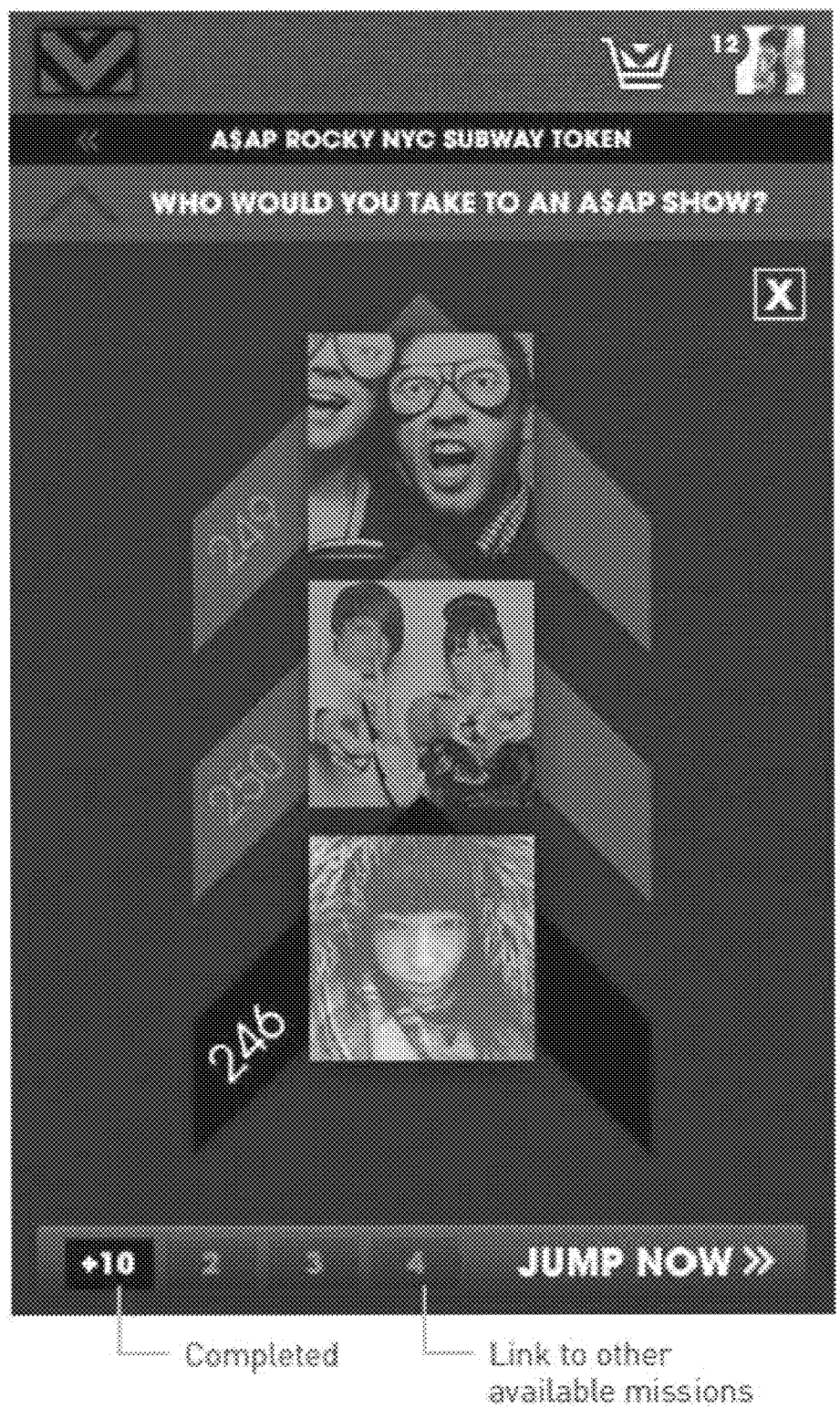
FIG. 45 is another example of a user interface visualizing a mission navigation view.

FIG. 44 illustrates a mission navigation view. In the embodiment shown, a mission selector (e.g., boxes 1-4) allows a user to perform a series of missions. In one embodiment, completing all 4 missions enables a user to "Jump Now" to claim a new position in a virtual line. In other embodiments, each time a user completes a mission the user may claim a predetermined number of jumps. For example, FIG. 45 illustrates a mission progress view. In the embodiment shown, a user has completed one of the four missions. In this embodiment, the user may claim the 10 jumps by selecting the "jump now" button.

Figure 68:
FIG. 68 is another example of a user interface visualizing a virtual line.

In some embodiments, the mobile client may provide a user interface including a prize wheel in response to a user completing a mission. FIG. 68 illustrates one example of a prize wheel according to these embodiments. As shown in FIG. 68, when executing according to this configuration, the mobile client "spins" the prize wheel in response to receiving input (e.g. a swipe) indicating the user wishes to spin the prize wheel. After completing the spin animation, the mobile client displays a number of spots awarded via the "spin" (e.g., a number of spots calculated using a pseudo-random number generator). The system may move the user forward the number of spots awarded responsive to "jump now."

Figure 46:
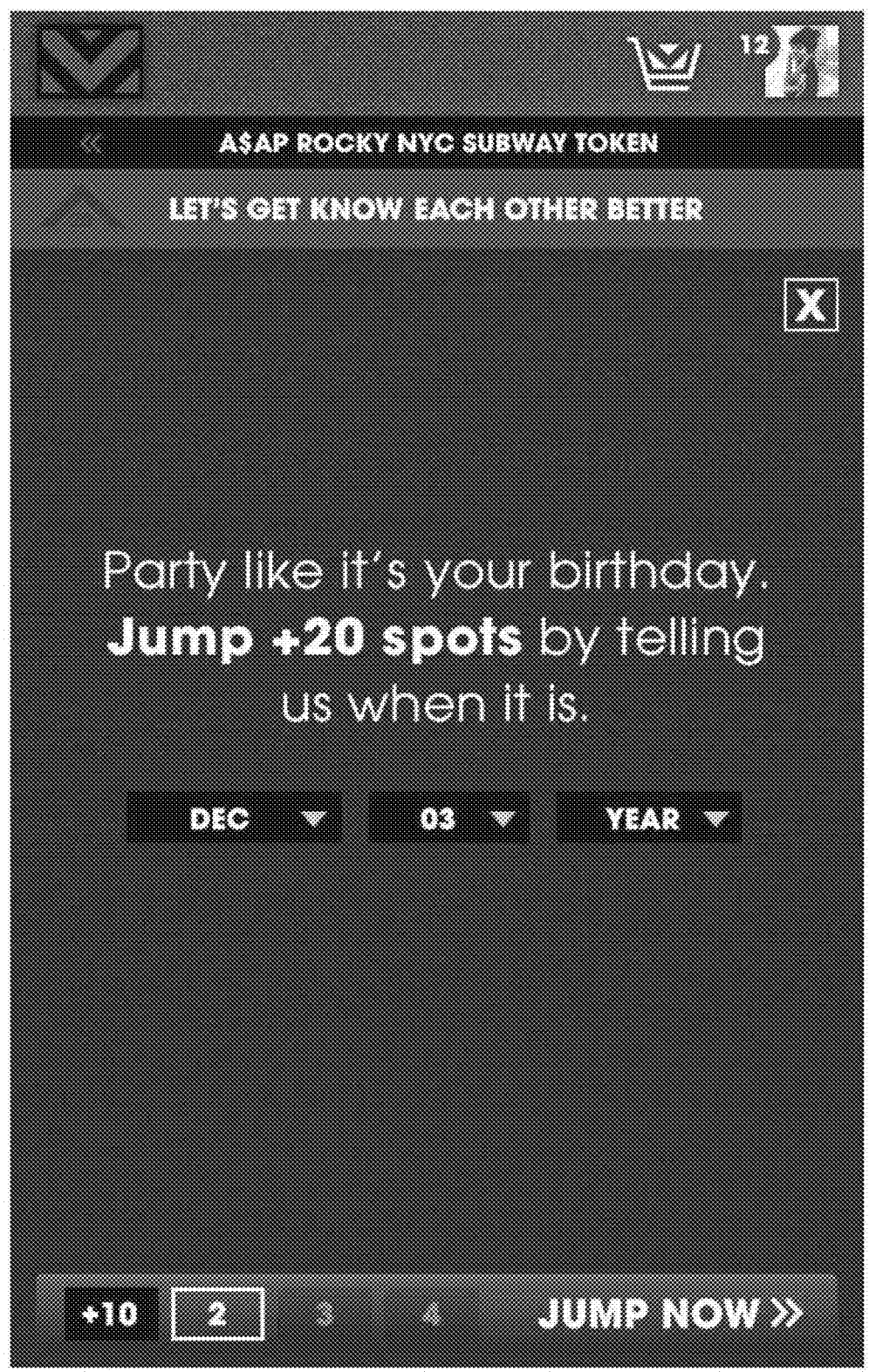
FIG. 46 is another example of a user interface visualizing a mission navigation view.
Figure 47:
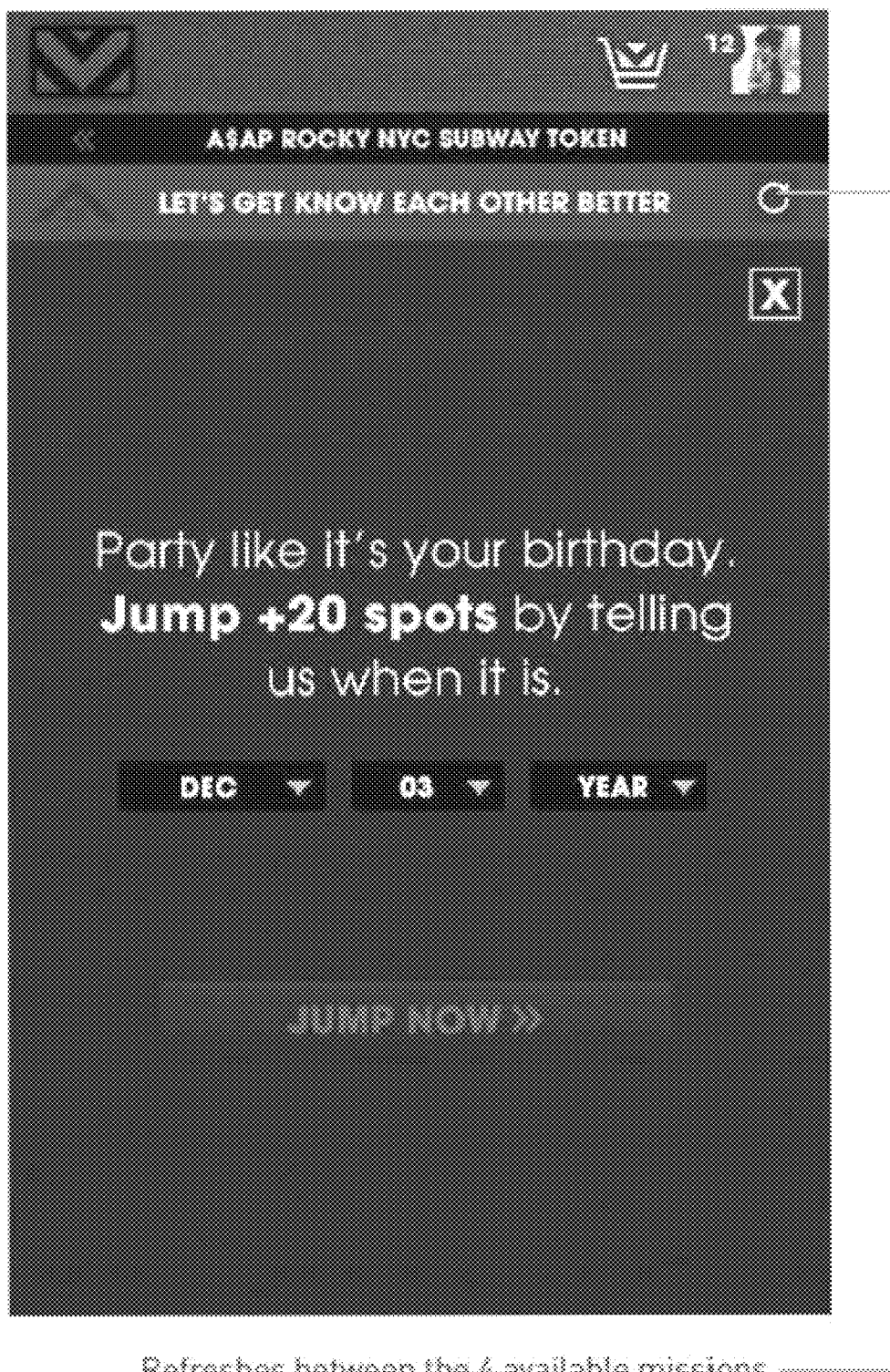
FIG. 47 is another example of a user interface visualizing a mission navigation view.

FIG. 46 illustrates another mission view. In this embodiment, a user is invited to divulge his birthday to complete a mission. FIG. 47 illustrates another mission view where a user is invited to divulge his birthday to complete the mission. However, if a user does not want to divulge his birthday, the refresh button may be clicked to display an alternative mission. In one embodiment, the eCommerce system 100 may store the birth date in the user's profile. In at least one embodiment, products may be targeted to a user (e.g., as Easter eggs in a virtual line) based on his birth date.

In one embodiment, the eCommerce system 100 tracks mission statistics and other general statistics based on activities performed while in a virtual line. These statistics include, for example, largest number of jumps in one sale, number of times a user gifts his current position, history of the largest amount of jumps per hero promotion, "hype" score (e.g., how often other users pick a user to complete missions), "Jump IQ." Jump IQ, as used herein, is defined as a total number of spots a user jumps across all hero promotions) and earned badges. Earned badges may signify, for example, that a user has reviewed products, or has participated in a particular number of hero promotions. In one embodiment, one or more statistics may be private or publically viewable by all users.

In one embodiment, a user may "peek" at his current position in the virtual line. For instance, a user may select and drag his profile image 508 of FIG. 5 slightly to the left or right of the virtual line 520. In this embodiment, the user interface 500 may provide statistics related to the user's current position. Statistics may include, for example, a number of spaces in front of the user, a number of spaces behind the user, a probability of claiming a hero product based on the user's current position, and a hint on how to advance forward in the virtual line.

Magic Spots

Figure 67:
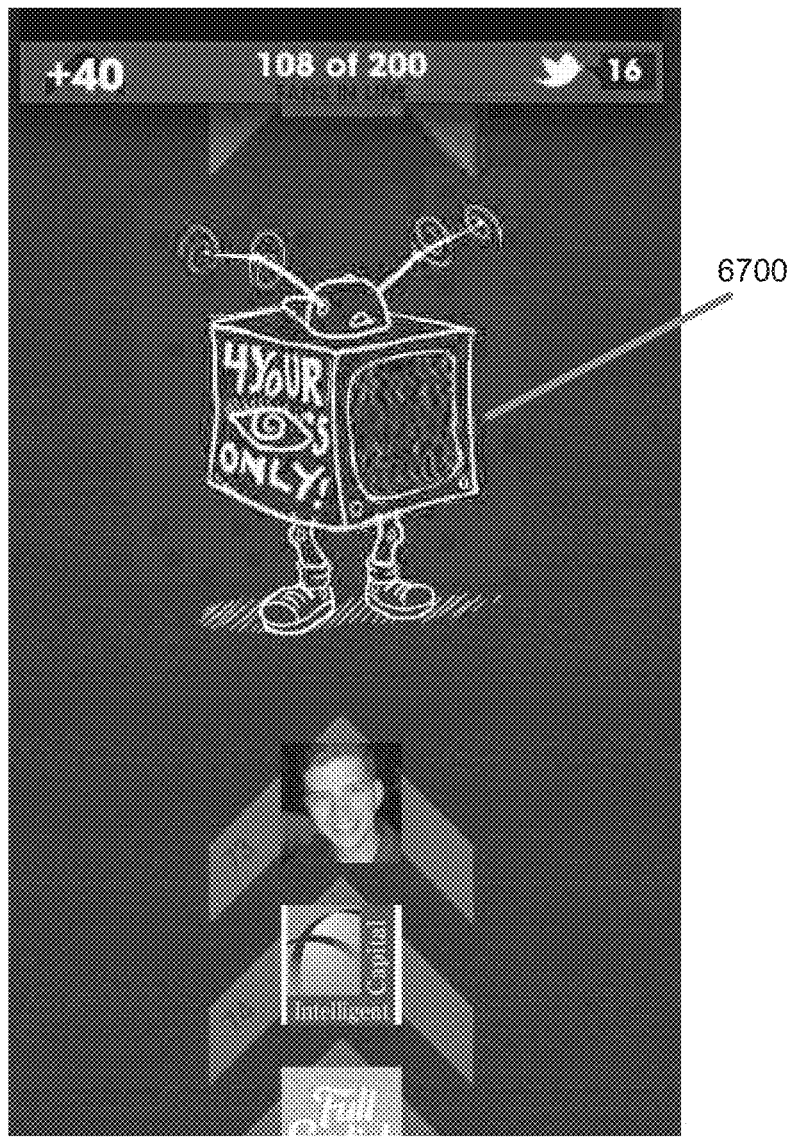
FIG. 67 is another example of a user interface visualizing a virtual line.

Once the hero product promotion starts, the virtual line may always appear moving. Animations visualize the virtual line changing as users are pushed forward and backward depending on how they approach missions. Along with the virtual line movements, users may constantly discover new products. For example, users may discover magic spots. Magic spots are a type of Easter egg that users discover by scanning the virtual line in macro mode. A magic spot may be a hidden spot that a user finds on the virtual line. A magic spot can be the Focus Entity's avatar or simply a spot that reads, "You've found a Magic Spot! Tap the space to move here now!" Magic spots can unlock secret rewards (e.g., free concert tickets, exclusive merchandise, music videos, etc) or missions. For example, in one embodiment illustrated in FIG. 67, the virtual line includes a magic spot 6700. In this embodiment, when the magic spot 6700 is selected via user input, a video is unlocked and may be viewed by the user.

Live Sale

While the hero product promotion goes live, users complete missions as they attempt to move closer to the front of the virtual line. Batches of hero products may be released at random intervals during the last few hours (e.g., 12 hours) of the sale and eligible users may have minutes (e.g., 10 minutes) to complete the purchase. In addition, users may be shown various satellite product (e.g., third-party offers, and non-hero products) to purchase during gameplay. Since users may buy the product at random intervals of time, the application may save bandwidth and cause the checkout process to go by faster than it would if all of the eligible users bought the item at once.

Once the hero promotion starts, users are able to view portions of the virtual line in various ways (e.g., Macro Mode). Products may be scattered every X spots (e.g. 30 spots) so that the user discovers them as he scans through the virtual line. Products may repeat. Products may appear in much the same way as User Profile avatars but with a different visual treatment. Users may see the product image, price, and jump value on the front of the image. Flipping the image over by tapping on it may switch to boutique mode, reveal details of the product, allow the user to add the product to a cart.

Figure 64:
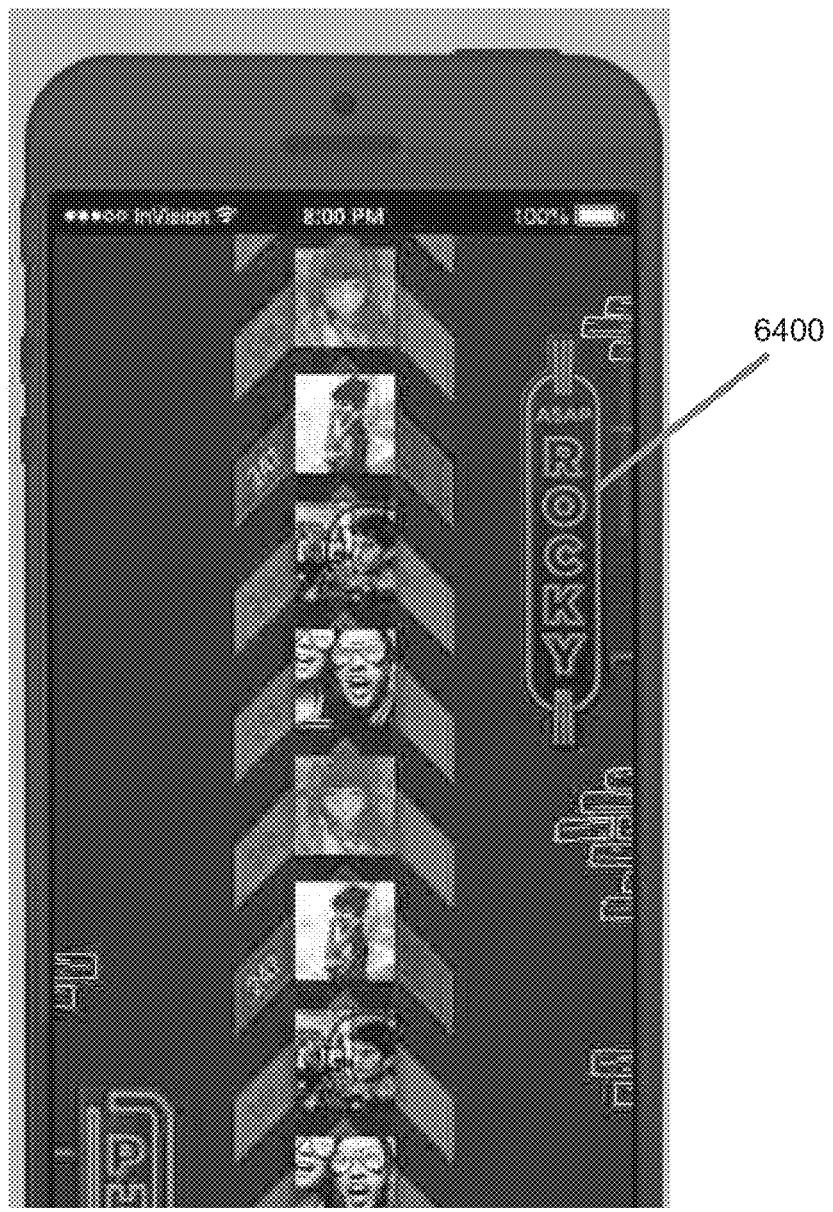
FIG. 64 is another example of a user interface visualizing a virtual line.

In some embodiments, a mobile client may implement a user interface such as the user interface illustrated in FIG. 64. As shown in FIG. 64, when executing according to this embodiment, the mobile client provides a user interface that includes a bodega element 6400. In this embodiment, the mobile client may receive input (e.g., a tap) selecting the bodega element 6400. In response to receiving input selecting the bodega element 6400, the mobile client enters boutique mode and provides users with the ability to purchase a variety of products. These products may include hero products and non-hero products (e.g., satellite products).

Line Navigation

In one embodiment, the application may allow a user to change his view of the virtual line by navigating, filtering, and sorting the other people in line without actually moving out of his spot. Multiple modes that provide different views are available both before a virtual line starts and during a live sale (e.g., after a countdown expires).

One mode is Social Mode, wherein the application displays a user's friends from any connected social network highlighted in a different color on the virtual line. The user may view his friends via an input on, for example, a button. The application may also display other users who interacted with the user in a current or previous line.

Another mode is Artist Mode, wherein the application may display celebrities and VIPs in a gold outline. The user may see if any celebrities are in line. Once a mode changes, there may be a control that allows a user to navigate back to his spot in line after scrolling away from it to view other participants.

Another mode is User Content Mode, wherein the application may allow a user to filter the line to display, for example, only users who have posted user generated content to the line.

In some examples, a line is in "Tailgate Mode" from when the line begins to one hour before the line ends. In this mode, users may join the line and periodically complete missions and jump in line. During the last hour of a line, the line may enter Frenzy Mode, wherein the application generates and displays a checklist of missions to gain jumps for higher spots. For example, the application may display a mission to invite four friends to a line to receive two jumps for every jump used. In some examples, users may jump every five minutes in Frenzy Mode.

Line Interactions

In some embodiments, the application may allow a user to add user generated content to a virtual line. This feature allows a user to post an image, audio clip, video clip, or URL to his spot in line. The line may also include a direct chat feature that allows a user to chat directly with other users in a line without leaving his spot. The application may display a control that allows users to chat with other users.

After interacting with another user, the application may display an option to follow the user. The application may allow a user to follow another user within the application or on any social media system, including Instagram, Facebook, Twitter, Google+, and Snapchat.

Further, if a user does not interact with the line for a period of time (e.g., twice a day), that user may be removed from the line. In some embodiments, users may gain and lose spots in line based on activity. If a user is more active, he may move spots up past users who are less active. In some examples, users may receive push notifications for a quest to complete in order to keep a position in line. The quest may have an associated time to expire (e.g., 12 hours) and after the time has elapsed the users who did not complete the quest may be placed behind users who completed the quest on the line.

Interactive Line Advertising

Figure 74:
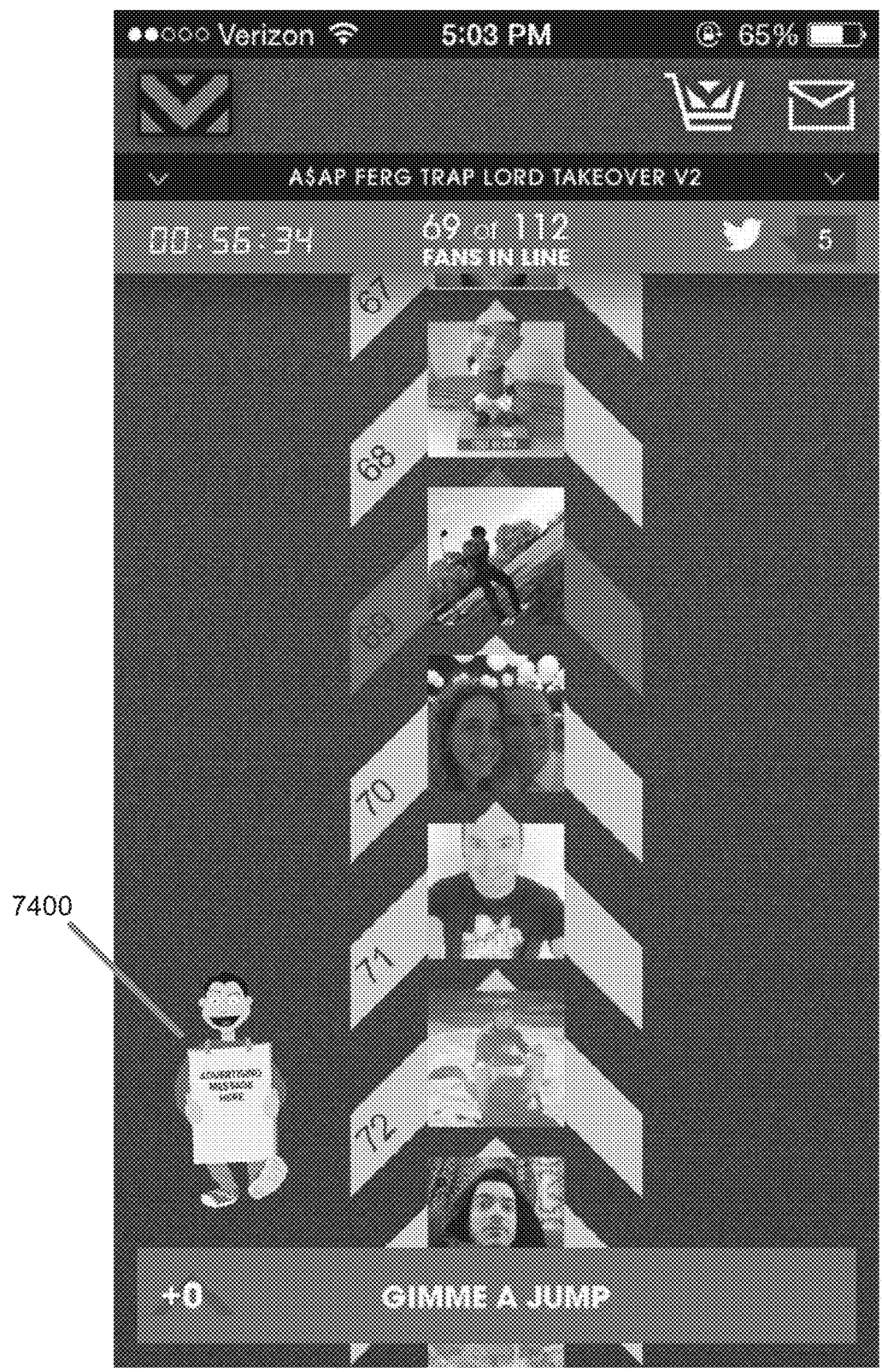
FIG. 74 is an example of a user interface visualizing a virtual line with an advertisement.
Figure 75A:
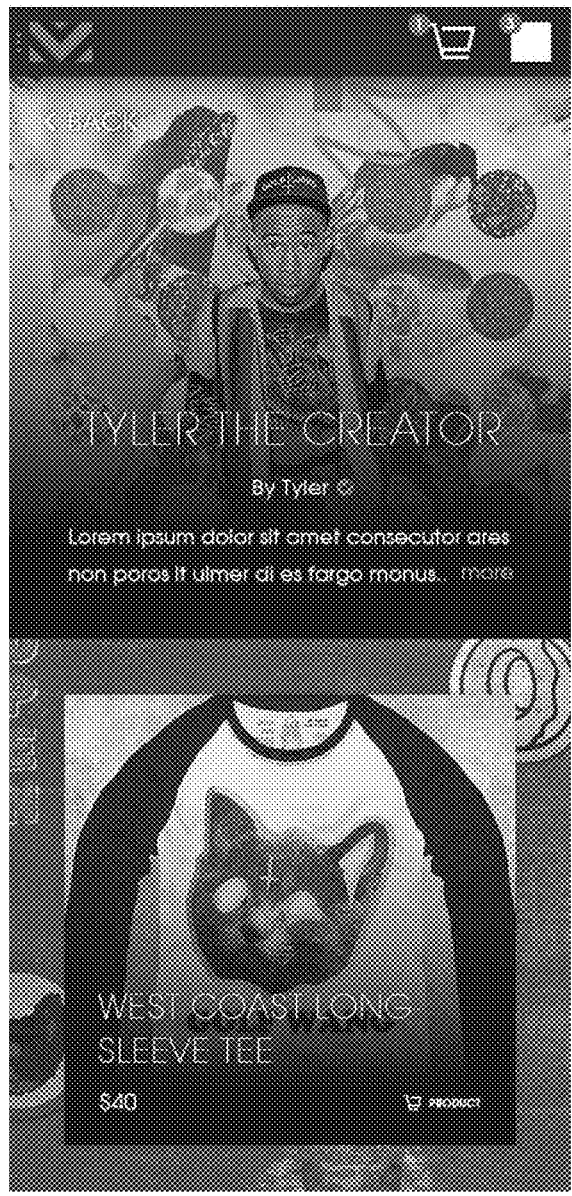
FIGS. 75A-75B is another example of a user interface visualizing a bodega.
Figure 75B:
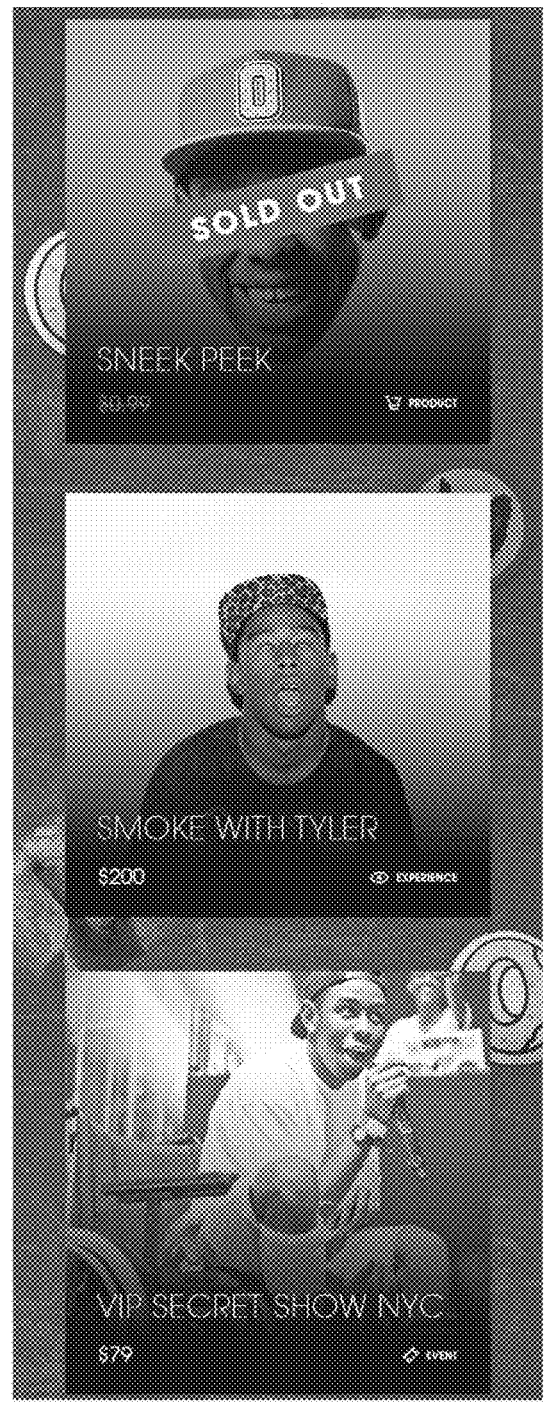
Figure 76A:
FIGS. 76A-76B is another example of a user interface visualizing a bodega.
Figure 76B:
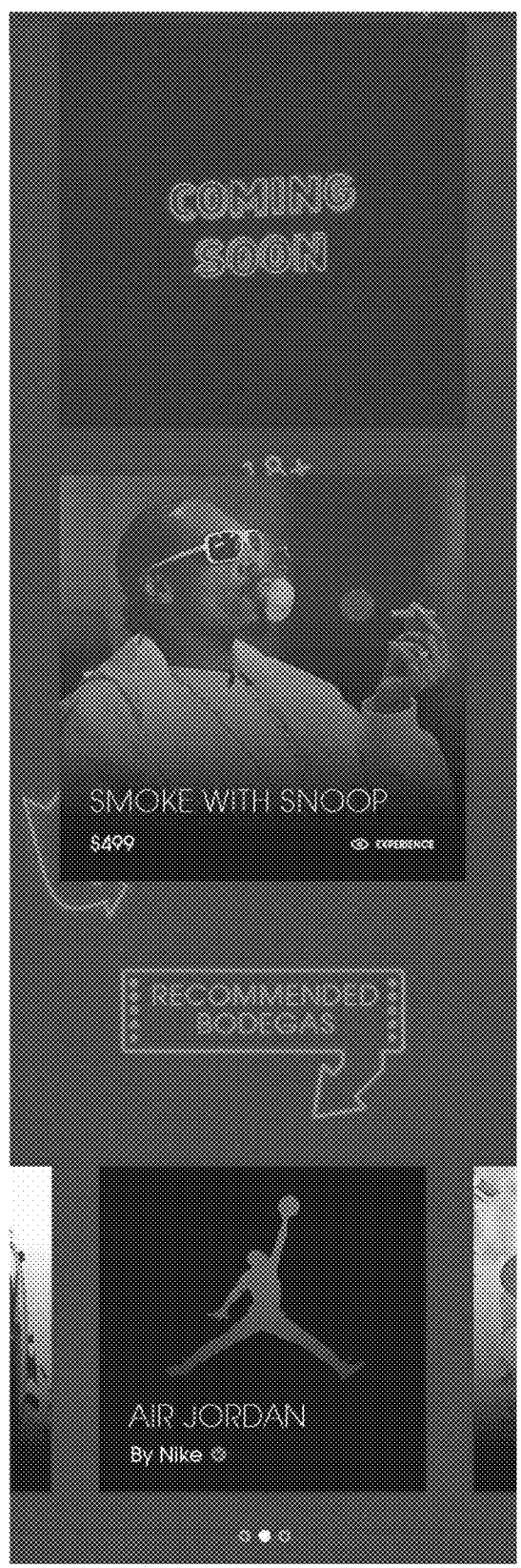

FIG. 74 illustrates an example advertisement 7400 displayed by the application next to a line. The advertising message may be related to a magic spot, another line, or a third party. The advertisement may be created using an animated GIF that moves vertically up and down the left side of the line. As shown in FIG. 74, an example advertisement may include a man wearing a sandwich board that includes a message from a brand or sponsor. The application may include a control on the GIF such that, when clicked, the application displays a window with the advertiser's message, promo code, or video. Any number of advertisements may roam the line at any given time.

Line Currency

In various embodiments, the application may include an in-app currency system called "props." The application rewards users for good community behavior and line participation with props. After accumulating a certain number of props over a single line or multiple lines, a user may exchange props in bulk for a corresponding number of jumps in line. The application may display the value of the props in terms of how many jumps in the line can be allowed for how many props at any given time. These jumps may be used in any line in which the user has a spot. According to some implementations, props may be used in exchange for a spot in line. For example, a user may bargain and trade props with another user to exchange spots in a line.

End of Sale

In one embodiment, at the conclusion of a hero sale, the final batch of product is released to a percentage of the first users in line (based on the quantity of available product). In this embodiment, if there is a product that isn't claimed in the allotted time, the next group of users is notified that they are eligible to claim the prize until it is sold out. Additionally, an email may be generated and sent to all users still in line indicating that the sale has ended and teasing the next hero product sale.

According to some implementations, the distribution of a hero product at the end of a virtual line promotion may occur in two or more rounds. The first round of distributions may be determined by a formula using the sum of the available inventory of the hero product and a variable percentage (i.e., a sell rate). The second round of distribution may use a formula using the sell rate from the first round multiplied by the number of leftover hero products from the first round. This way, the second round may have a higher number of items if users in the first round did not buy many hero products, and the second round may have a lower number of items available if many users in round one purchased the hero product. For example, if there are 100 units of a hero product and the predicted sell rate is 50%, the application offers the hero product to 200 users (a first round of users) for ten minutes. If the first round of users buys 25 units within the first ten minutes, the second round of users may receive an opportunity to buy the hero product ten minutes after the first round of users. The second round of users may consist of the next 100 users (based on the same sell through rate of 50%). In other implementations, the sell through rate may update each round based on the results of the round. According to some aspects, as a user from the first round purchases a hero product, a user from the second round receives access to a hero product in a bodega. According to these implementations, users who receive access to the bodega may receive a message warning that they may not have a chance to purchase specific hero products if they are sold out quickly.

Figure 48:
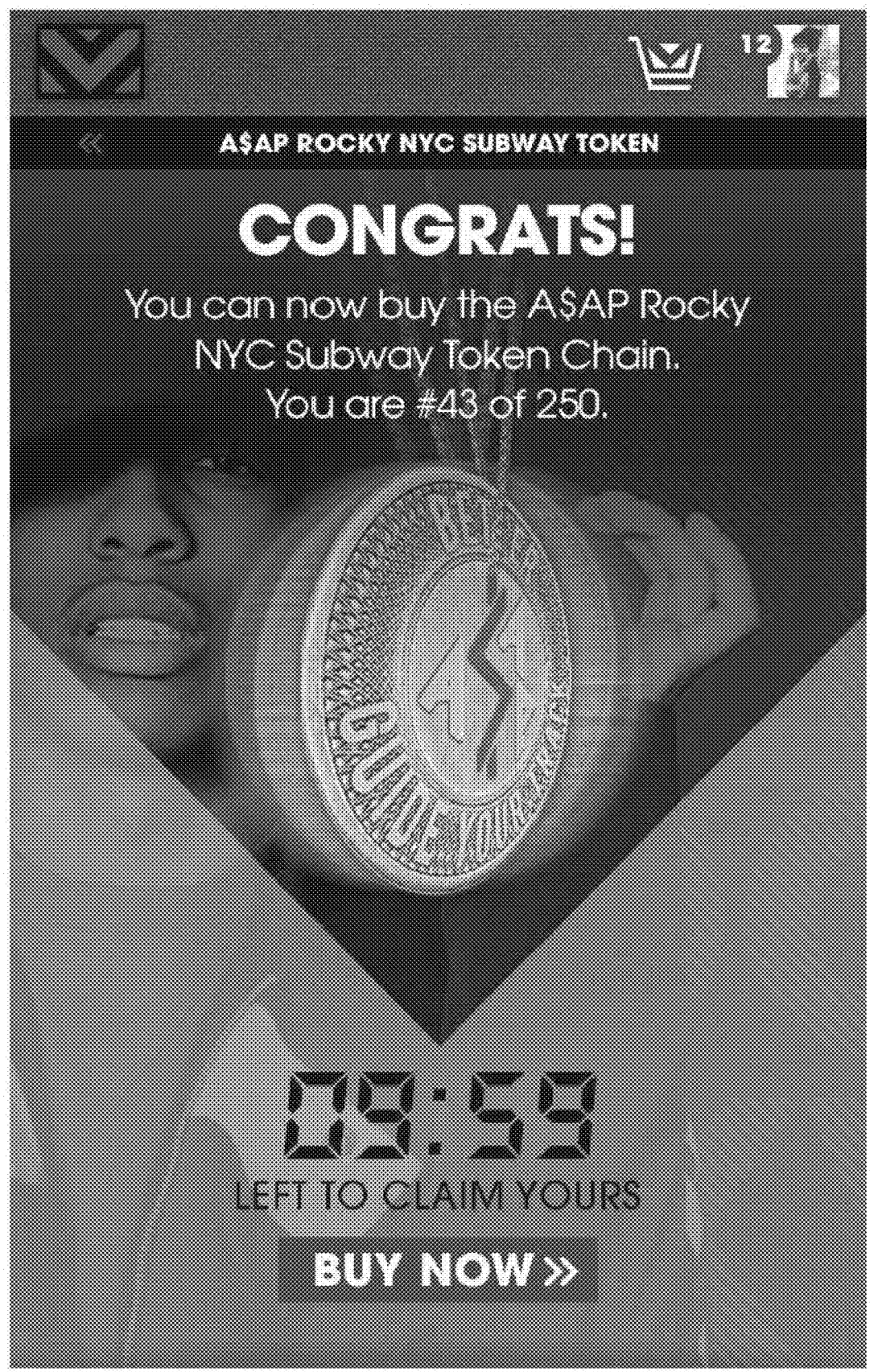
FIG. 48 is one example of a user interface visualizing an end of sale view.

FIG. 48 illustrates an end of sale view wherein a user has won an opportunity to purchase a hero product.

Figure 49:
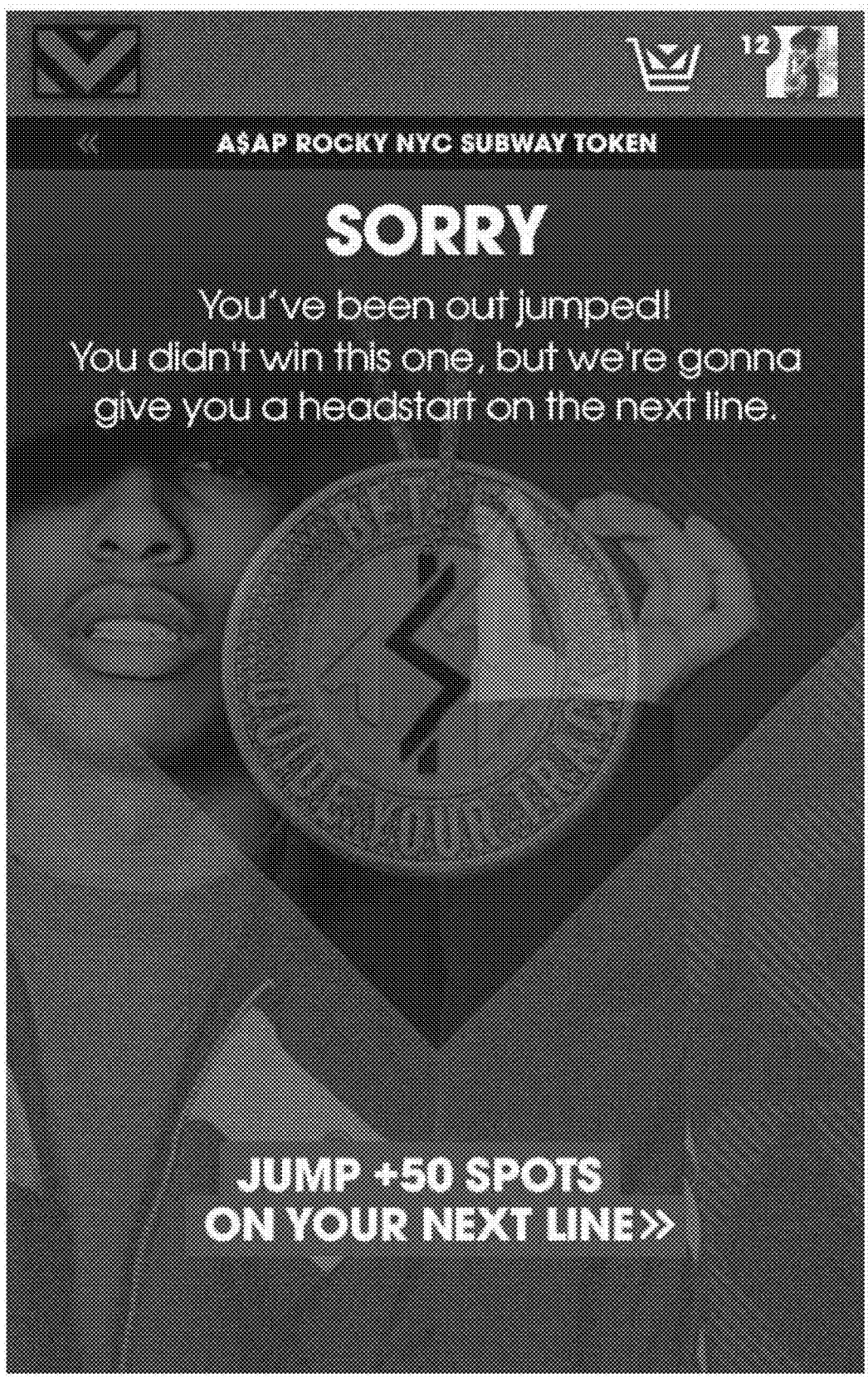
FIG. 49 is another example of a user interface visualizing an end of sale view.

FIG. 49 illustrates an end of sale view wherein a user has not won an opportunity to purchase a hero product.

Missions

In some embodiments, missions are the tasks users must complete to earn Jumps and move closer to the front of the line. Missions are designed to encourage users to visit frequently (i.e., access the mobile application and eCommerce server), attract new users, earn revenue, and garner deeper social engagement by users.

If a user completes a mission challenge, the user is prompted to "JUMP" and then sees his new spot confirmation. In the case of a soul mate mission (described further below), the screen will display the resulting Admin-selected product, content, or promotion unlocked via that mission and information about the "soul mate" who helped this user unlock the secret content.

FIG. 27 is an example of a mission according to one embodiment. Specifically, FIG. 27 illustrates a trivia mission with choices comprised of other user profile pictures. If a user successfully completes the trivia mission, the application may reward the user who answers the trivia mission and the user who is associated with the profile picture Hero Sale Win In one embodiment, such as the embodiment illustrated in FIG. 48, when a user successfully wins a hero product, the app celebrates him with a big congratulations overlay and a BUY NOW button. He may have minutes (e.g. 10 minutes) to complete the purchase. The user may see a preview of the product and any relevant product detail selections that are needed, like product color, before clicking the "BUY NOW!" button to checkout and purchase the product. If the user is not in the application, he may receive a push notification and an email indicating that he has X minutes to open the app, hit claim, and complete checkout.

Figure 58:
FIG. 58 is one example of a plurality of user interfaces illustrating a plurality of hero to product winning views.

FIG. 58 illustrates additional example views for checking out after successfully winning an opportunity to purchase a hero product. In the embodiment of FIG. 58, a wide-view 5802 (e.g., for a tablet or desktop) is illustrated next to an abbreviated view 5804 (e.g., for a mobile phone).

Figure 59:
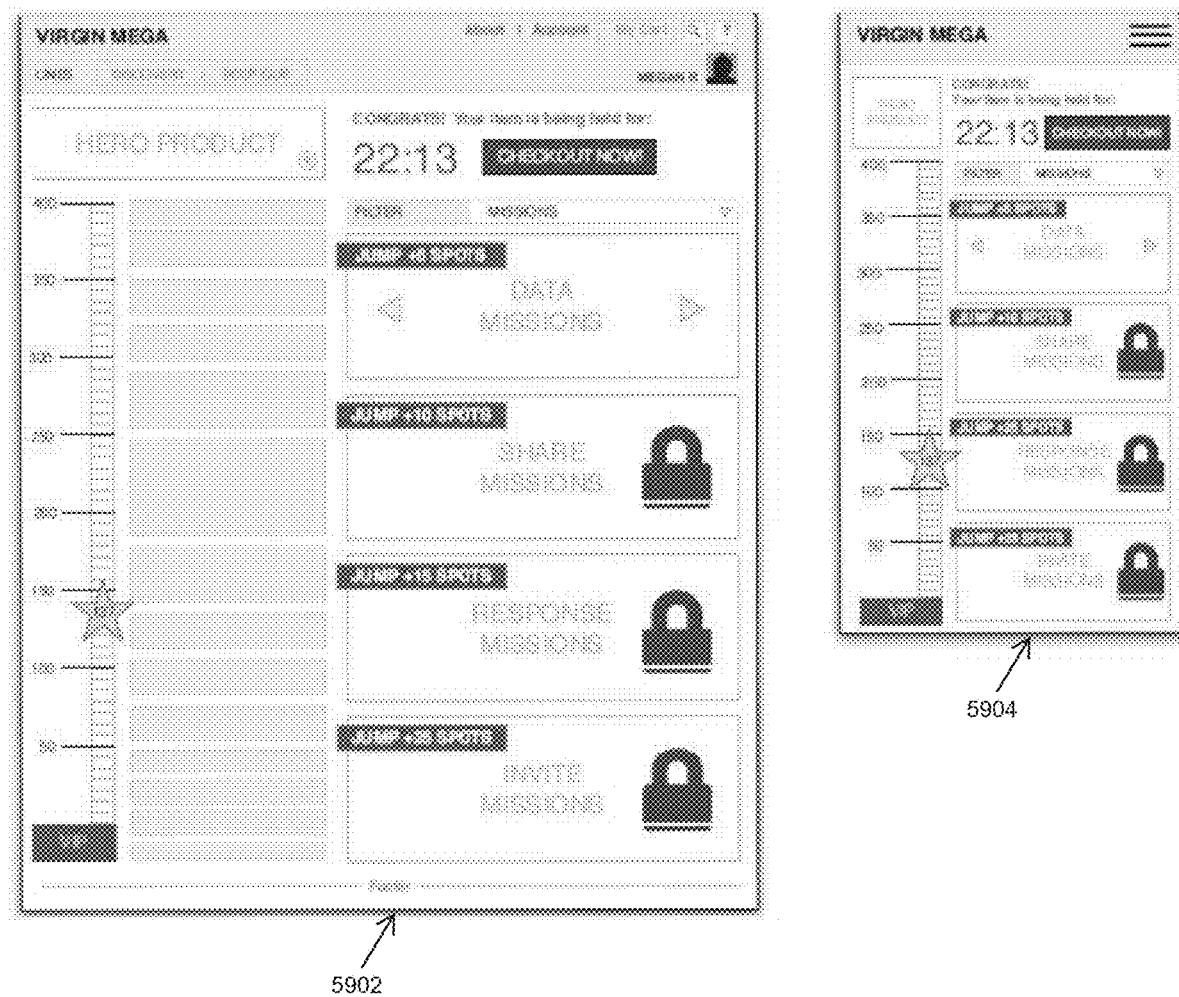
FIG. 59 is one example of a plurality of user interfaces illustrating a plurality of hero product winning views in respect to a virtual line.

FIG. 59 illustrates another example view for checking out after successfully winning an opportunity to purchase a hero product. In the embodiment of FIG. 59, a "mega mode" is illustrated with a wide-view 5902 (e.g., for a tablet or desktop) next to an abbreviated view 5904 (e.g., for a mobile phone).

Figure 60:
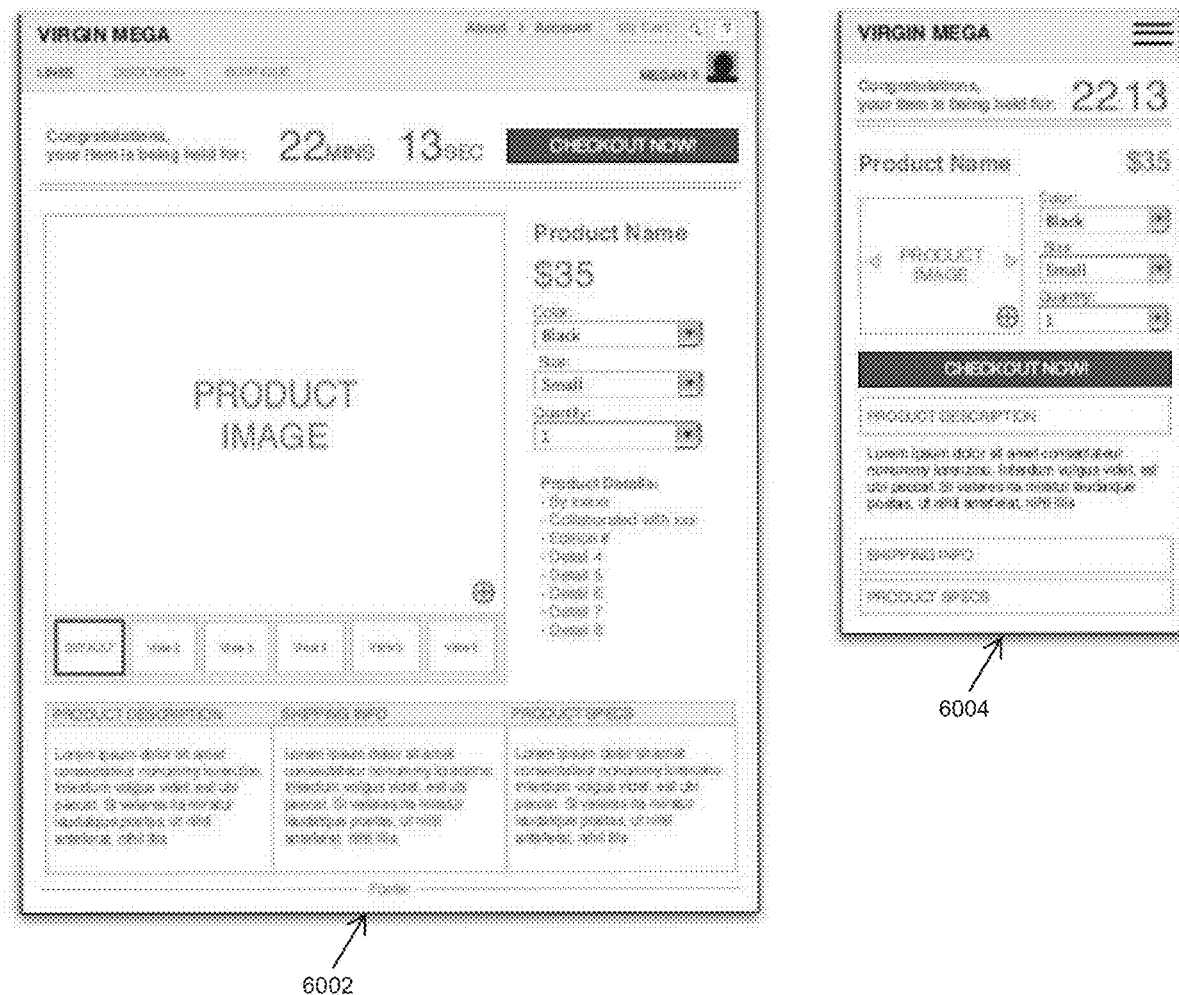
FIG. 60 is one example of a plurality of user interfaces illustrating a plurality of hero product detail views.

FIG. 60 illustrates another example view for checking out after successfully winning an opportunity to purchase a hero product. In the embodiment of FIG. 60, a product detail page is illustrated with a wide-view 6002 (e.g., for a tablet or desktop) next to an abbreviated view 6004 (e.g., for a mobile phone).

Hero Sale Loss

In one embodiment, there is a message that appears for users that are logged in to the application when the countdown timer hits 0 which reads, "This sale has ended. Sony, but you didn't win this one. You have been added to the virtual line for the next sale which starts in [insert time]?" The ability to add to cart is locked and if a next sale is set, a countdown timer for the next sale is displayed.

Figure 9:
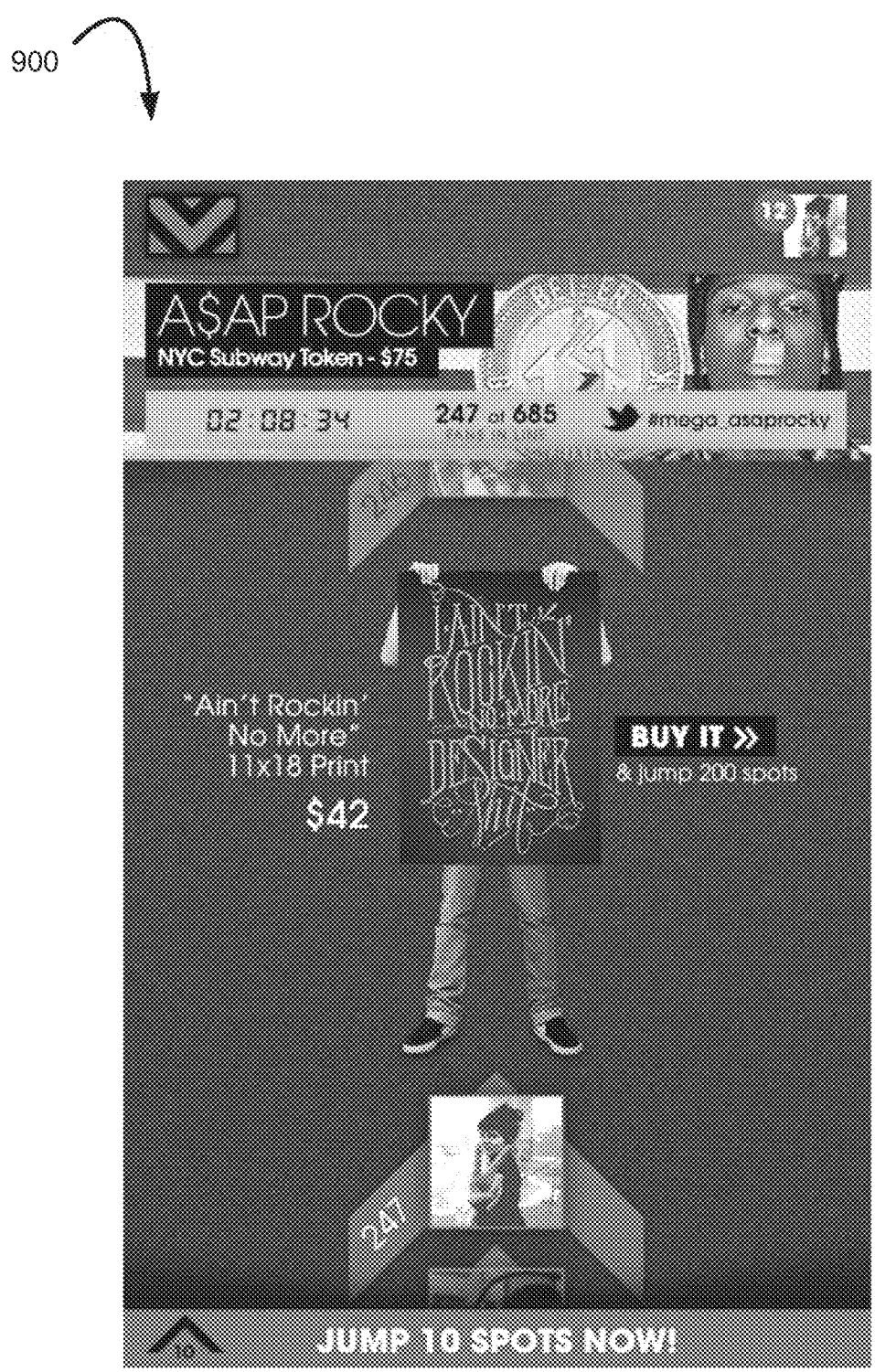
FIG. 9 is an example of a user interface visualizing an Easter egg.

As discussed above, a user may scroll a "macro mode" view of virtual line up and down. In one embodiment, the eCommerce system 100 may place "Easter eggs" within the virtual line. As used herein, an "Easter egg" is a product offering or reward (e.g., a discount for products), which may be hidden at different spots within a virtual line. When a portion of a virtual line is visualized by a user interface (e.g., by scrolling up and down), an indicator of the Easter egg may be visualized within the virtual line. FIG. 9 illustrates one example of a user interface 900 displaying an Easter egg. In one embodiment, a user who purchases an Easter egg product is rewarded with line jumps (i.e., advancement in the virtual line). In other embodiments, a user who "shares" the Easter egg (e.g., via Twitter, Google+, Facebook, etc.) is rewarded with line jumps.

In other embodiments, Easter eggs may be hidden at various spot in the virtual line. In these embodiments, a user who "jumps" over a hidden Easter egg spot may receive a notification via the user interface that he has unlocked a product offer or reward. In some embodiments, discovered (e.g., unlocked) Easter eggs may be "individual Easter eggs" and may only be credited to the user profile that discovered them. In other embodiments, Easter eggs are "shared Easter eggs" and may be awarded to not only the user who discovered them, but any users associated with the jump (e.g., a user selected during a mission, the users being jumped over, etc).

In one embodiment, once a hero product promotion has ended (e.g., a count-down clock has reached 00:00:00), a user profile located in a top spot in the virtual line has the opportunity to purchase a hero product. In some embodiments, only the top spots (e.g., spots in the top 1%, 5%, 10%) are eligible to purchase a hero product. A user who has successfully vied for one of the top spots may receive a notification that he was successful and that he may purchase the hero product. In one embodiment, a checkout screen may appear where a user provides payment information (e.g., credit card information) to complete the purchase of a hero product. In other embodiments, users who are not successful in reaching a spot rewarding an opportunity to purchase a hero product are provided with an alert letting them know that they were unsuccessful.

In other embodiments, a virtual line may be a "loyalty line." A loyalty line allows a user to earn a sliding scale discount based on his final spot after the loyalty line ends. Once a loyalty line ends, users are taken to a page full of products on a product listing page. On the product listing page, a discount for certain products may be displayed as a reward for a user's effort in the loyalty line. This discount may be calculated based on the user's final loyalty line spot and activity in the loyalty line. For example, a user ending in the top 5% of the loyalty line may receive a 20% discount, while other users in the top 6-40% of the loyalty line may only receive a 10% discount. Tapping a button on the screen may generate the discount and automatically apply the discount to both the product on the detail page and the cart.

Bodega

In one embodiment, at the conclusion of a virtual line, users whose final spot is in the top percentage of the virtual line may have access to a bodega, which includes a boutique of products, experiences, and content from which to purchase. This collection may have products that are "locked" and can only be purchased after a certain behavior performed by enough participants in the virtual line "unlocks" it. In some implementations, some of the products in a bodega unlock while the line is ongoing by a user performing a certain behavior. Once unlocked, the items are available for purchase. Behaviors that unlock a product may include, but are not limited to:

Answering a trivia question mission

Completing a mini-game mission

Sending an invitation to a non-registered user via SMS message or a social network Lapse of time As shown in FIG. 64, a bodega (or multiple bodegas) may appear on the side of an existing virtual line. At these locations, a user may tap and interact or purchase a product immediately and get rewarded with a jump in a current or future virtual line. The items in the side bodega may also have "loyalty-line" pricing, wherein the price of items may change depending on the user's location on a given virtual line.

Figure 69A:
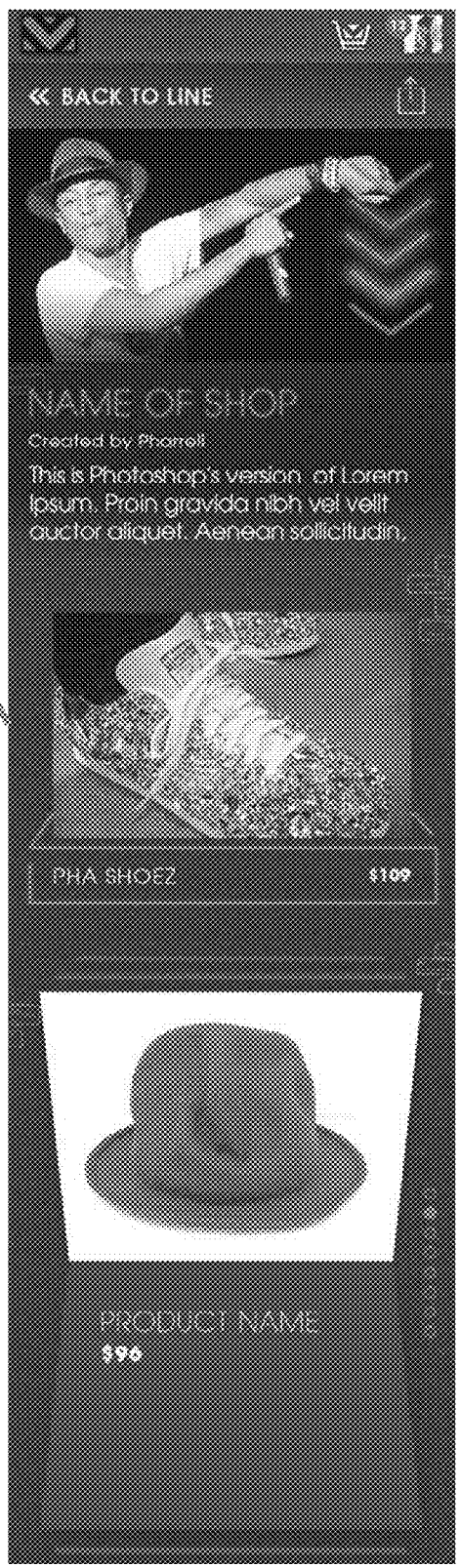
FIGS. 69A-69B is an example of a user interface visualizing a bodega.
Figure 69B:

FIGS. 69A and 69B illustrate one example embodiment of a bodega. FIG. 69A and FIG. 69B may be connected to form a single page on a mobile device or computer. The bodega may include the name of the shop, the creator, multiple items or event opportunities, advertisements, relevant content, and links to other bodegas. Each item may receive an input to display more detailed item information. Locked items may be grayed out or shown to be locked. In some embodiments the locked items may display requirements to unlock the items.

Figure 70A:
FIGS. 70A-70B is another example of a user interface visualizing a bodega.
Figure 70B:

FIGS. 70A and 70B illustrate another example embodiment of a bodega. FIG. 70A and FIG. 70B may be connected to form a single page on a mobile device or computer. The bodega may include various items that may be rewarded to a user as a result of the user's placement in a virtual line.

Augmented Reality Popup Store

In another embodiment, the eCommerce system 100 may present "popup" stores in augmented reality. In one embodiment, a machine-readable fiducial (e.g., a QR code, or a machine-readable marker) may be embedded in a website, store display, or poster. These machine-readable fiducials, and the images in which they reside, may be referred to herein as "FlagTags." As referred to herein, a FlagTag includes an image that will unlock access to (e.g., viewing of) products or content augmented to the environment from physical or digital spaces.

In one embodiment, a user may approach a FlagTag with a smart-phone device, or other device with an integrated camera, and may detect the presence a machine-readable element within the FlagTag. Subsequent to the detection of the machine-readable code, the device may visualize a "virtual" product offering in the display of the device. Some embodiments provide for the ability to create a FlagTag as a unique visual identifier that includes one or more of the following features: a pre-specified logo or artwork configured to be scanned or otherwise detected by a computer system, QR-code-style encrypted data that creates a border around the pre-specified logo or artwork, information descriptive of, or associated with, GPS location, and information descriptive of, or associated with, social graph data (described below). The logo may be detected by the camera comparing and matching it to a predefined set of images using, for example, the OpenCV library. Upon logo image recognition, the GPS location of the logo, and the user who initiated the image recognition, is also known. The user's social graph data is data pulled from social media systems such as Facebook and Twitter, and can include users' locations, recent music listens, interests, "liked" content, gender, age, shared links, and the same activity of his friends. Activity within the VirginMega experience may be analyzed as well, such as product purchase histories, content viewed, and content shared.

Figure 10:
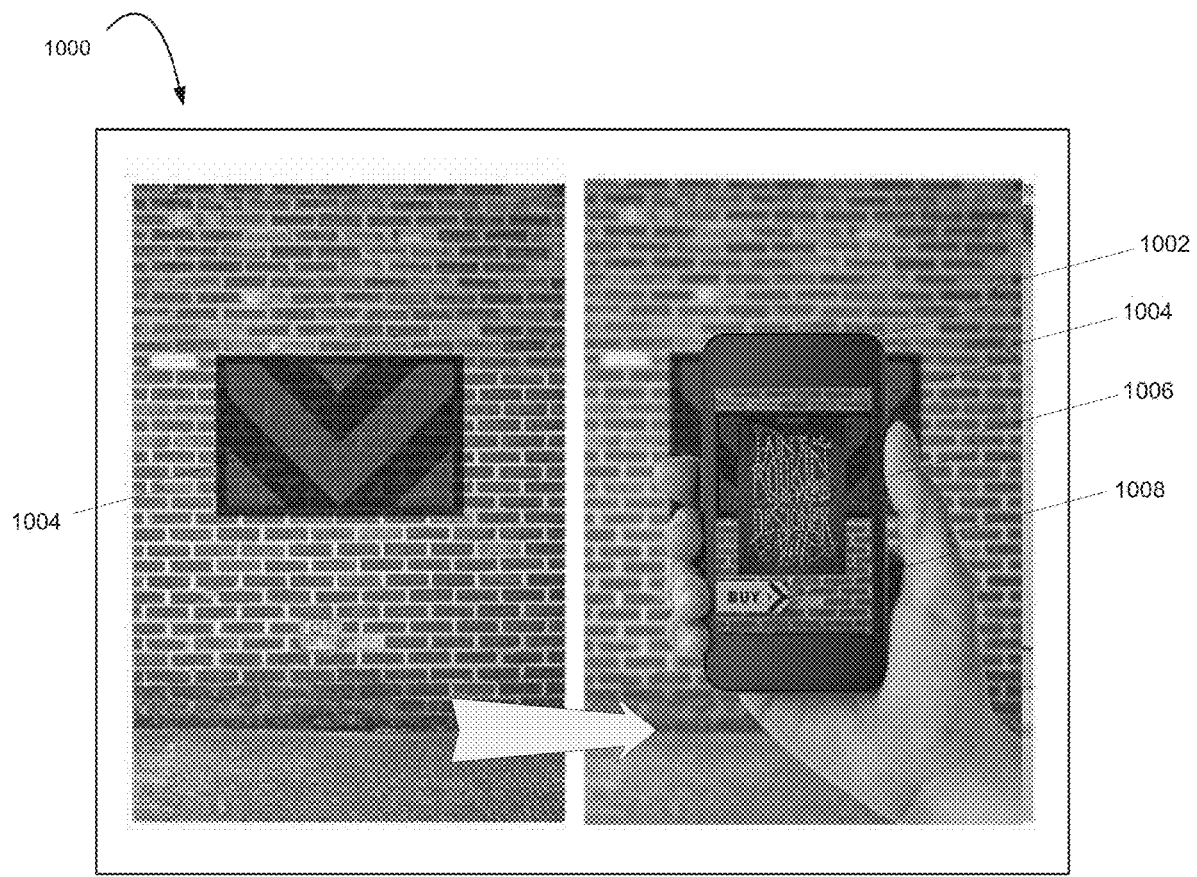
FIG. 10 is an example of an augmented reality popup store.

FIG. 10 depicts one example of a device configured to display an augmented reality product offering 1000. In the embodiment shown, a mobile device 1002 is configured to recognize a machine-readable element within a FlagTag 1004 in view of the mobile device's integrated camera. Subsequent to detection of the FlagTag, the mobile device is configured to display a product offering 1006 with a "buy" button 1008 overlaying the captured frames within the field of view of the camera.

In one embodiment, the physical position of a device determines what products may be offered in addition to a user's social graph. As discussed above, the social graph may include examining a user's locations (e.g., current location, home-town, etc.), recent music listens (e.g., on Pandora, Spotify, etc.), interests, "liked" content, gender, age, shared links, relationship status, and similar activity of his friends. For instance, if the user is female, then product offering selections may be filtered to only include (or prioritize) products that would conventionally be purchased by women.

Once at the FlagTag location, after image recognition, users may be able to unlock exclusive and coveted products displayed to them via Augmented Reality. Some of these products are tailored to the user based on social graph data, whereby system administrators will specify product and content categorized to users based on their music preferences, interests, "likes" on Facebook, gender, age, and friends' activity. Based on a user's location (e.g., the latitude and longitude of a user's mobile device), the user may be offered the opportunity to join a virtual line for a nearby event or geo-targeted product. This virtual line, known as a "geofencing line," may only be available to users within a certain proximity, or "geofence," to the event of geo-targeted product. The geofencing line proximity may be mapped by a pre-defined perimeter around a location. If a user is not within the stated proximity and logs into or opens the application, he may not view or join the geofencing line. According to some embodiments, the geofencing line may also be discovered based on a user scanning a FlagTag. According to other embodiments, the user's location may be found via tracking systems such as, for example, GPS.

Once a user is inside the geofence, the application may communicate with the user profile and eCommerce system to determine the appropriate products for that specific user. While many products may be associated to a FlagTag, only a subset may be most appropriate for that user. Examples are gender specific clothing. At a given FlagTag location the system may dynamically offer male users one product and female users a different product. Once the application has received the filtered list of appropriate products, it will load those product previews from the Content Management System (CMS). In this example, the system serves product and content contextualized and personalized to a user in a physical space.

When the FlagTag is recognized, different actions may be triggered. For instance, product information may be displayed next to the FlagTag on a display. HTML standards may be used with multimedia components such as 3D models and transparent videos of unlocked products to blend with the environment and offer interaction capabilities.

Figure 63A:
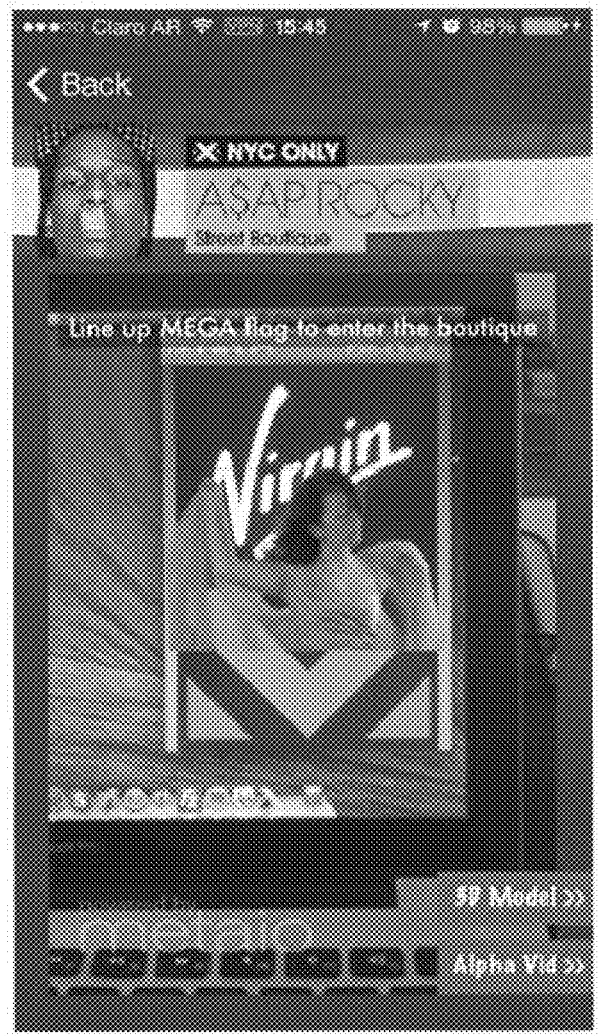
FIGS. 63A-63B is another example of a plurality of user interfaces illustrating an augmented reality view.
Figure 63B:
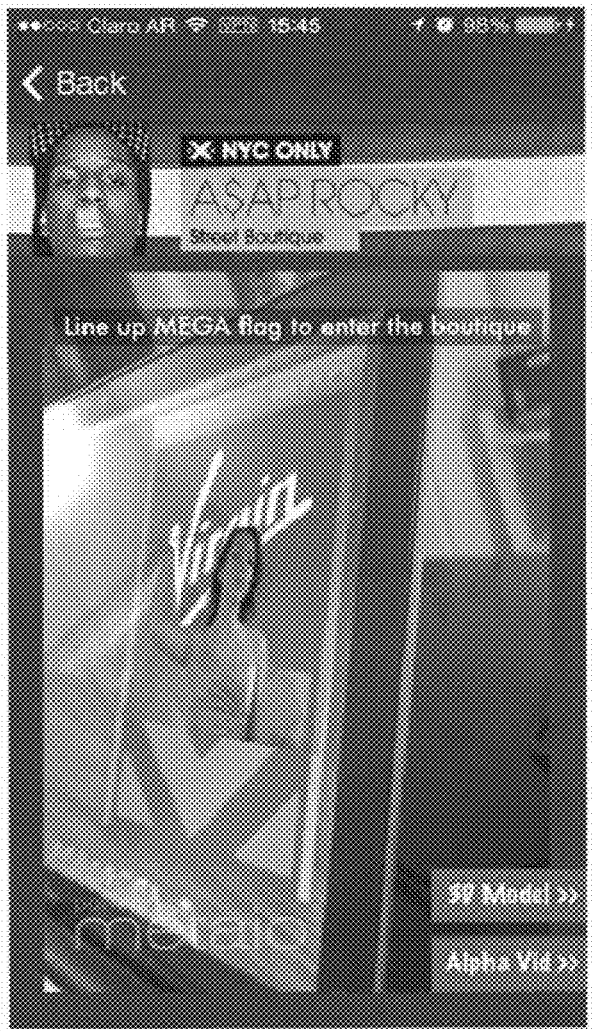

FIGS. 62A-62B illustrate how 3D models can be rotated using swipe gestures, and may be scaled using pinch gestures. The embodiment shown visualizes how 3D models and video with transparent background are shown in a position relative to a FlagTag (or other machine-readable image) once the FlagTag has been recognized. FIGS. 63A-63B show an example of how a FlagTag may be detected from multiple different angles. If the FlagTag is viewed from the side, the video or the 3D model may be rotated on a display to have the same front plane as the FlagTag.

Scavenger Mode

Scavenger mode, as used herein, is a mode in which a user locates a hidden machine-readable code within a website or at a physical location (e.g., a store), and uses his mobile device to scan the machine-readable code. Subsequent to scanning the machine-readable code, hero product promotions may be executed, virtual lines may be joined, and product offers may be presented via the user's mobile device.

In one embodiment, the user interface screens may include: a hero product tease page, a hero product reveal page, a product detail page, a checkout page and an order confirmation page. The user interface screens will be now be described below.

Figure 23A:
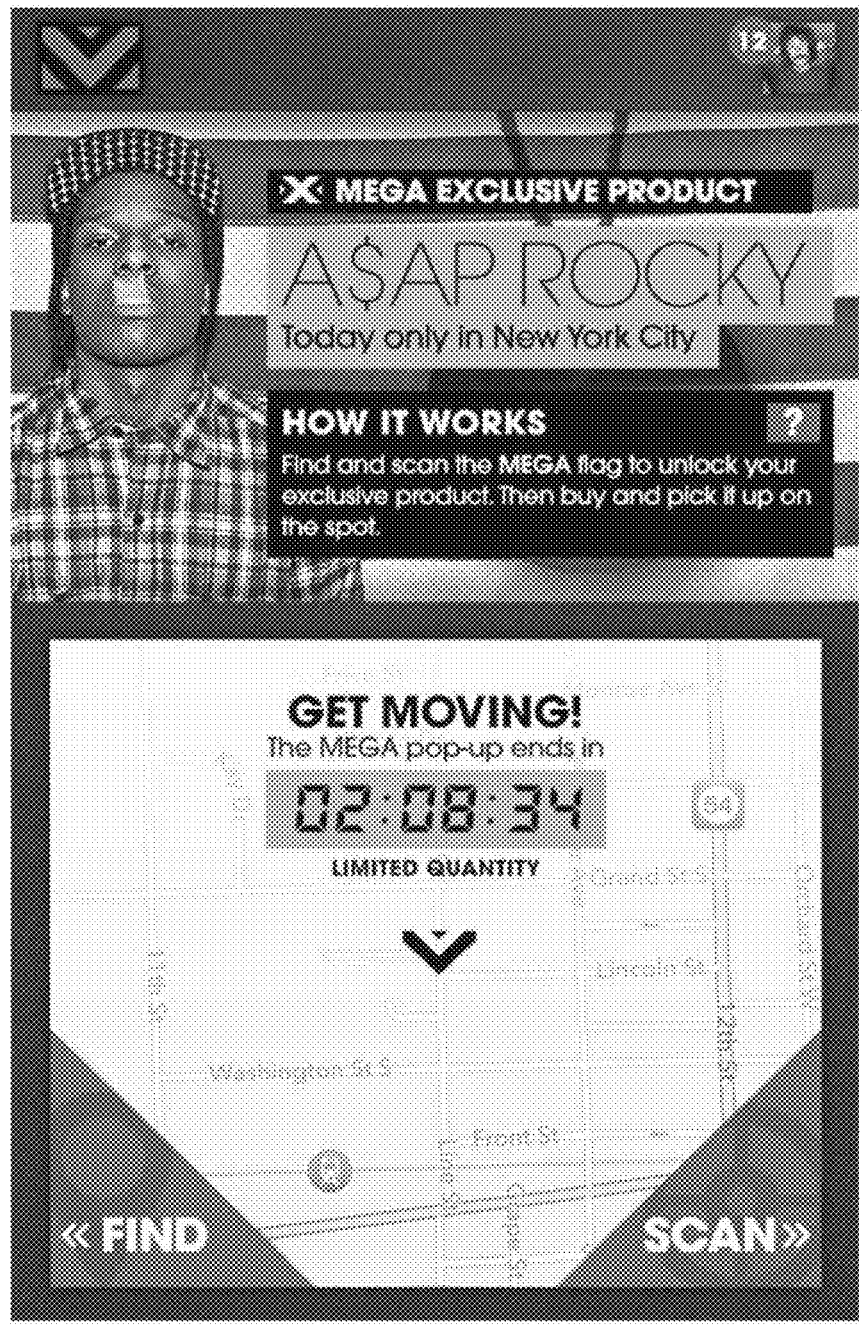
FIGS. 23A-23B are user interface examples for a mobile application in a scavenger mode.
Figure 23B:
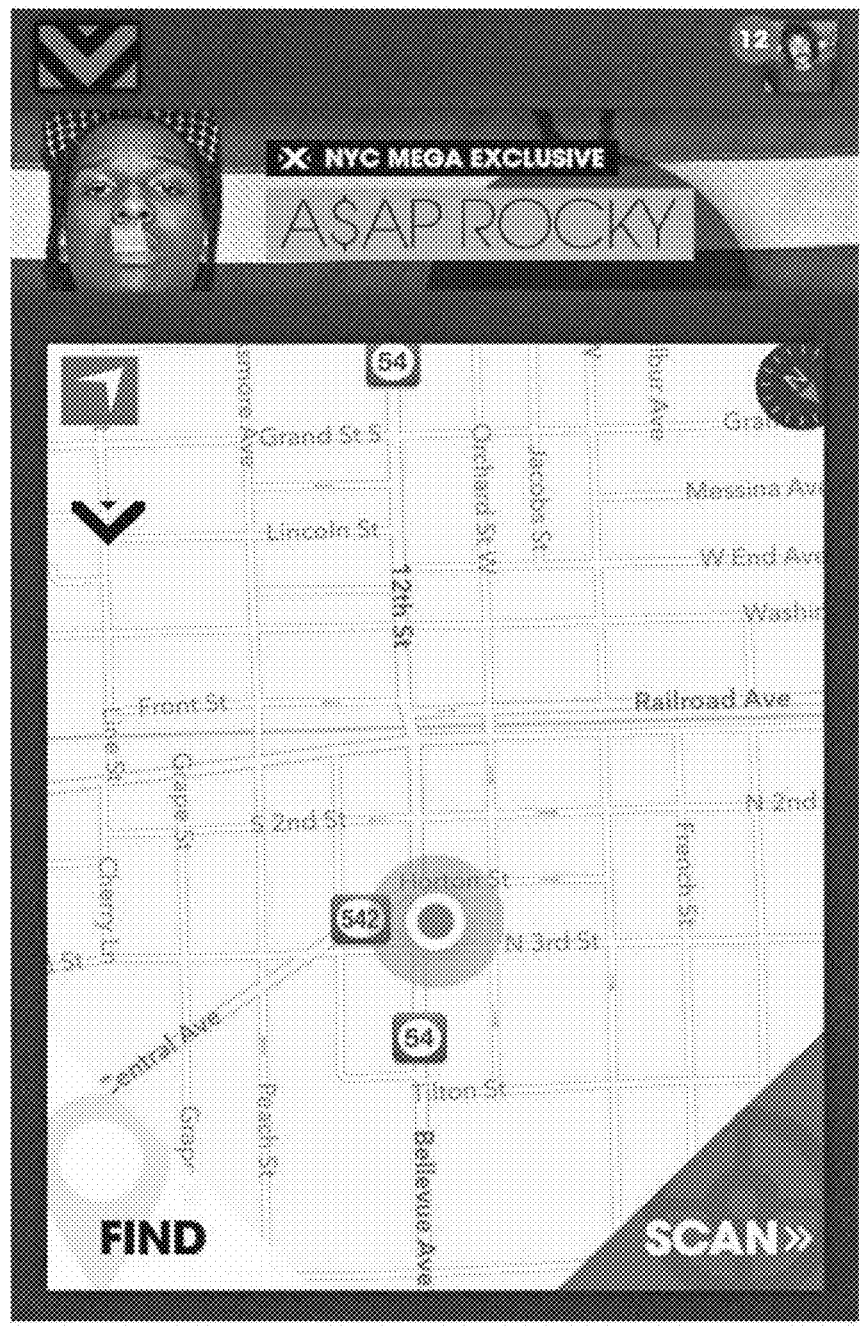

FIGS. 23A-23B illustrate additional examples of user interfaces configured in a scavenger mode. In the embodiment shown in FIG. 23A, a user is given a physical location with a machine-readable fiducial, which the user must "scan." If a user locates and scans the machine-readable fiducial, the user may be eligible to purchase the advertised product. In one embodiment, a count-down timer may be visualized, which indicates the amount of time the user has to find the machine-readable fiducial. In some examples, an Admin may create a virtual line available to users within a certain area without making the users travel to a specific location or scan a machine-readable fiducial.

FIG. 23B illustrates on example page where the user sees a Google Map with a dot indicating the user's current physical location. Below the map, there are Navigate and Scan buttons, allowing the user to navigate to the FlagTag and then scan the FlagTag to participate in scavenger mode.

Figure 24A:
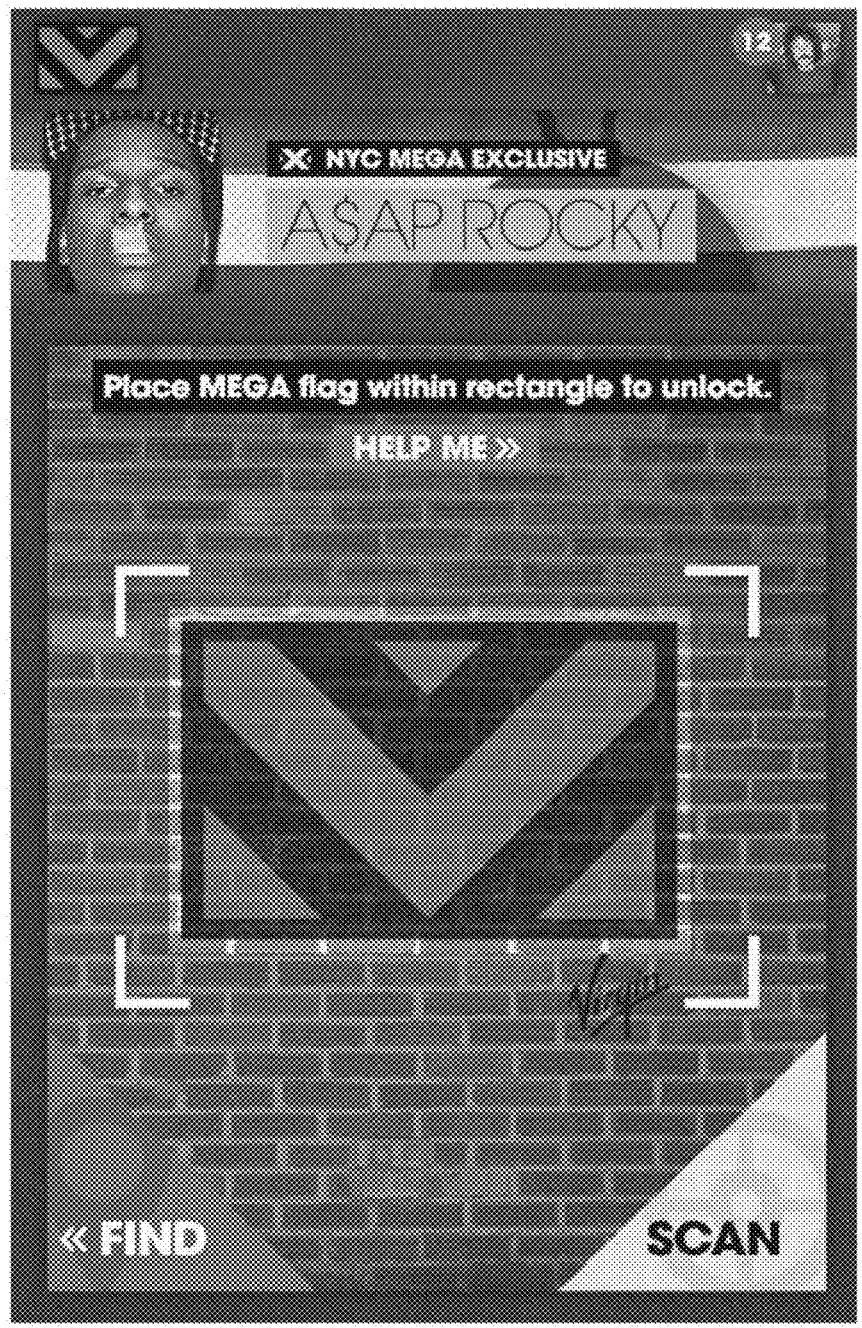
FIGS. 24A-24B are other user interface examples for a mobile application in a scavenger mode.
Figure 24B:
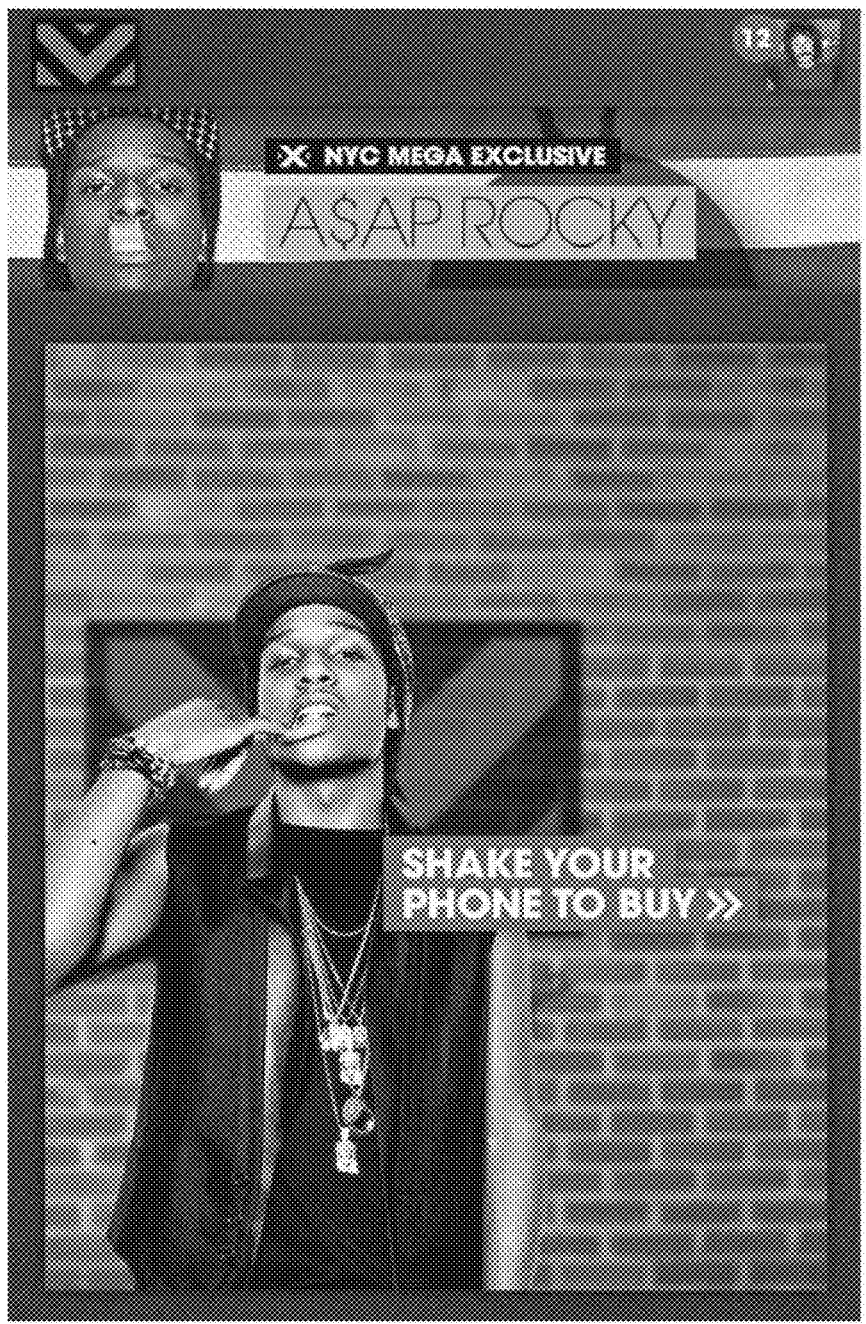

FIGS. 24A-24B illustrate another aspect of scavenger mode. In FIG. 24A, a machine-readable code or marker has been found embedded in a wall poster. In the embodiment shown, the application scans the machine-readable fiducial with a mobile device in a scan page. Once scanned, in FIG. 24B, the user may purchase the product. In one embodiment, a user "shakes" his phone or swipes to navigate to a checkout screen.

Hero Product Tease Page

The hero product tease page (navigated from the Scavenger link on the home page) may display when the user is detected within a physical distance to the FlagTag. The system may show a hero product preview and related focus entity details above a Google Map. This may be displayed before the user clicks the Scan button. The hero preview may include, for example, the following:
Product Name
Product Description
Product Image
Product Price
Artist Inspiration
Share Button Hero Product Reveal Page The hero product Reveal page, as illustrated in FIG. 24B, may be displayed after the user navigates to the FlagTag and successfully scans the FlagTag. After the successful scan and image recognition, the application may display media via augmented reality featuring the hero product that contains associated details like price and available colors. From this page, there is a button to buy that hero product or continue viewing additional hero products. Scavenger mode FlagTags may be organized around one particular focus entity and the hero products developed for that focus entity; FlagTag content may be configured by the Admin in the CMS, and last only for a certain time period at a certain GPS location.

Product Detail Page

Figure 25:
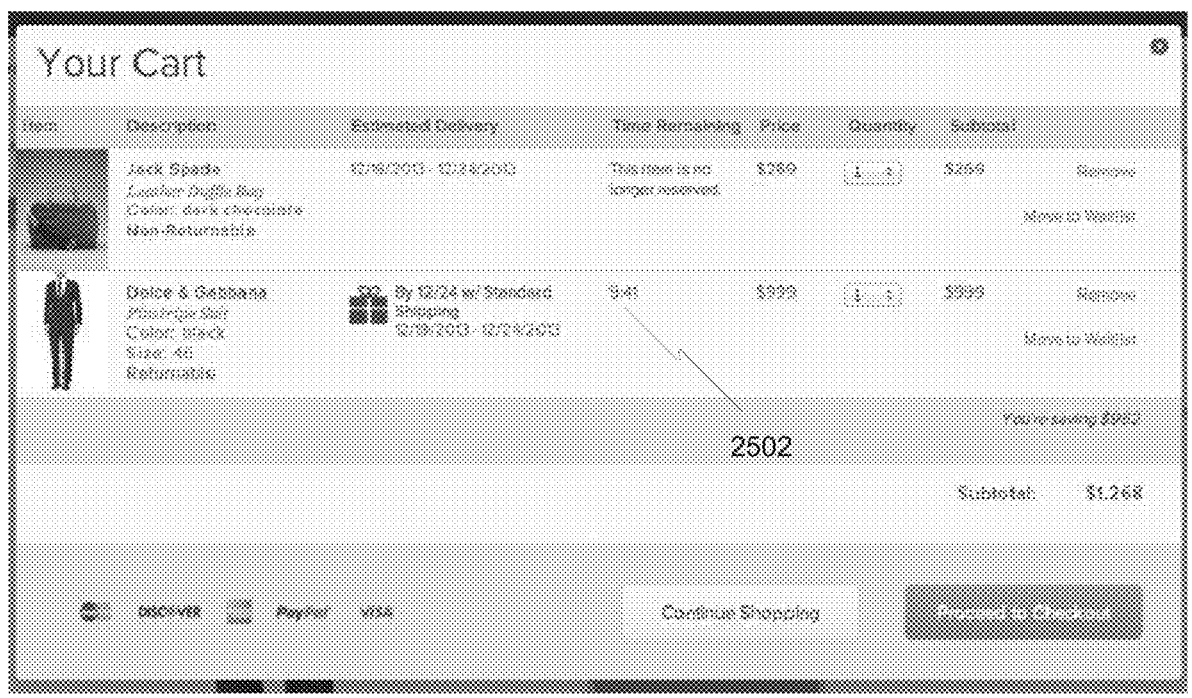
FIG. 25 is one example of a user interface for a mobile application in a checkout mode.

The product detail page, as illustrated in FIG. 25, allows the user to select information like the quantity, size, and color of the hero product he is going to buy. The page may also display details to redeem a hero product in person. This page may also include another product description and any Admin-desired specifications additional to what was provided on the hero product reveal page.

Cart and Checkout Page

FIG. 25 illustrates one example of a user interface configured to visualize contents of a virtual shopping cart. The Cart and Checkout page and Billing Information page may allow the user to enter data to effectively buy the hero product. The user has the chance to review all Product and Billing details entered before submitting his order. For scavenger mode and hero products sold in line mode, the cart may have a timer at the product level, meaning any hero product that has a countdown timer 2502 is viewable in the cart. If there are products in the cart that do not have a time associated with them, no time is shown. Hero products may be awarded to users by groups to allow users to purchase hero products without having to wait due to bandwidth problems from too many people attempting to buy the hero product before time runs out. A cart may include a call to action (CTA) to immediately place a hero product in the cart when the application receives an input to purchase the hero product. The Cart and Checkout page includes, for example, the following fields:

Item Image: Thumbnail of the product
Item Description: Brand, Product Name, Size
Estimated Delivery: Delivery window
Time Remaining (Countdown): For hero products only
Price: What the user will pay
Quantity: Number
Remove CTA: Ability to click a link to remove a product from the cart
Promo Code Box: Ability to add a promo code to an order
Update Cart CTA: This is attached to the promo code box and is only live when a promo has been added.
Subtotal: Both at item level and order level
Continue Shopping CTA: Button may read "Continue Shopping"
Checkout CTA: Button may read, "Checkout"
The Billing page includes, for example, the following fields:
Credit Card Logos: Show the logos of the various cards we accept
Name on Card: 1 field
Credit Card Number: 1 field, numbers only
Expiration Date: two dropdowns (month/year)
Security Code: maximum 4 characters
Billing Address: check box for "same as shipping"

Order Confirmation Page

Figure 26:
FIG. 26 is one example of a user interface for a mobile application in a hero-product checkout mode.

FIG. 26 illustrates one example of a user interface configured to confirm a purchase of a hero product or satellite product. At successful submission, the Order Confirmation page may be displayed. The confirmation may be needed for the user to fulfill his order by going to the pick-up location and retrieving his product(s), or confirming his correct shipping address.

CMS Admin-Content Type Creation

In regard to FIGS. 19A-19B, and 20A-20B, content may be presented in different formats that subsequently may be referred to as Content Types, which can include, for example, images, audio, video, or HTML content.

Each Content Type may be stored separately in CMS, or the Admin can bundle Content Types to join two or more into a single "record" to combine Content Types to be displayed (e.g. video will display while static HTML text is shown). Where appropriate, the Admin may include a link to an eCommerce page for Content Types that are product previews and may be purchased from the eCommerce system 100.

Content Types may have an Admin-defined taxonomy (by Genre, Artist, Lifestyle, etc.) and product previews (certain Content Types) may be synchronized with the master list of categorized products stored in the eCommerce system. This enables the CMS to offer a subset of Product Previews associated to that Spot, most appropriate to that user based on user-information provided by the eCommerce server (and defined user-groups that map to product taxonomies).

Figure 18:
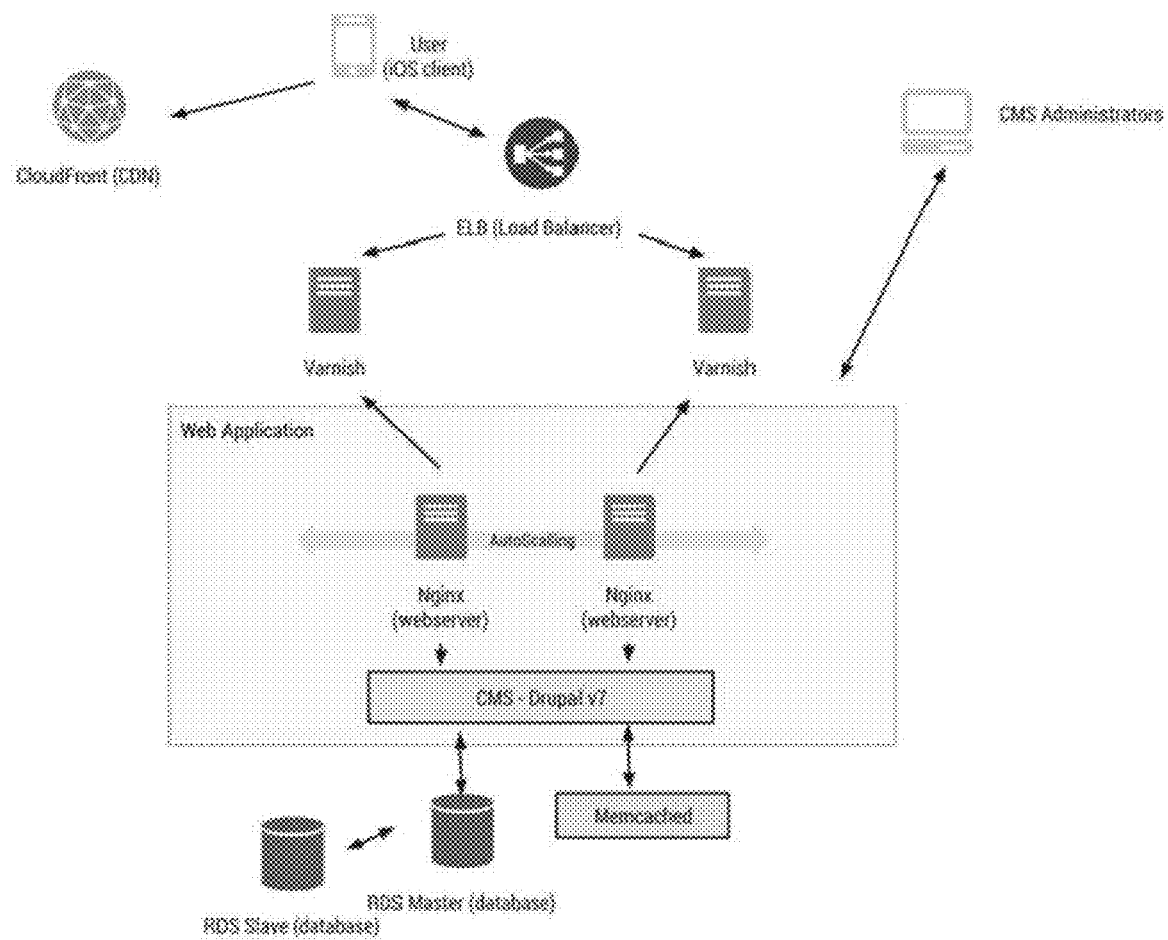
FIG. 18 is a context diagram for a CMS architecture.
Figure 56:
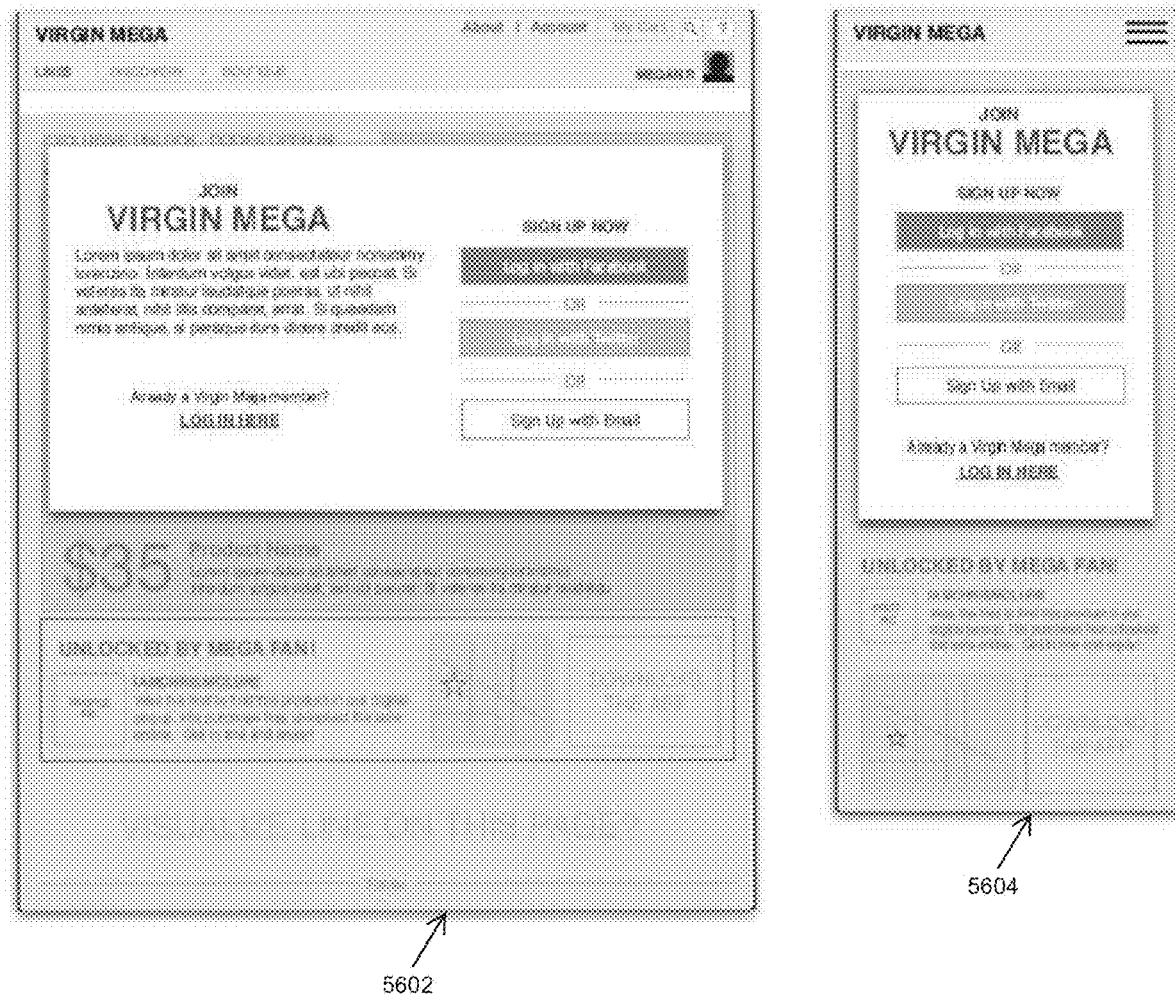
FIG. 56 is one example of a plurality of user interfaces illustrating a plurality of registration views.

In addition, FIG. 56 includes a plurality of additional example user interface views for user registration within the CMS architecture of FIG. 18. In the embodiment of FIG. 56, a wide-view 5602 (e.g., for a tablet or desktop) is illustrated next to an abbreviated view 5604 (e.g., for a mobile phone).

Figure 54:
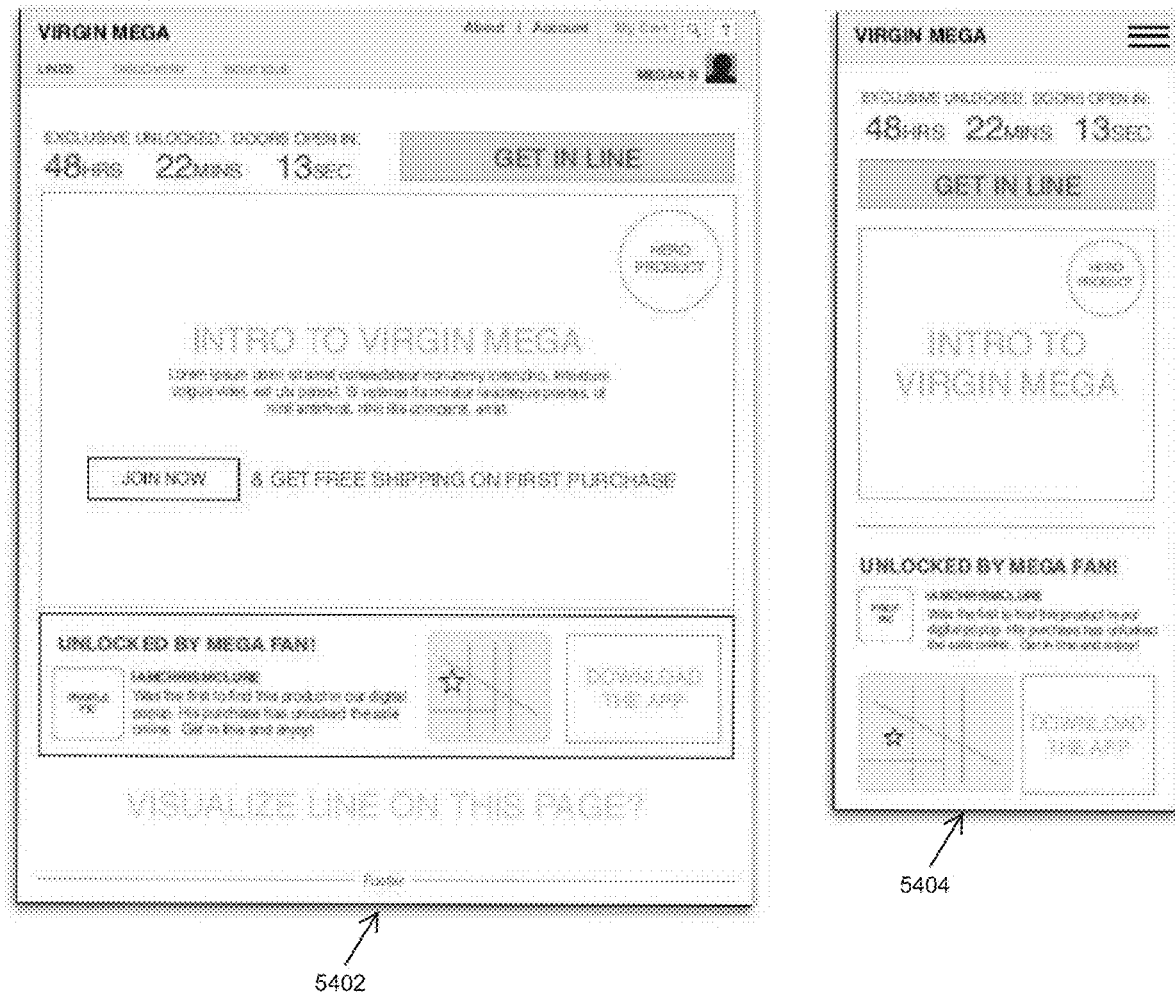
FIG. 54 is one example of a plurality of user interfaces illustrating a plurality of home views.

FIG. 54 illustrates an example of a user interface for registration within the CMS architecture of FIG. 54. In the embodiment of FIG. 54, a wide-view 5402 (e.g., for a tablet or desktop) is illustrated next to an abbreviated view 5404 (e.g., for a mobile phone).

Line Mode Home Page

As discussed above with regard to FIG. 5-7, the Line Mode Homepage may include a countdown for the current or next flash sale of the limited-quantity hero product, an introduction to VirginMega, the hero product feature, a Get In Line button to join the virtual line (which requires that the user to register first), and a feature of the user in the latest event who unlocked the hero product in scavenger mode, releasing it for sale in, for example, a bodega in line mode.

In one embodiment, if the user is viewing the site from a desktop, there may be a link to download the application.

In one embodiment, the hero product feature located within the line mode home page includes, for example, the following:
Product Name
Product Description
Product Image
Product Price
Artist Inspiration
Get In Line Button (CTA)
Tweet this Button Discovery Mode As discussed above, products may be targeted to a user based on his social graph. In addition, a user's music listening tastes may also be used to target selected products. FIG. 3C illustrates a navigational flow of discovering products based on music or video watching. In the embodiment shown, a user's music listening habits (e.g., derived from inputs from music service or portals such as Spotify, YouTube, or Songza) may be determined to direct product offers to them. For instance, a user who listens to hip-hop artists may be more likely to purchase satellite content which is hip-hop specific (e.g., baseball hats, jerseys, etc).

Mobile App User Registration

In one embodiment, in order to participate in line mode, a user may have to register and create a VirginMega account via, for example, Gmail, Twitter or Facebook.

When a user registers with Twitter, he may also auto-follow the VirginMega Twitter account. All Tweets with VirginMega hash tags may appear associated with his account. If a user registers with Facebook, he may get a message that reads, "Add more friends to improve your chances of jumping the line" with a CTA to log in with Twitter as well. The user may also automatically be added to the VirginMega Facebook page so that hero events tied to scavenger mode show up in his newsfeed.

Users may be added in the order in which they join the line until the line is full. The line may be full when, for example, there is four times the number of people in line than there is product. For instance, if there are 250 products available, the line cap may be 1000 people.

Users who are not added to the line may be automatically added to the waitlist in the order in which they arrive. Once someone leaves the line, users may be added off the waitlist to the end of the line until the line is again at capacity. This may continue for the duration of the sale to ensure the line is as full as possible. The waitlist may have infinite, or near infinite, capacity.

The capped number of users allows for a decreased bandwidth usage in the application. If an unlimited number of users can be added to the line, the line may be too long and the system may freeze or lag. In some examples, the users on the waitlist may be stored separately by user account and spot in the waitlist, so the users on the waitlist may not affect the users in line.

Augmented Reality Stores

In some embodiments, the camera in the application provides the ability to first leverage image recognition, which allows a certain number of users within a geo-fenced area (e.g., approximately 30 feet) to take a photo from within the application of a unique visual FlagTag identifier. The application may be configured to recognize this visual identifier and then display virtual content in conjunction with actual objects to generate an Augmented Reality at the geo-location of the visual identifier. The application may incorporate the individual user's social graph data in some embodiments in product and content offerings.

The FlagTag is recognizable and may be based on one of two techniques: a pre-specified logo or artwork or QR-code-style encrypted data that creates a border around the pre-specified logo or artwork. This image recognition is the catalyst for GPS recognition or social graph data.

The social graph data as defined above may come from social media systems such as Facebook and Twitter, and can include users' locations, recent music listens, interests, "liked" content, gender, age, shared links, and similar activity of their friends. Activity within the VirginMega experience can be analyzed as well, such as product purchase histories, content viewed, and content shared.

Some hero products may be tailored to a user based on social graph data, whereby Admins may specify product and content categorized to users based on their music preferences, interests and "likes" on Facebook, gender, age, and friends' activity. After being unlocked as inside a geofence, a user profile may be parsed to determine an appropriate product to advertise. While many products may be associated to a FlagTag, only a subset may be most appropriate for that user. Examples are gender specific clothing; at a given FlagTag location the system may dynamically offer male users one product and female users a different product. Once the app has received the filtered list of appropriate products it may load those product previews from the Scavenger CMS. The idea is that the system is serving product and content contextualized and personalized to a user in a physical space.

CMS Architecture

In one embodiment, such as the embodiment illustrated in FIG. 18, the user requests information from the CMS. In the infrastructure, the entry point is a load balancer, whose role is to distribute the load between instances of the web server (e.g., NGINX) in order to avoid bottlenecks. In this embodiment, after that Drupal processes the request and takes information from the database, the right content type information is returned to the mobile client using a REST interface.

In one embodiment, CloudFront, a content delivery network service provided by Amazon, is implemented with RDS master and slave databases to allow for horizontal scaling of the cloud infrastructure. The master is used for writing purposes and the slave is used for reading purposes. In one embodiment, an application called Memcached is used to store sets of values in memory, which are usually results of database queries. In this instance and design it is used when the previously accessed results from the database are stored in cache.

CMS Admin-Spot Creation

In one embodiment, such as the embodiment illustrated in FIG. 18, an Admin creates an event that includes, for example, a spot title (a location title), a GPS Location, a geo-fence radius, a maximum number of users who can be allowed to interact with the location, sound effects that correspond to the product/content unlock, and the ability to add Content Types for that location.

In one embodiment, the Admin may specify the Content Types, which include hero product previews (linked to the eCommerce system by the Admin) and non-eCommerce content, as well as the Content Types to leverage upon image recognition unlock of the FlagTag. After the initial unlock, the user may swipe vertically to load the next Content Type; when viewing a product preview, the user may swipe horizontally to see details of the product by navigating to the eCommerce system.

In some embodiments, this process will include selection of a user and a workflow/logic manager module to define variables and conditions for users to be applied automatically to the allowed group for each area (i.e., at a warehouse party with multiple locations that are active, a user with preference for tickets for certain bands may be automatically added to the allowed list for locations dedicated to that band).

Locations may have an Admin-defined taxonomy and each location may be dedicated to one focus entity.

Processes of the Ecommerce System

According to some embodiments, an eCommerce system, such as the eCommerce system described above with reference to FIG. 1, executes various processes which are described further below.

Greenlight Concept Detail

In some embodiments, the application may "greenlight" (e.g., allow) a selected number of users within a configurable radius of a FlagTag location (e.g., based on their GPS coordinates, WIFI positioning, etc.), allowing them to perform image recognition of the FlagTag or any logo defined in the location selected. In various embodiments, the mobile computing device includes a scanning component configured to capture and decode one or more FlagTags using an integrated camera device.

Image (Logo) Recognition Detail

According to some embodiments, activating the camera on the device may allow the application to take a picture of a logo or mark defined by the system. According to some embodiments, any pre-specified logo or image, or any image surrounded by QR-type data in a border format may render the logo or image a unique identifier to trigger content. Using recognition processes the application may recognize the QR data border or image/logo shapes, and if the data border is recognized or the shapes match the design stored by the application, a confirmation message, image code, and the geo-location of the FlagTag location may be sent to the backend servers. Those servers may return information based on the FlagTag location and content associated to the combination of the image recognized and the FlagTag location.

Some FlagTag pictures or logos can contain additional areas (locations within the FlagTag) that can be identified by the application and converted into unique identifiers to provide personalized information associated to the unique identifier recognized. As described above, one example of this may be augmented reality content.

After successful image recognition the content delivered by the server may be showcased in the application in multiple formats (images, videos, audio, text, HTML, etc.) and can be dynamic based on the social graph data of that individual user.

FlagTag Detail

In some embodiments, the FlagTag is the unique visual identifier referenced above. The FlagTag provides the image—the specified logo or artwork, or QR-code-style encrypted data that creates a border around the pre-specified logo or artwork—that the camera processes for image recognition.

In one embodiment, the geo-location data and user data is sent to the backend servers (e.g., the eCommerce server 100 of FIG. 1) and the backend servers generate a visualization of content according to different variables associated with the identifier within the FlagTag: location and product priority are defined via the CMS, and user preferences, user social data and user history are defined by the eCommerce system. The interaction between the Mobile, CMS and eCommerce servers may thereby generate the visualization.

The content may be presented in different formats or Content Types that can include: Images, Video, Audio or HTML content. Content Types associated to a Spot are unlimited in number. For example, a video of ASAP Rocky may first appear wherein the focus entity explains the hero product's inception, and at the video's completion, an audio file plays while an image displays.

To achieve this, a CMS database containing the FlagTag locations may include geolocation, geo-fence radius, and information regarding the products and content associated to each FlagTag location (described above). Users are allowed based on the current number of available spots left in the line; in some embodiments the Admin may not specify a limit to the number of users that may be allowed into a line.

According to a variety of embodiments, in response to recognizing the image of the logo, the mobile computing device executing the application may display the logo's associated Content Types including the product preview. Product preview details are returned by the CMS (description, photo, etc), and upon receiving a swipe for details, these products communicate with the eCommerce system and may be purchased. On a buy action, the mobile and eCommerce system interaction begins.

In one embodiment, the order of Content Types displayed is Admin-specified for that a FlagTag location, but the content itself may be displayed dynamically based on a user's social data, including the person's gender, location, interests, and purchase history (e.g. women are offered only Content Types 1, 3, 4, and 5 out of 8 Content Types associated to the geo-location). Each Content Type is stored separately in CMS, or the Admin can bundle Content Types to join 2 or more into a single "record." There may also be a full bi-directional relationship with eCommerce CMS. The logo or image may be a backdrop of featured content; content, time frames, and any user-personalized content is Admin-controlled and can vary.

In some embodiments, a user database may store information regarding user history, profile, and preferences tied to socially integrated data. A process inside the backend application may handle the selection process of users enabled to be "greenlighted" (i.e., allowed) by the system to defined locations.

This process may include selection of user and a workflow/logic manager module to define variables and conditions to users to be applied automatically to the allowed group for each geo-location (i.e., a user with preference for tickets for certain bands may be automatically added to the allowed list when that band sells tickets in certain spots).

The allowance and image recognition of the FlagTag coupled with the backend workflow and logic managers may achieve the end result of a product and content contextualized and personalized in a physical space.

Augmented Reality Content Intervention Detail

FlagTags may allow the system to use on screen overlay to incorporate augmented reality. A FlagTag may store information that is used to generate augmented reality videos. Augmented reality content may be displayed from different angles.

In some embodiments, a 3D video may be displayed whereby the videos can use a transparent layer (the green screen); it is a Virtual Video Wall positioned over the FlagTag, acting according the movement of the phone. Also, in one embodiment a 3D video shot with the transparent layer (green screen) may be used as a ghost image. The system can place the video in any place using the FlagTag as an anchor, and the video may be superimposed seamlessly over the natural environment.

3D Video Mobile Recommended Requirements

Video Compression: MPEG4 codec inside 3G2 container

Video Resolution: recommended 176×144 px @20 fps (e.g. 288 kbps)—stronger devices (esp. dual core devices) could handle higher resolutions Audio Compression: AAC LC Audio Resolution: 22050 kHz Stereo (e.g. 48 kbps)

Aspect Ratio: Supplied geometry must have same aspect as the encoded movie

If the application detects the user purchased a product, it may show directions for how to get the item by allowing the user to use his camera and see on the screen an augmented reality sign ahead of him. In this instance, the directions may guide him to the destination where a van or other location awaits to deliver the product. This sign may hover on the screen and show direction signs and distance to the product. It may automatically change based on user direction using the GPS of the device. Alternatively, the user can choose not to use the AR camera mode and just see the directions to get to the product location on the map.

Scavenger Mode

FlagTags may be positioned in a variety of locations. Examples of these locations include in stores and on walls on city streets. According to some embodiments, while in scavenger mode, the mobile computing device executing the application can unlock a hero product that later is available in line mode.

Scavenger Mode Detail

Figure 15A:
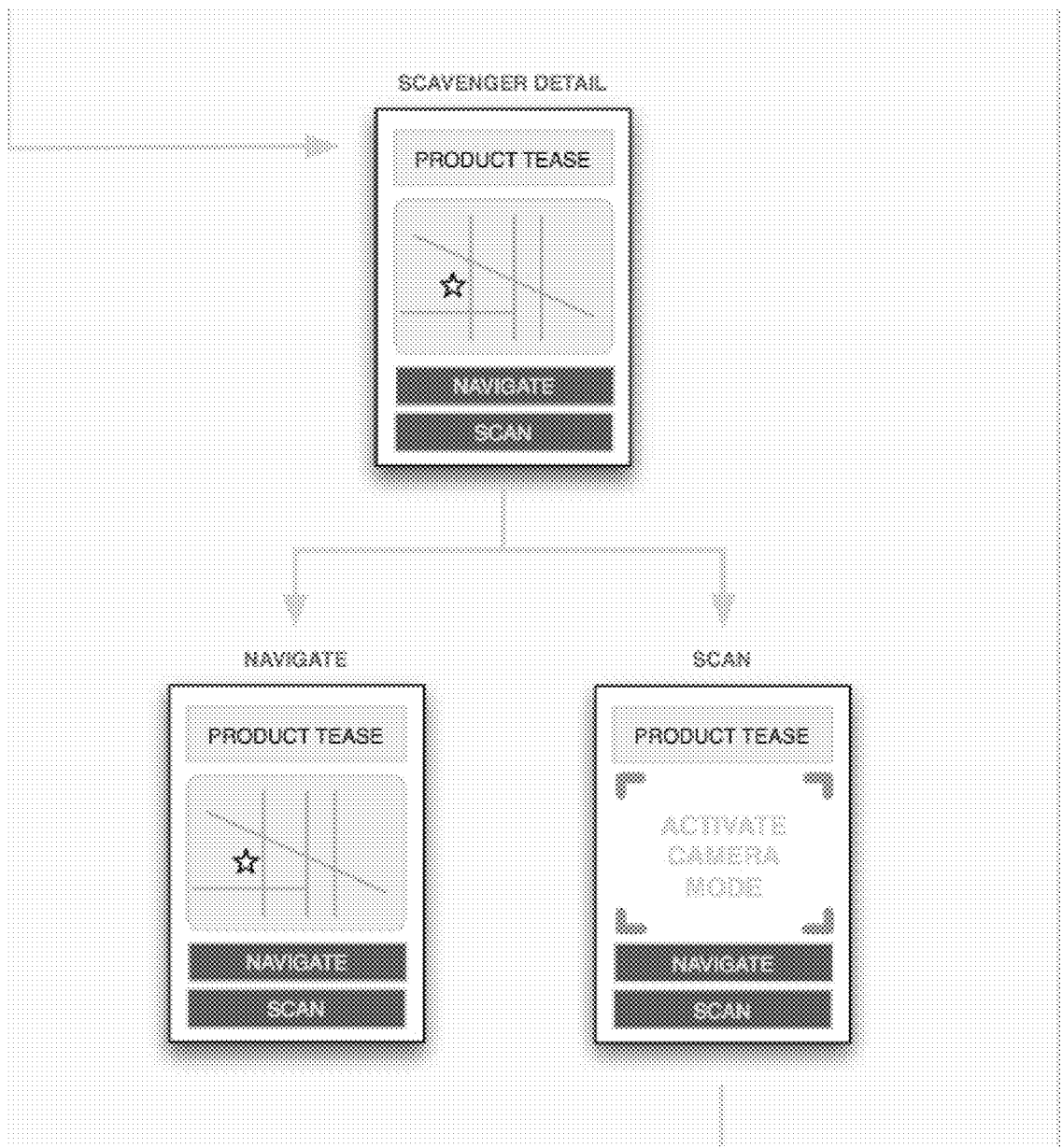
FIGS. 15A-15B are other example navigation diagrams for a mobile application in a scavenger mode.
Figure 15B:
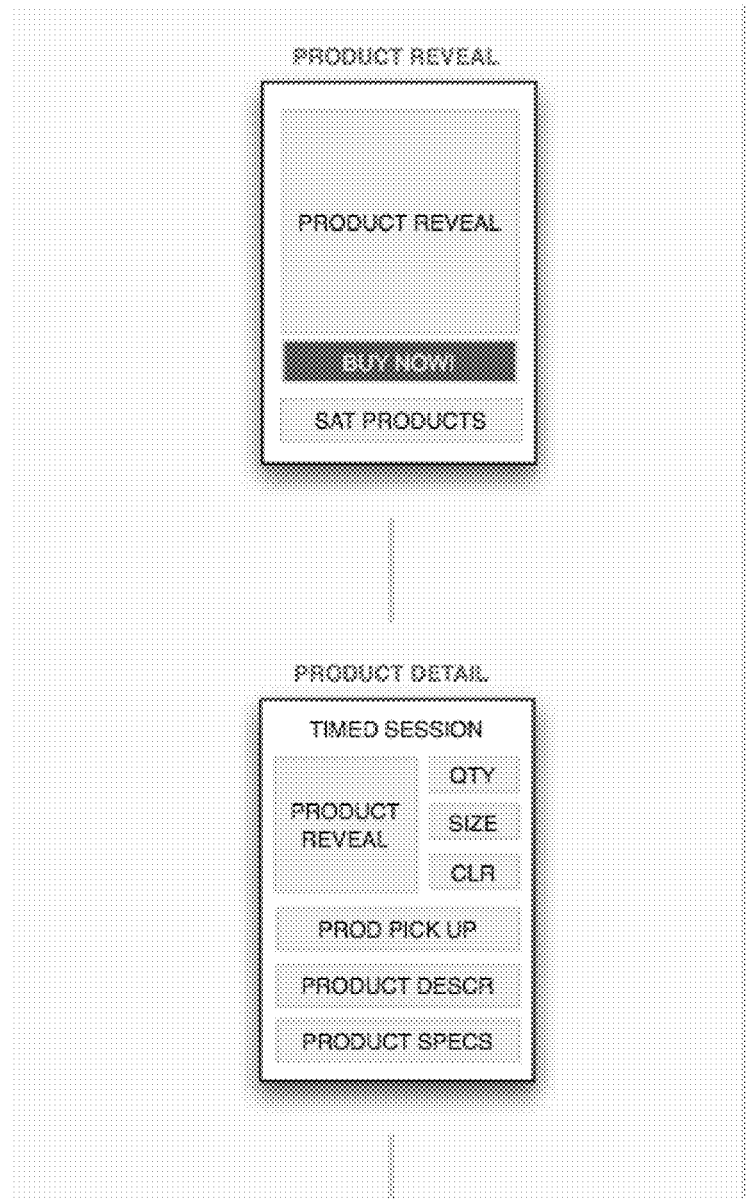

FIGS. 15A-15B illustrate one example of a navigational flow for a user interface configured in a scavenger mode. In the navigational flow diagram, after a product is teased, the product may be navigated to via a displayed map and scanned by the mobile client. Once scanned, a product reveal page is allowed that allows a user to either purchase a product or join a virtual line for a product. Once a product is offered, a timed session may begin for a user to view details about the product and purchase the product.

In various embodiments, Scavenger Mode begins when the user receives a push notification that a Scavenger event (to unlock a hero product) is being held, and upon entering the application the user may see a visualization (via Google Maps) of where the FlagTag is with a dropped pin showcasing the location; this pin is shareable via social networks. The user then seeks out the FlagTag at that location. The FlagTag may be a unique identifier such as, for example, a pre-specified logo or artwork identifiable via image recognition and a QR-code style data border; any pre-specified logo or artwork can serve as the unique identifier.

In another embodiment, the FlagTag marker (uniquely identifiable with machine-readable embedded data in its design) may be stitched or printed on apparel, or other surfaces, as a tag or visual that users may scan, allowing the apparel to act as an unlocked boutique of other products or content. For instance, scanning a FlagTag on a t-shirt may unlock a new exclusive single by a popular focus entity or band.

Figure 11:
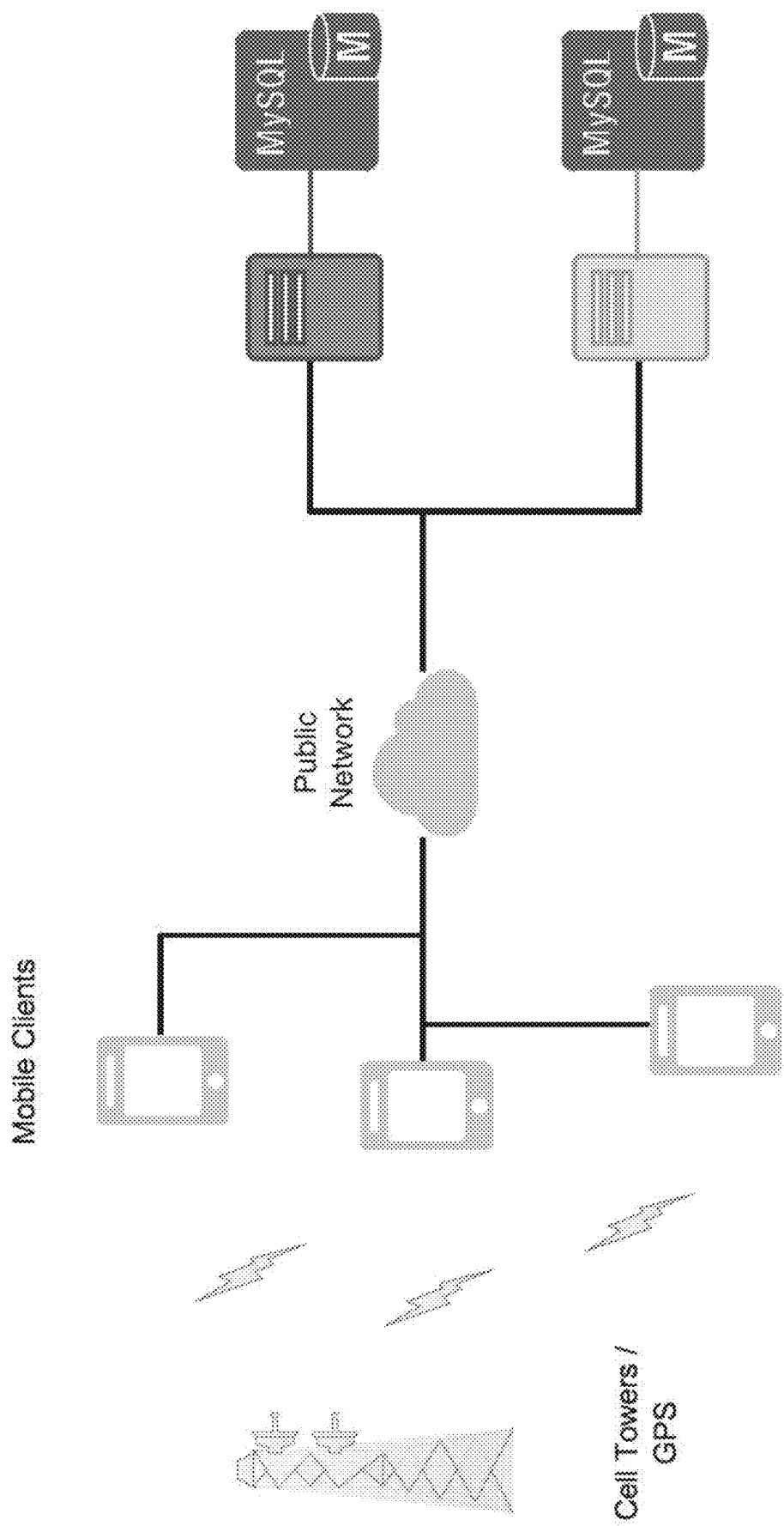
FIG. 11 is a context diagram of a content management system (CMS)
Figure 12:
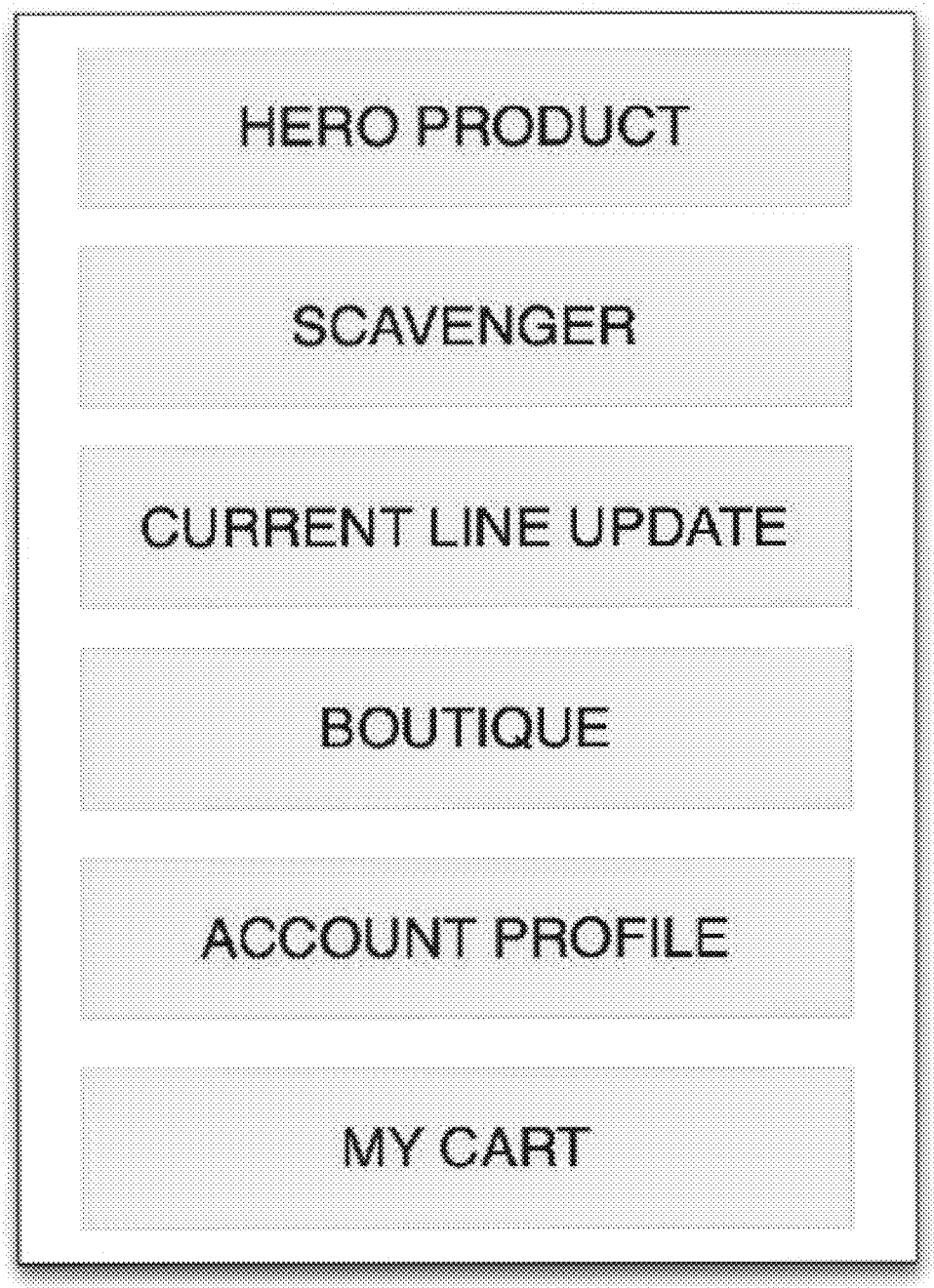
FIG. 12 is an example of a user interface screen.

In one embodiment, Scavenger mode allows users to unlock hero product promotions or join a virtual line for a hero product if they find and scan with their mobile computing devices a fiducial in a physical location (e.g., hidden in a store or other location). As illustrated in FIG. 11, mobile clients may include the following features:

Mobile clients may use cell towers and Wi-Fi hotspots in order to determine GPS position.

Mobile clients based on current position, may receive a geo-location from the CMS server in order to alert users when they are near a FlagTag.

Once the user has successfully scanned the flag, the mobile client may request the product information from the eCommerce server 100.

In these embodiments, to enable participation in scavenger mode from the FlagTag location, with each successful scan the application may allow a new user into the virtual line. Per geo-location, a select number of users within a predefined radius (e.g., a 30 foot radius) may be allowed. If a user leaves the zone without scanning and there are other users within the radius who have not yet been allowed into a line due to the number limit, new users may be allowed in. This allowance enables the mobile device of a user to scan and leverage image recognition of the FlagTag identifier; without the allowance, image recognition to unlock the exclusive product is not allowed. Once the FlagTag is successfully identified via image recognition, the user may unlock an exclusive hero product.

Figure 16:
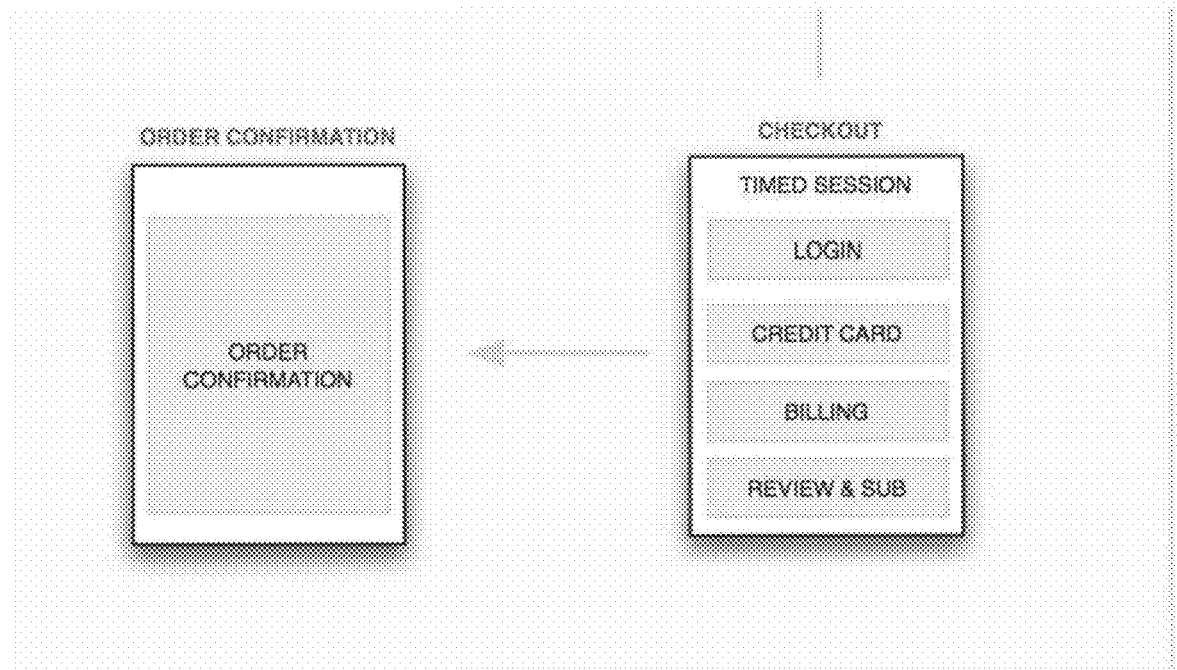
FIG. 16 is an example navigation diagram for a mobile application in a checkout mode.
Figure 61:
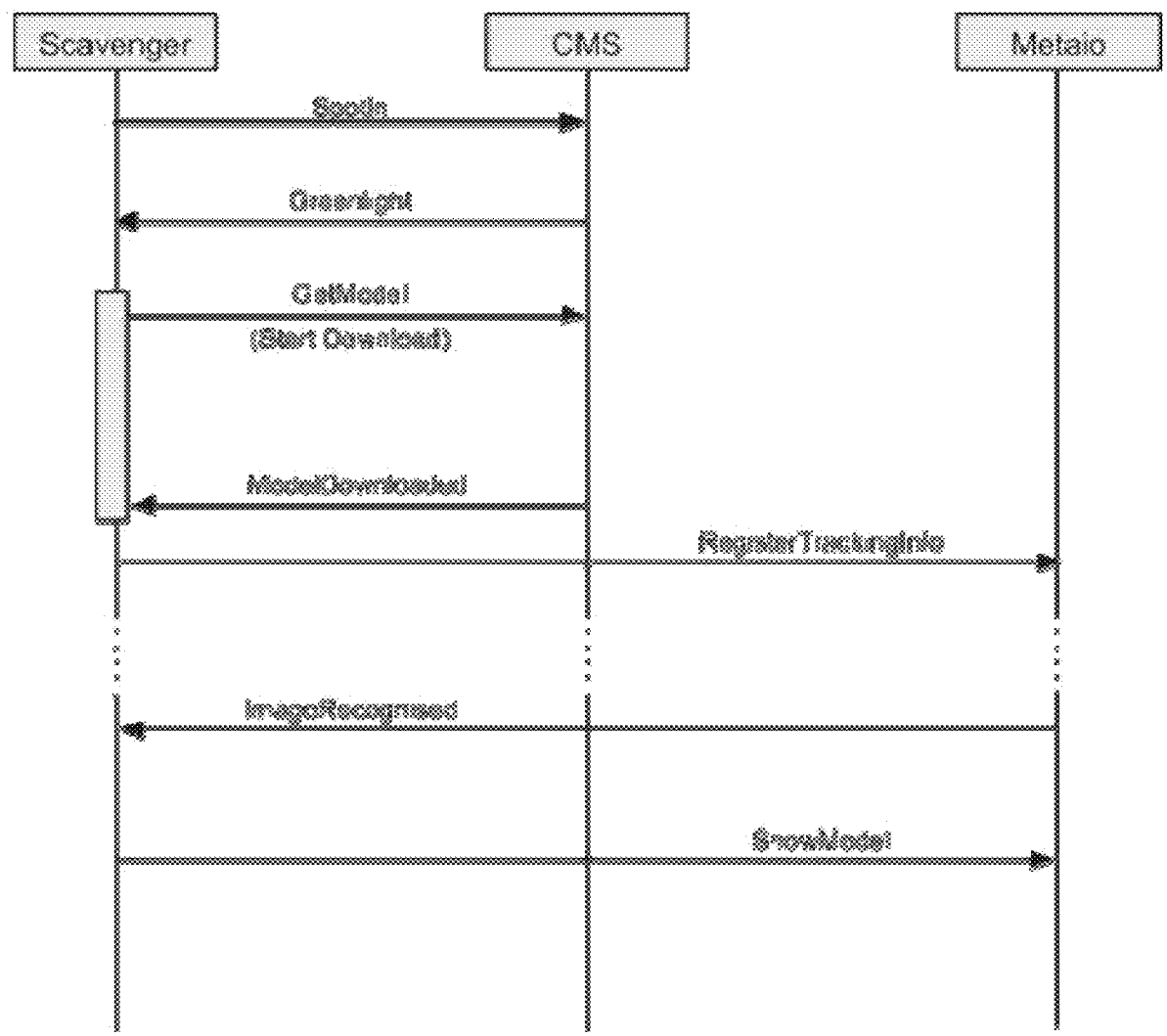
FIG. 61 illustrates an example sequence diagram for interaction between an application and a content management system.

Referring to FIG. 61, a sequence diagram for an application interacting with the CMS is illustrated. In the embodiment shown, the logo is recognized using Metaio Framework. Metaio is an Augmented Reality Framework that allows users to detect images comparing them with a pattern image. Metaio is configured to deal with transformations that can be applied to the pattern image, such as scaling, 3D rotation, and shearing. The sequence diagram shows how the application interacts with the CMS and Metaio Framework during the product unlocking process. In other embodiments, a different framework may be used to display augmented reality content In response to the hero product unlock, there may be a countdown widget displayed to indicate to the user that he or she has a predefined period of time (e.g., 10 minutes) to hit the Buy button and checkout, creating a sense of urgency to reserve and buy the hero product. FIG. 16 is one example of a user interface configured in a check out mode. For instance, if the user does not checkout during the 10 minutes, he or she misses the chance to buy the hero product. In one embodiment, the only limit to buying the hero product after receiving an allowance is the inventory of the hero product, as it is distributed in person in close proximity to the FlagTag spot and therefore may be limited in supply.

Mobile Client Scavenger Mode Flow

Figure 17:
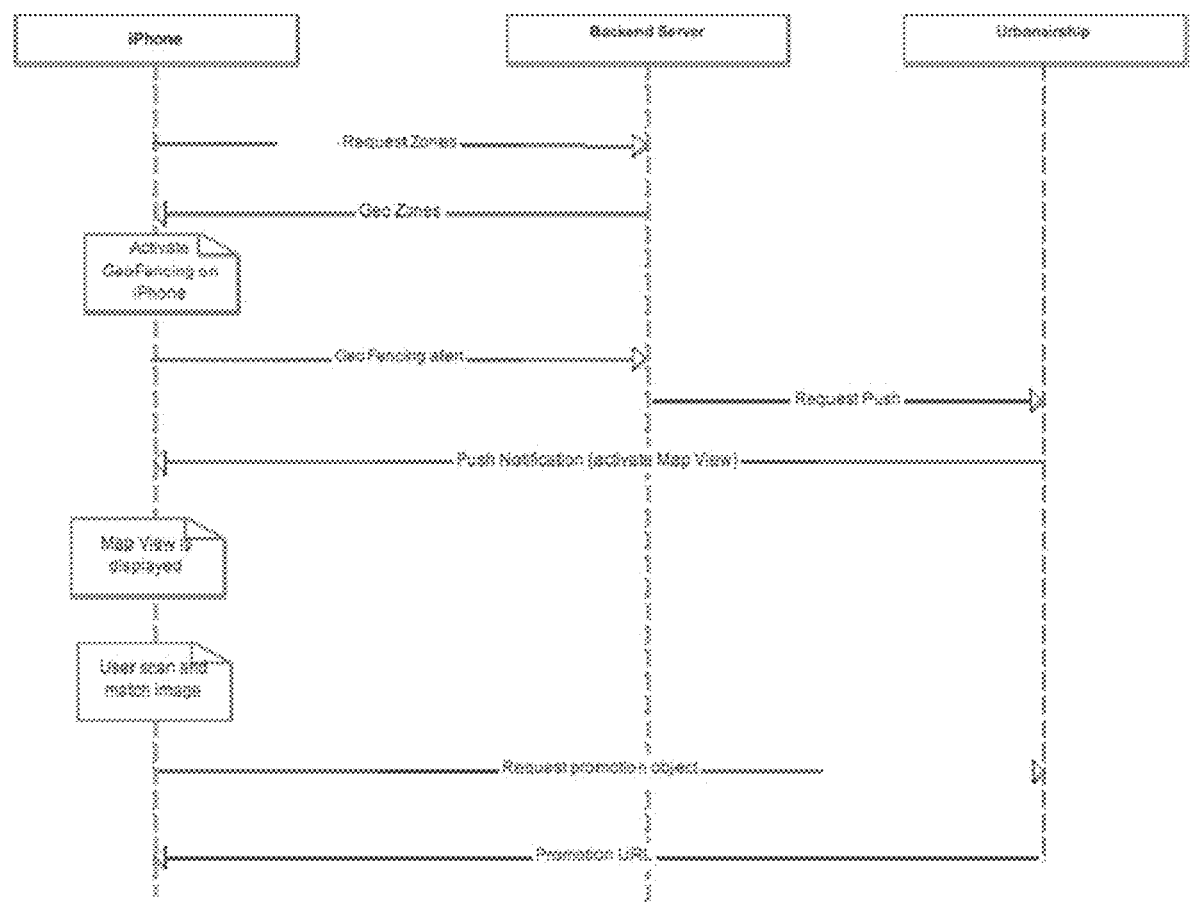
FIG. 17 is an example unified markup language (UML) diagram for a mobile application in a scavenger mode.

FIG. 17 illustrates one example of a mobile client Scavenger Flow. The example steps may include:

1. The first time the application runs (and following subsequent updates), it may request for all relevant geo-location (e.g., location within proximity of the mobile client).

2. For all the zones returned, the application may configure the "regions" to be monitored. When a user enters one of these regions, there are, for example, two possible scenarios:
   the application is on foreground mode (active)
   the application is on background mode (inactive)

In one embodiment, if the application is active, the map view with the corresponding information may be displayed to the user and normal flow continues. If the application is inactive (e.g., due to operating system restrictions), the system may be restricted from moving to foreground mode without user interaction. In this scenario, the application may send a notification to the eCommerce server 100, which in turn may send a push notification to the mobile client so the user is warned that he has entered the "promotion" zone.

3. Upon receiving the push notification (the user may need to "open" it), the application may display the map view.

4. Once the user locates the "flag," the user may scan the image and the application may look for a match. Once the image is verified, information (user profile, gps coordinate, image fingerprint, etc) may be sent to the server in order to display the promotion information and redirect to the eCommerce web page.

Line Mode

In some embodiments, users line-up within the application and compete to get to the front of the digital line in hopes of winning the opportunity to purchase the limited-run hero product. Oftentimes, in the line itself, products may present themselves for purchase. In other circumstances, the products may be locked and require the help of the fan occupying the spot where the product is hidden to unlock it.

According to some embodiments, in addition to the line's digital visualization, the missions that allow users to move up spaces in the line to get closer to being able to purchase the product are unique in that they are based on certain social, peer-to-peer, or gameplay-based activities.

One of these peer-to-peer activities may be the ability to hide products or content within spots and allow other users to unlock them by Jumping over that profile, thereby giving both users the benefit of the product, content, or promotion they unlocked; one particular form of unlocking products is trivia in which one user selects another user's profile picture as the answer, resulting in mutual reward for those two users. Closely tied to the team unlock is the unique ability for one user to give a discount to another user (or to gift jumps or your spot in line to another user).

Figure 13:
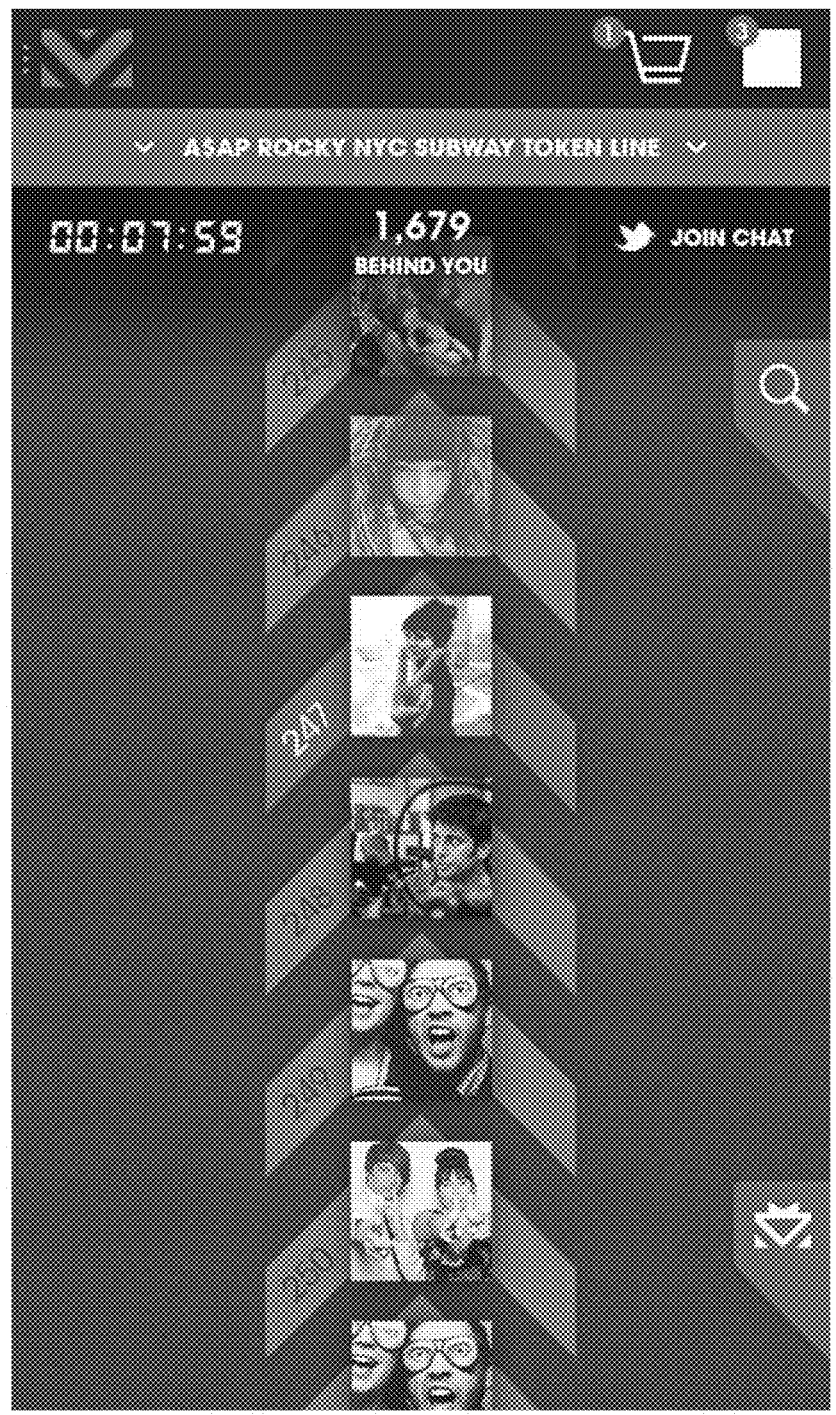
FIG. 13 is an example user interface visualizing a virtual line.

According to some implementations, users in line mode may view numbers indicating how many users are behind them and how many users are in front of them. This may be shown when a user peeks at statistics by swiping his avatar (e.g., profile picture) to the right. In these implementations, the numbers may be displayed as, for example, "1,679 BEHIND YOU," as illustrated in FIG. 13. In other implementations, a user's position in line may be displayed as, for example, "345 OF 1,560 FANS IN LINE.

Line Mode Detail

In some embodiments, users are invited to digitally start lining up 48 hours before the hero product sale begins; this sale may occur post-scavenger mode product unlock or without a scavenger mode product unlock. In line mode, the objective is for the user to move up spaces toward the front of the digital line before the sale ends to ensure he or she is eligible to purchase the hero product. Moving spaces and "jumping" in line occurs via opportunities for users to engage with each other through completing missions, sharing rewards and looking through the line to find specific users matching mission criteria.

In one embodiment, opportunity to purchase hero products requires waiting in line. In this embodiment, waiting in line may require commitment (e.g., attentiveness). Also, users may have to "check in" (e.g., login, perform missions, etc.) periodically. For instance, users might have to login at least two times during the course of the hero promotion to ensure they don't lose their spot in line. There may be a series of visual cues to indicate to the user that he is moving closer to the range where he is eligible to purchase the product. In one embodiment, at any time up until he is selected to claim his prize, the user can choose to gift his space in line to someone else and receive a credit for the boutique mode of the application, in which products are organized around focus entities. While this is not a team unlock, this embodiment is another way that users can give discounts and product sales to each other directly, without VirginMega's direct involvement.

Boutique mode is unique in its ability to leverage music listening plays over YouTube, Spotify, etc. to personalize the products served to the user. FIG. 3D illustrates one example of a flow diagram visualizing navigation in a boutique mode.

Missions to Earn Jumps in Line Mode

In some embodiments, missions are the tasks users must complete to earn jumps and move closer to the front of the line. Mission difficulty level may increase as the user gets closer to the front of the line and the number of spots jumped per mission completion may decrease. Missions are available via line mode, and there are at least five types of missions: Data Entry, Social Network sharing, Peer-to-Peer engagement, Team Unlock, which is the ability to hide products or content within user profiles and allow other users to unlock them and experience mutual benefits, and Pure Gameplay.

In addition to completing Missions, users can earn jumps, for example, by:
Buying Products
Viewing Content
In some embodiments, a jump may not be saved. For instance, if a jump is earned through a product purchase or viewing content outside of the line mode, then the jump must be executed before the user can complete a mission in line mode.

It should be understood that missions may include one or more elements defined by user profiles stored within the eCommerce system 100. These user profile based elements may be comprised of photos or details of the profile which may then be visualized in puzzle pieces, game tokens, quiz questions, and quiz answers. For instance, in some embodiments, missions may include mini-games such as trivia based games on user profiles. In this example, users may define trivia questions associated with their profile that other users may correctly answer. Missions may be single player, cooperative, or head-to-head. In at least one embodiment, users team up to take on other users.

Viewing Product/Content

In some embodiments, also on the right of the screen may be satellite product, which are inspired by the hero product and focus entity featured in the Line. Viewing the Product Detail Page for any Satellite product may also earn spots for the user. Users can earn the equivalent of a predetermined number (e.g., 5) of spot jumps for viewing product.

Updating Account Information

In some embodiments, updating account information is typically a one-time mission that may be especially useful for joining a virtual line. At various touch points, users may be asked to fill out missing pieces of their profile (shipping address, credit card, sizing information, etc.) as well as encouraged to add their Twitter or Facebook account if they haven't already done so. Upon completion of these tasks, users may be rewarded with the equivalent of a predetermined number (e.g., 10) of jump spots. Users may be offered predetermined discounts (e.g., 10%) off their first purchase if they add a Gmail account (if they logged in via Facebook initially) and vice versa, and if they follow VirginMega on Instagram or Twitter.

Sharing Content

In some embodiments, multi-media content created by VirginMega may be on the right side of the screen. When a user chooses to share it to earn spots, the application may open a tweet and populate a pre-composed tweet that includes the hero product hash tag. Once the tweet has been shared, the user may jump spots. Users may earn the equivalent of a predetermined number (e.g., 10) of spot jumps for viewing and sharing the tweet.

Inviting Friends

In some embodiments, since a big part of this experience depends on social activity, users may be incentivized to invite friends to sign up for VirginMega. When a friend successfully completes the registration process and validates his account, the user who sent the invitation may receive the equivalent of a predetermined number (e.g., 15) of jump spots and the opportunity to invite his friend to join him in line. In one embodiment, a user can only invite one friend to join him in line per event. In some examples, the friend may receive a spot near the user.

Gift My Spot: Peer-to-Peer

In some embodiments, a user may arrive at the front of the line only to decide that he doesn't want the product after all. Rather than just drop out, the user can select "Gift My Spot" and then choose someone else in line to donate his spot to—this is an example of a peer-to-peer interaction within the line experience, allowing users to change spots and visualize the shift in the line.

Upon clicking "Gift My Spot," the application may ask the user to click on someone else in line. Once the user chooses someone to replace him, there may be an animation of him leaving the digital line and he may be automatically redirected to boutique mode. Based on the number of spots jumped relative to the size of the line, a discount may be offered in the boutique. In one embodiment, a user can only pick people behind him in line, and they may be automatically moved to the spot. The user who has replaced him concurrently may receive a push notification announcing his line jump and new number. When the user gifted the spot opens the application, he may already be in his new spot in line.

Gift My Spot is founded upon the idea that the user's spot in line to purchase the hero product is currency, and gifting this spot to a peer—a user-generated and not VirginMega-induced situation—is a win-win situation for both users linked to product, content, or promotional rewards.

Users who gift a spot may receive props. In some implementations, props may be exchanged for jumps in a virtual line. In other implementations, props may be exchanged for satellite content or satellite products.

Figure 21:
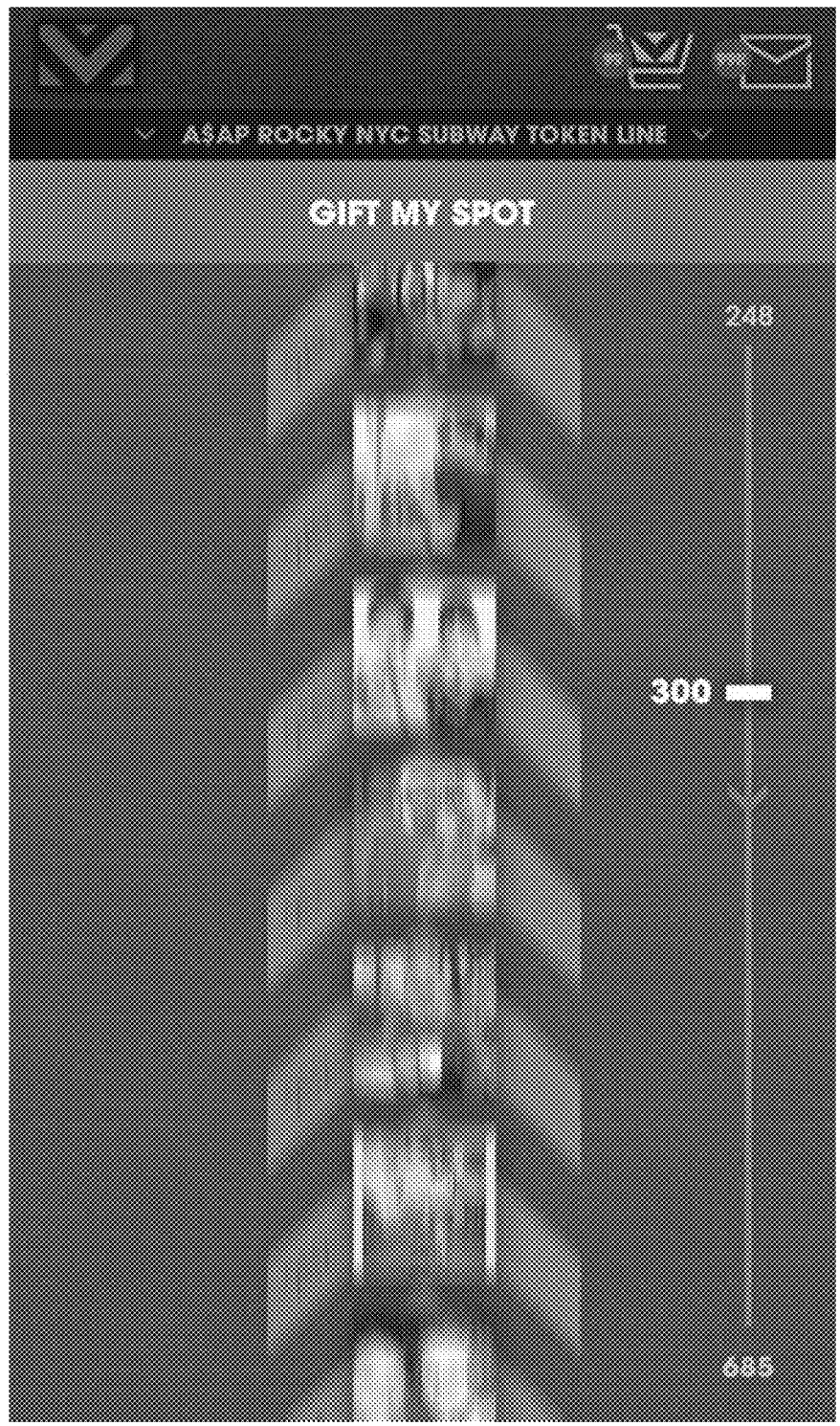
FIG. 21 is one example of a user interface for gifting a spot.
Figure 22:
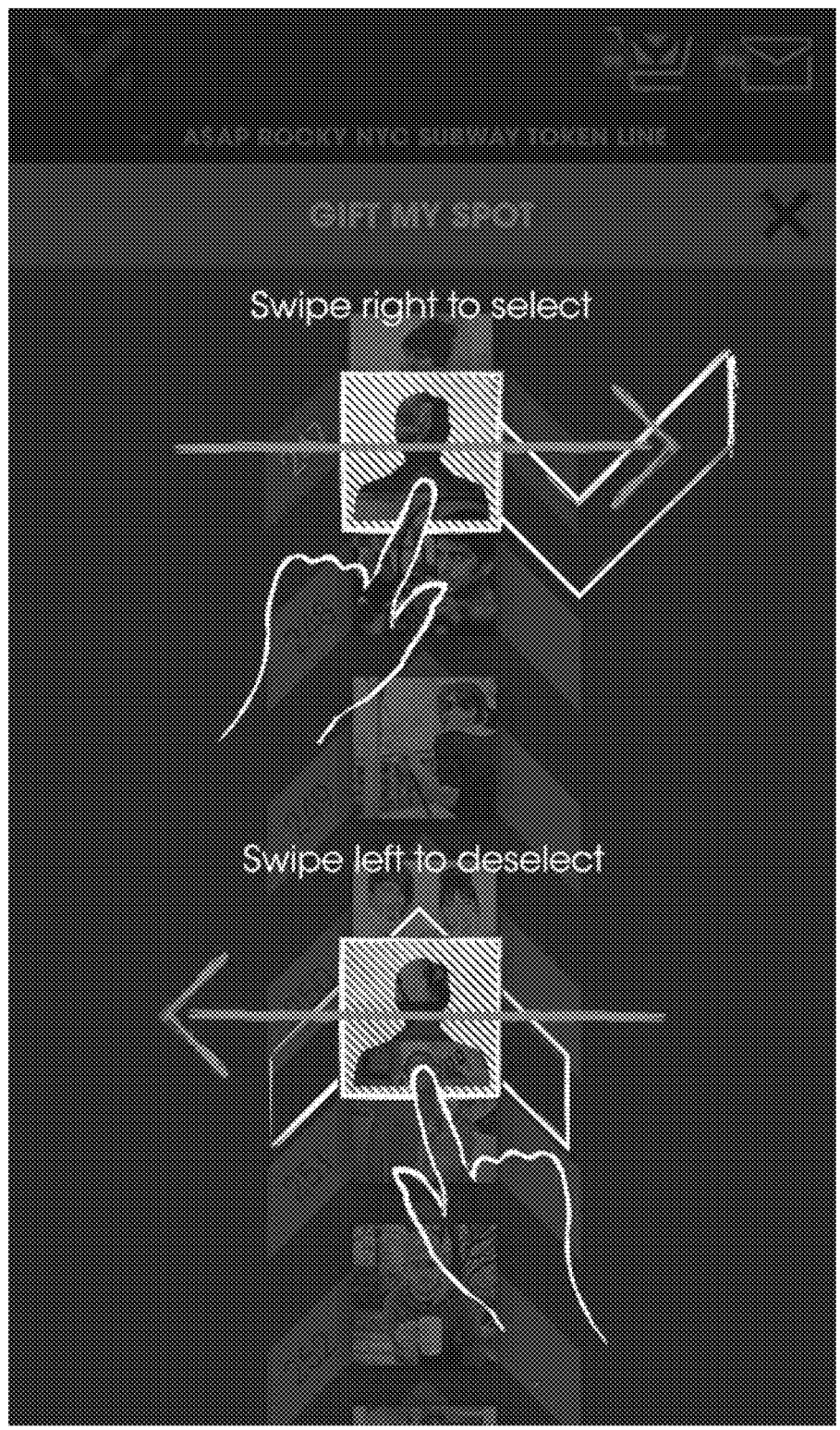
FIG. 22 is another example user interface for gifting a spot.
Figure 43:
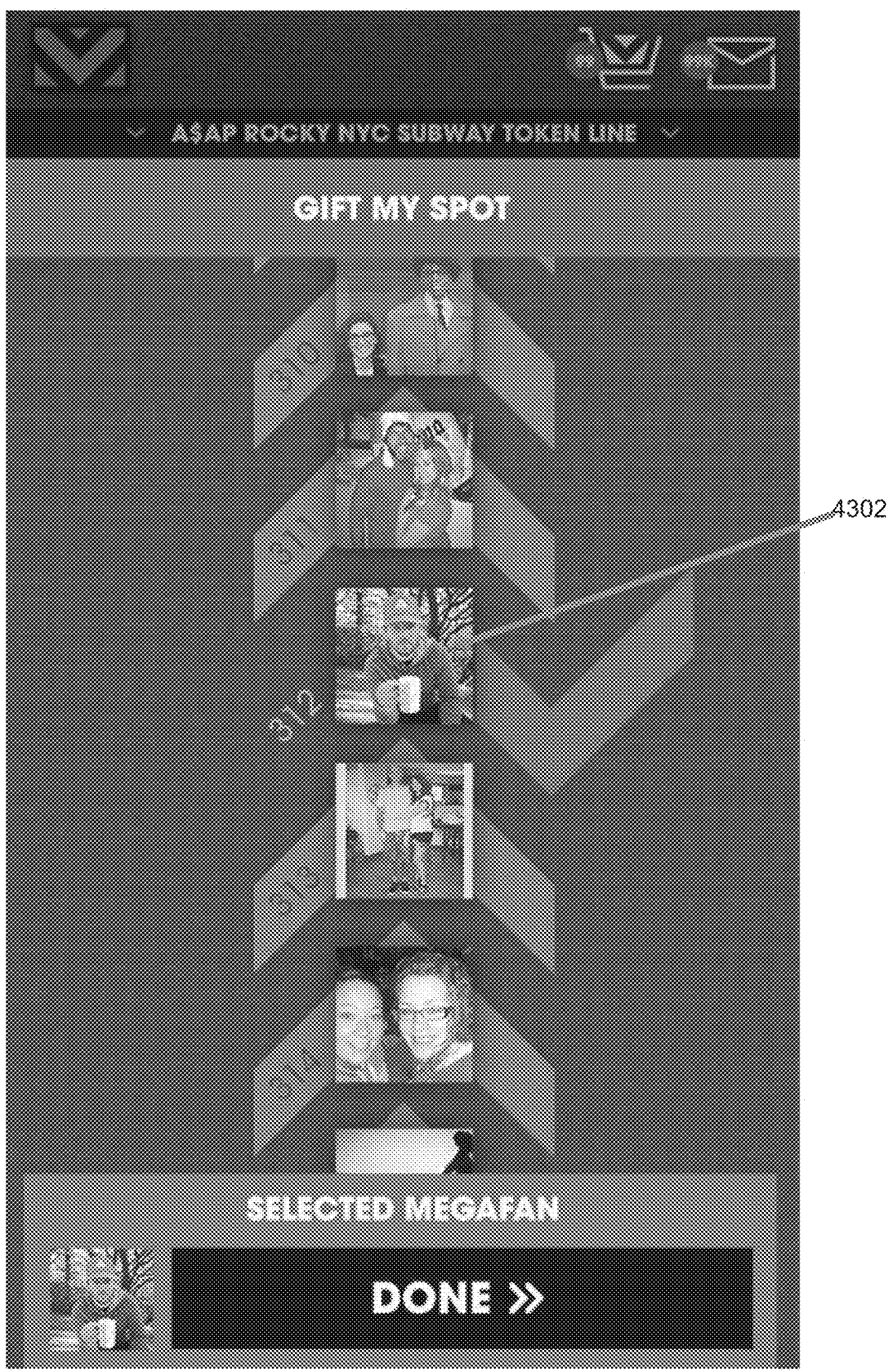
FIG. 43 is one example of a user interface visualizing a fan profile with associated user statistics.

FIG. 21 illustrates an example of a user navigating to a peer in line to gift a spot. A scrollbar on the right side may be used to quickly go to a spot in line. FIG. 22 illustrates example instructions for choosing a user to gift a spot to. In this example, the user may swipe right to select the user and swipe left to deselect the user. FIG. 43 illustrates a peer user 4302 that has been selected, for example, by a user swiping right on the peer user 4302.

Figure 77:
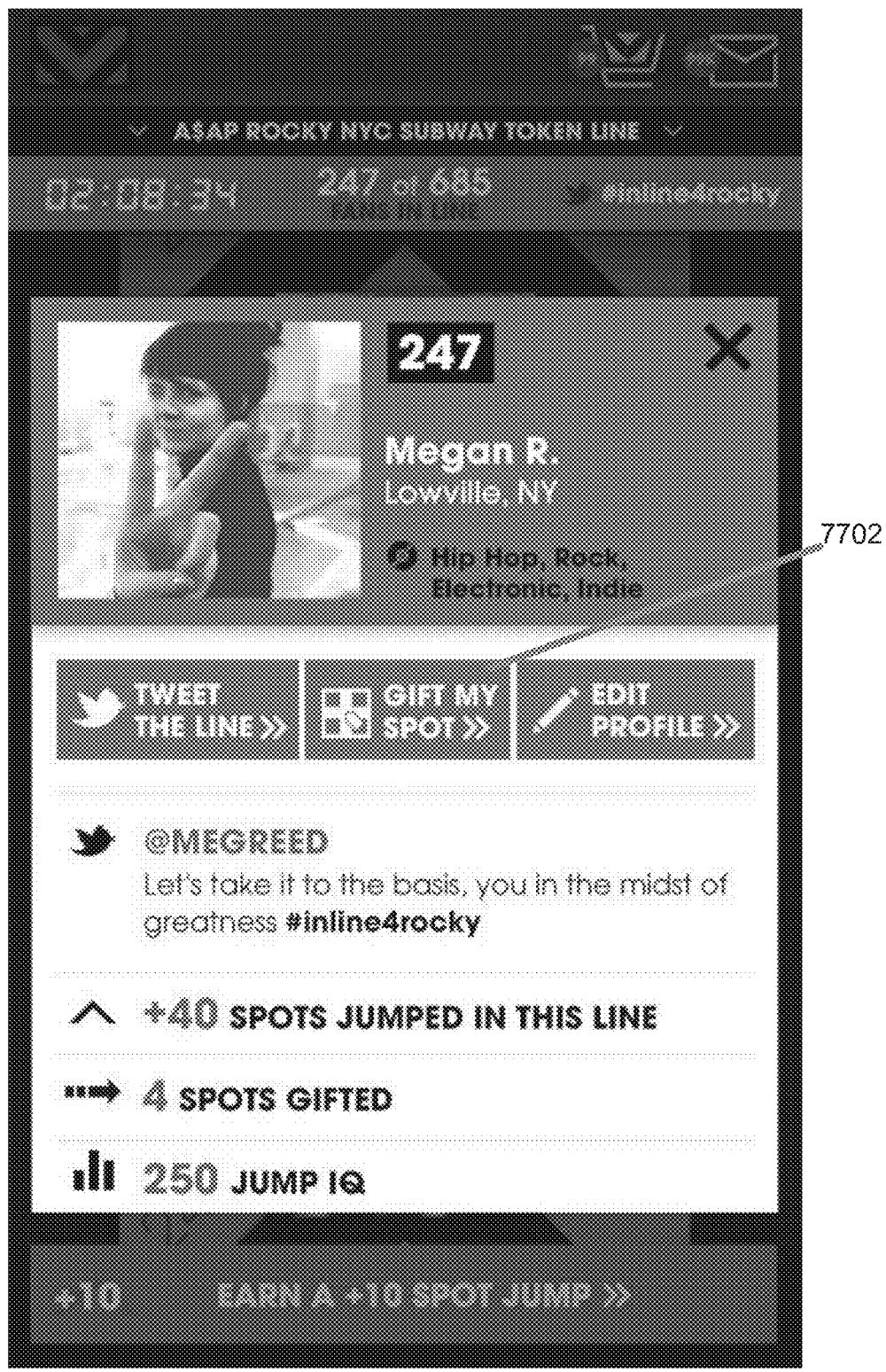
FIG. 77 is an example user interface of a user profile.
Figure 78:
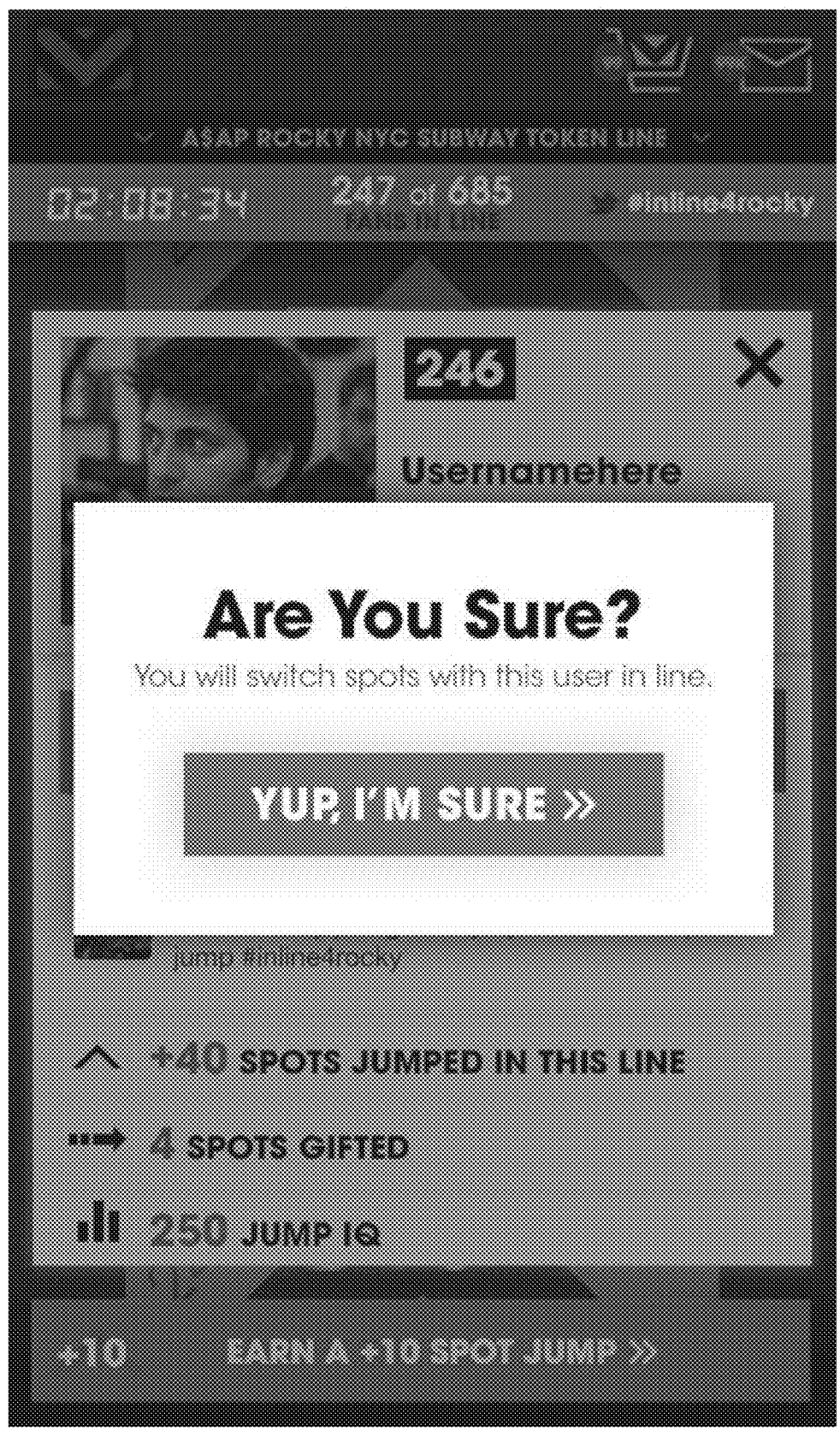
FIG. 78 is an example of a user interface for gifting a spot.
Figure 79:
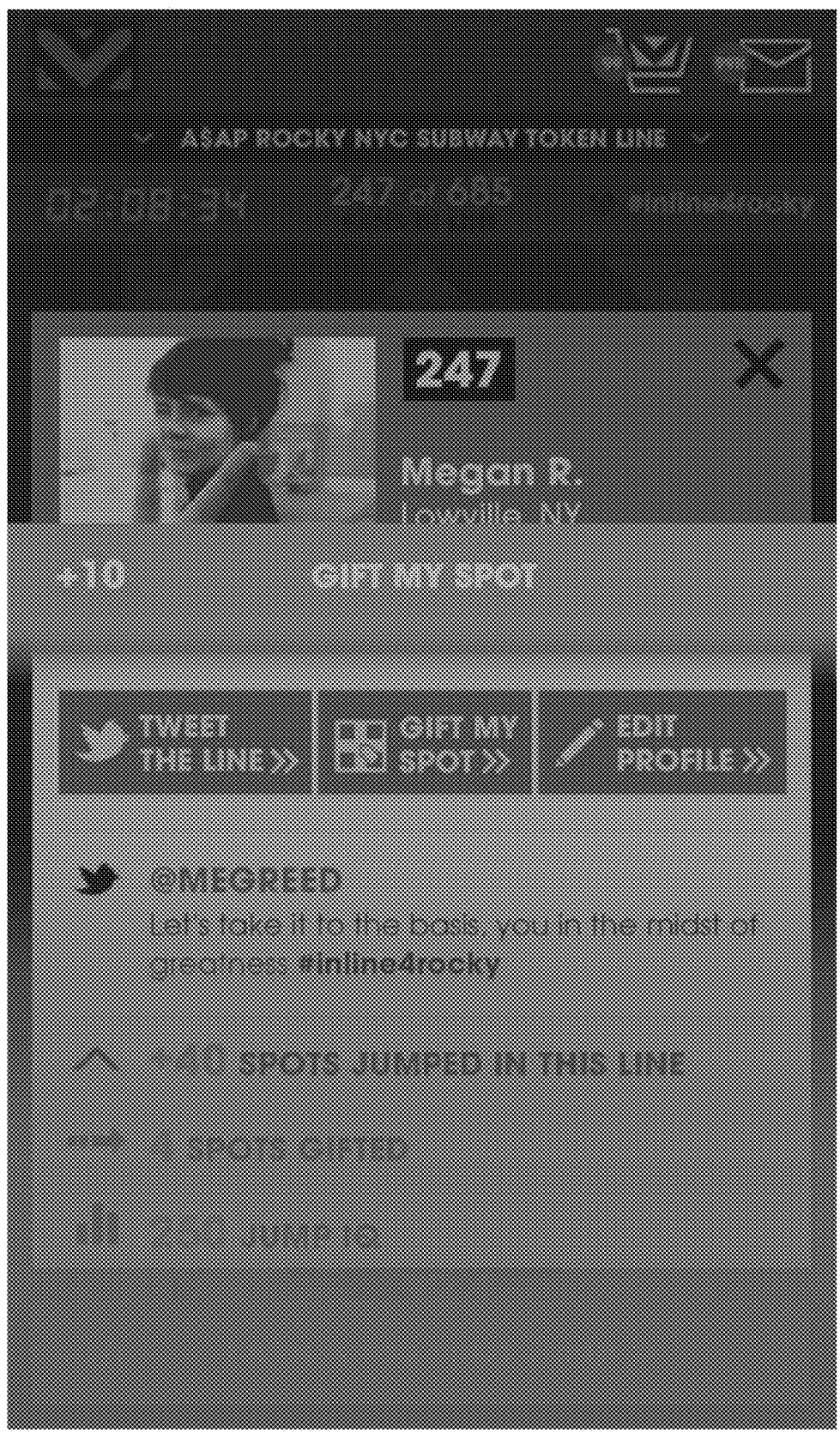
FIG. 79 is another example user interface for gifting a spot.

In some implementations, when selected, a user's profile may be displayed. The user's profile may include various information about the user including the user's social network information, location, interests, jump IQ, spots jumped in the current virtual line, etc. FIG. 77 illustrates an example user profile that may be displayed after being selected. A user may select the "GIFT MY SPOT" option 7702, which may lead to a confirmation. FIG. 78 illustrates a confirmation to switch spots with the selected user. If a user agrees to switch spots, an animation may activate. FIG. 79 illustrates the animation (the "+10 GIFT MY SPOT" area of the page transitioning upwards. After the animation, a confirmation may appear indicating the switched spots, props gained from the switch, and the user's new spot. FIG. 80 illustrates an example confirmation screen of the user interface.

Jump Gifts

Figure 14:
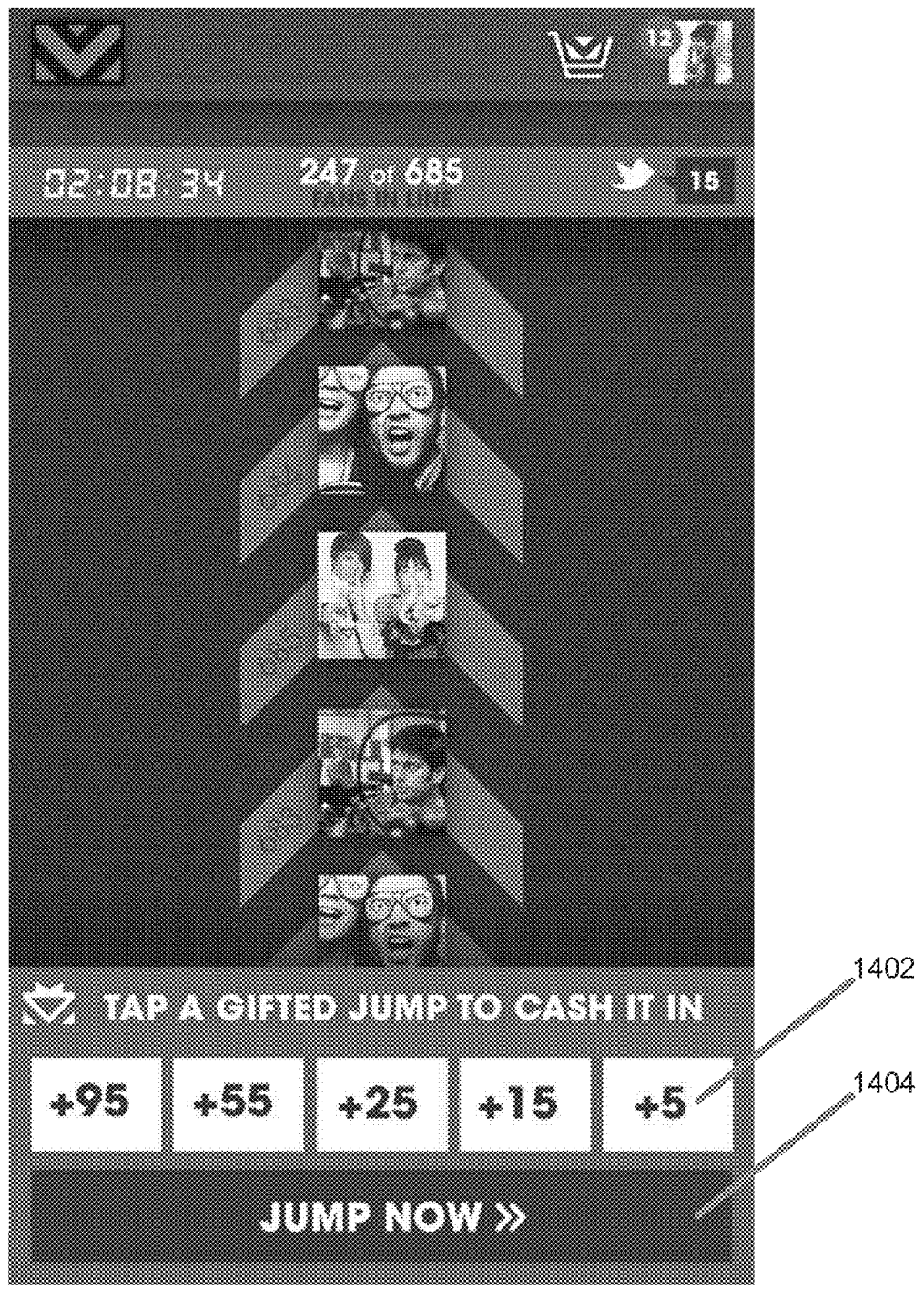
FIG. 14 is an example user interface visualizing a gifted jump.

In some embodiments, a user may receive jumps to move up in a virtual line as a gift. The jumps may be received, for example, as a social reward from an Admin, from another user, or as an award for completing a mission. The rewarded jumps may be saved for use on any virtual line. FIG. 14 illustrates an example user interface of a gifted jump screen. The user in FIG. 14 has five jump gifts consisting of 95 jumps, 55 jumps, 25 jumps, 15 jumps, and 5 jumps. The user may choose to use a jump gift 1402 and the application may move the user up the selected number of spots in response to receiving an input on the "JUMP NOW" button 1404. If jumps are not used, they may be saved for a future time.

Soul Mates: Team Unlock

According to some embodiments, in soul mate missions, two players that are both in the application asynchronously may collaborate to answer a trivia question, pick the same answer for a Name That Tune or combine their skills on another mini-game challenge. Both players may get the question and 5 seconds to answer. To win, both people must pick the same answer. A sample question might be, "Rank these A$AP lyrics in the following order: first to worst [three lyrics], or "Favorite movies with Common: [three movies]."

The reward for completing a soul mate mission correctly may be double the equivalent single player mission. Another focus of the soul mate mission may be hiding products or content like a secret download within user profiles and then allowing other users to unlock them, thereby giving both users the benefit of what is unlocked and in some cases a boost to move toward the front of the line and the chance at buying the hero product.

Trivia

In some embodiments, trivia requires users to answer trivia questions about a focus entity around whom the hero product is catered. Three trivia challenges are equal to one mission. If a user answers three questions correctly, he can advance the number of spots earned for that mission. If he answers incorrectly, he remains where he is in line but must wait 30 seconds before he can try again.

Some embodiments implement a socially oriented trivia with choices comprised of other user's profile pictures, and the application may reward both the user who answered the question, and the user the trivia respondent answered with identical rewards. This is another way to allow users to in effect reward each other and allows one user to unlock content based on his interaction with another user's profile.

Name That Tune

In some embodiments, the application may leverage the capabilities of the mobile computing device (e.g., iPhone) to introduce more multimedia missions. One example would be to play a few bars of the focus entity's song and have the user submit the name in a predetermined time period (e.g., 5 seconds). A more obscure song is worth a larger jump or might only appear as a user gets closer to the front of the line.

Tap That Beat

In some embodiments, a user must keep the beat for a few bars of a song by the focus entity or inspired by the focus entity. The more accurate, the more spots he jumps.

Portrait of the Artist

In some embodiments, a challenge is offered to a section of the line to draw a portrait of the focus entity and make it your avatar. The focus entity reviews the submissions and picks a winner, who is awarded the product.

Check-Ins

In some embodiments, to hold his spot in line, a user must check-in at least once every 24 hours for the duration of the sale. A check-in is complete when the user opens the application. Once a user is added to the line, the 24-hour countdown starts. If a user fails to check-in within the 24-hour time frame, he may be removed from the line.

Line-Region and User-Driven Product Management

In some embodiments, Admins may select line locations (e.g., the top 10% in line or the user in spot 100) and those in the selected line locations may be served better offers like an invite for a chance to win a ticket to space, giving people a reason to jump to the top 10% or engage in challenges to get to a certain spot.

Admins may bring certain content to the back of the line on-demand, and may reserve line spots for certain users (e.g., a company) to manipulate the line as desired (e.g., if two friends get separated in an offering to a group of users, Admins can group the two friends back together). Line placement may affect the price of products being offered. Admins may select Content personalized to user groups in boutique mode and line mode, and additionally engineer social interaction/missions amongst users in scavenger mode.

Admins may also manually eject users from a line. The application may allow an Admin to eject a user for a variety of reasons, including inappropriate behavior, inactivity, or a request from another user. Once ejected, the application may push a notification indicating the ejection and the reasons for the ejection. In some embodiments, the application may allow the Admin to send a warning message to a user. If the user continues disruptive behavior, the application may then eject the user.

According to some examples, the application may flag user accounts as a VIP or "mega verified." The application may allow focus entities, celebrities, and VIPs in a line to digitally engage with fans through an interface only available to profiles that have been flagged as mega verified. The application may allow celebrities and focus entities who are flagged as VIPs access to a special interface available exclusively to VIP profiles. The focus entities can add digital autographs to avatars in line in the form of a fingerprint or other asset. In one example, the application may allow the VIP profiles to engage in an exclusive chat with mega verified users.

Figure 51A:
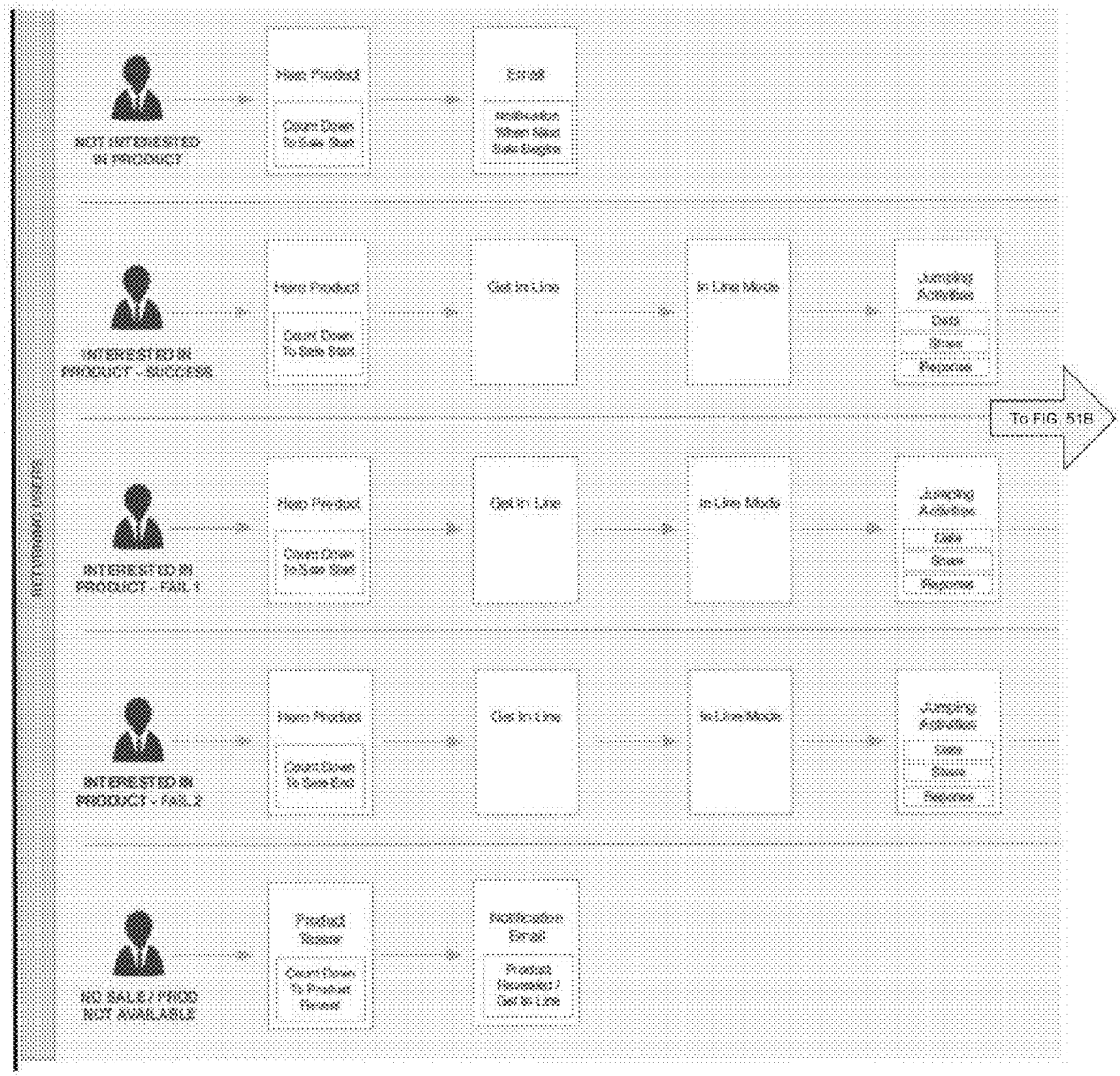
FIGS. 51A-51B illustrate one example of a flow diagram visualizing navigation in the eCommerce system according to one embodiment.
Figure 51B:
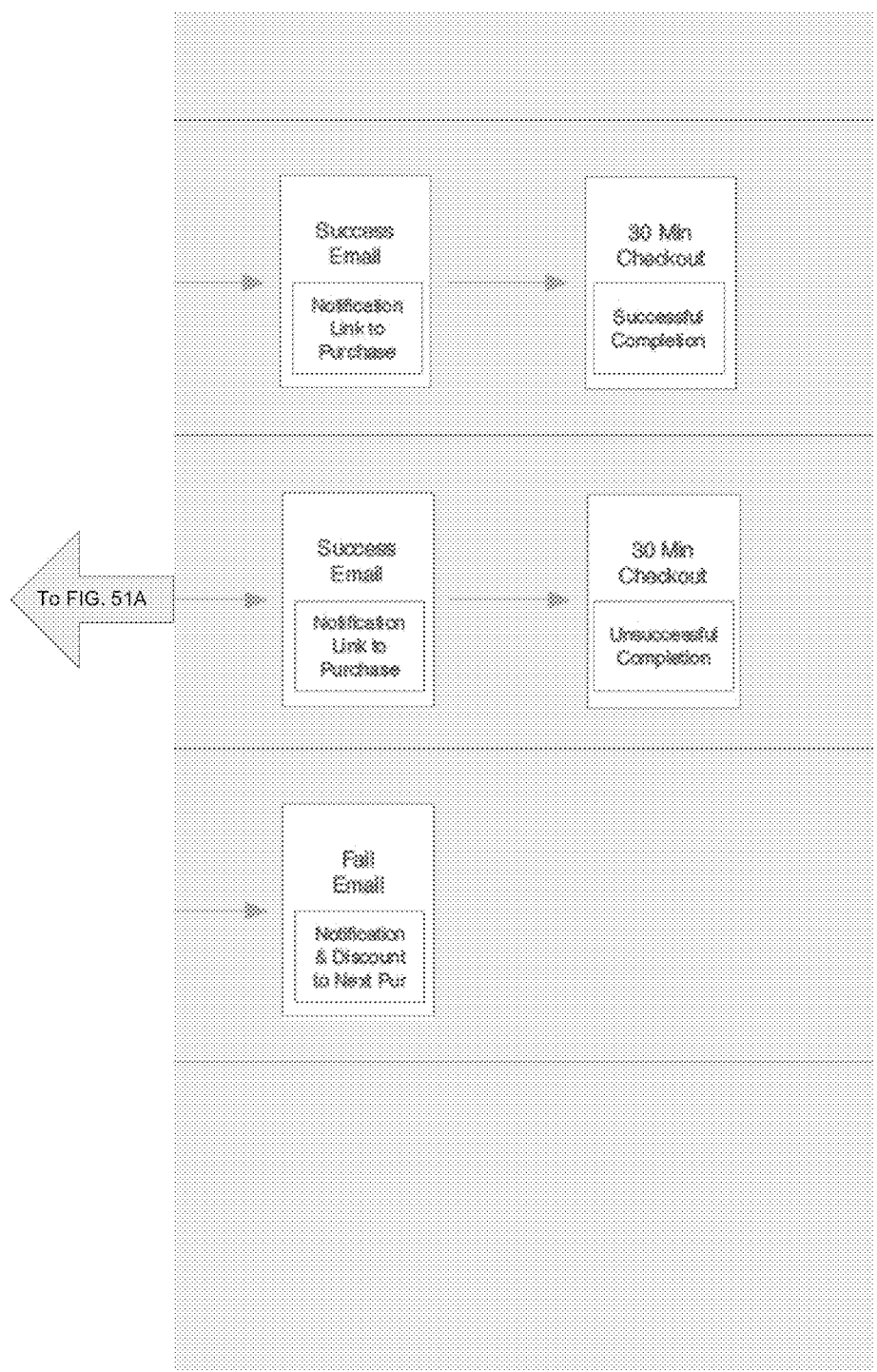
Figure 52A:
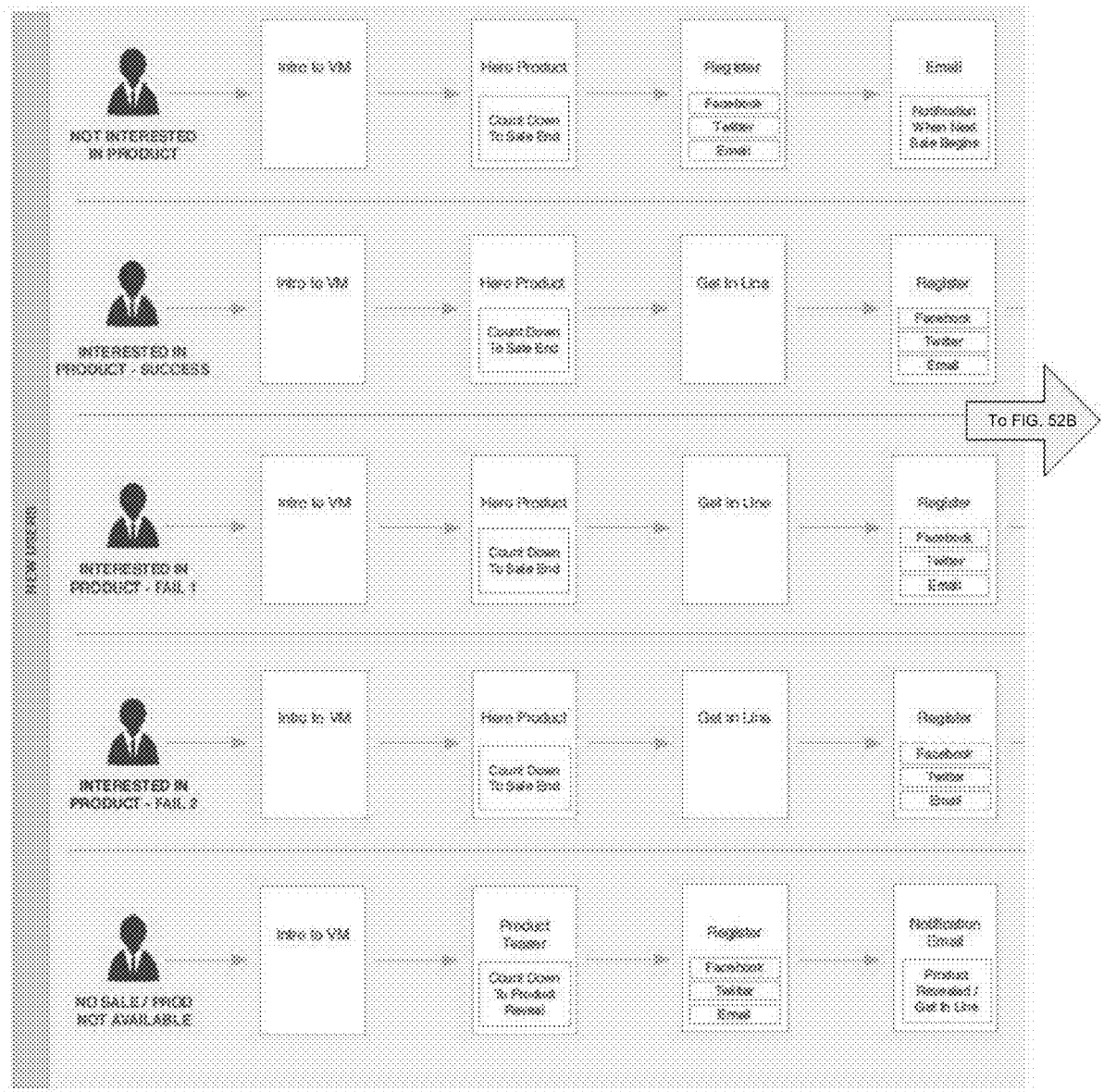
FIGS. 52A-52B illustrate another example of a flow diagram visualizing navigation in the eCommerce system according to one embodiment.
Figure 52B:
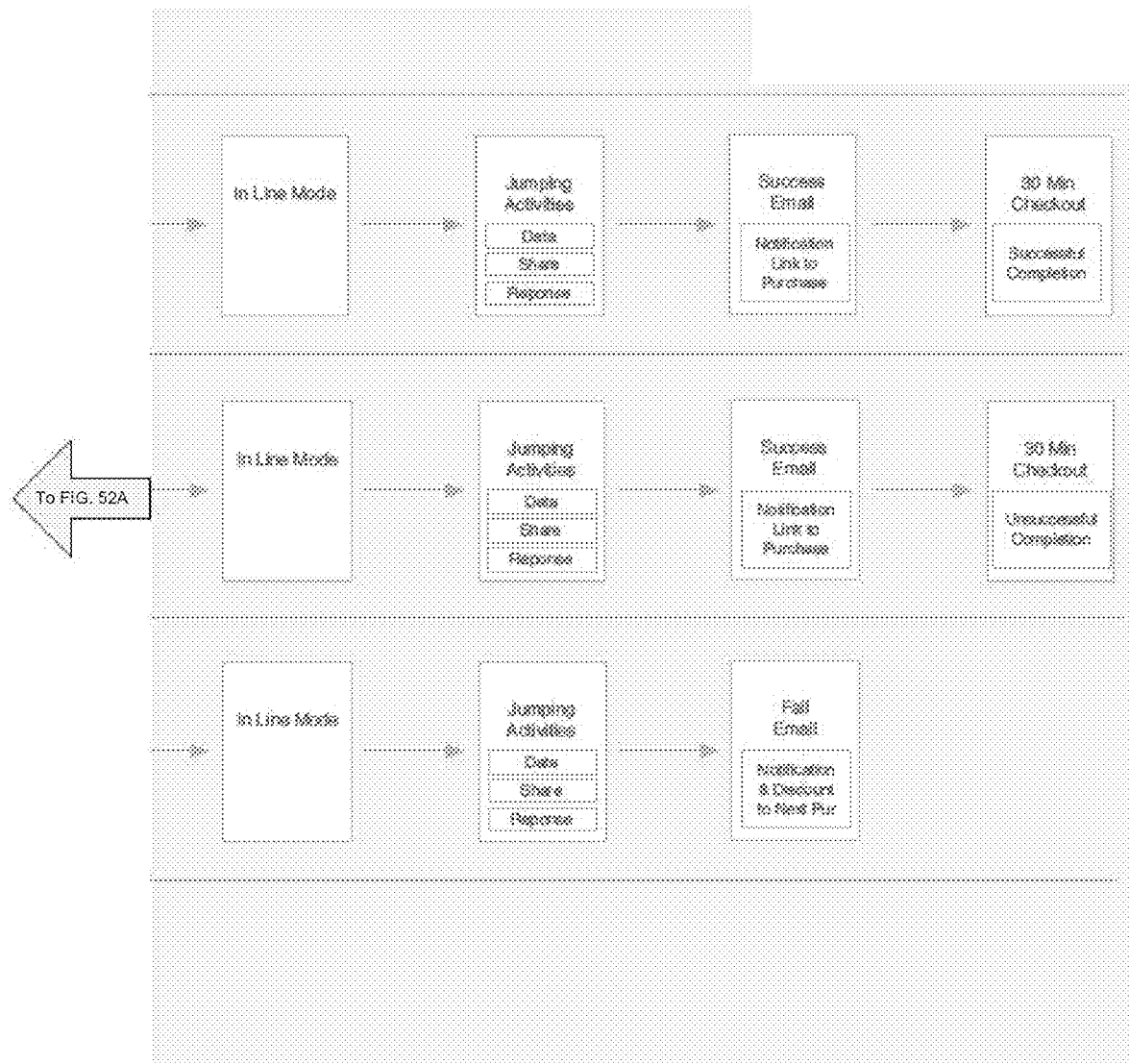

FIGS. 51A-51B and 52A-52B illustrate example user stories. For instance, some users may be successful in joining a virtual line and achieving a spot in the virtual line allowing for the purchase of a hero product. FIGS. 51A-51B illustrate user stories for returning (previously registered) users. FIGS. 52A-52B illustrate user stories for new users (not previously registered).

FIGS. 51A-51B illustrate five user stories relating to users vying for a hero product. The first user story ("NOT INTERESTED IN PRODUCT") illustrates a user who is not interested in the hero product. The user does not get in line for the hero product, and the application sends a notification (e.g., an email) indicating when the next sale begins. The second user story ("INTERESTED IN PRODUCT—SUCCESS") is the ideal user story for a user who wants a hero product and successfully purchases it. The user gets in line, participates in jumping activities in line mode, receives an email indicating that his final spot qualified for the product, and successfully purchases the product within a given amount of time (e.g., 30 minutes). The third user story ("INTERESTED IN PRODUCT—FAIL 1") illustrates an example failure to purchase a hero product. In this user story, the user gets in line and goes through the process of purchasing a hero product, but fails to purchase the hero product in the given amount of time.

The fourth user story ("INTERESTED IN PRODUCT—FAIL 2") in FIGS. 51A-51B illustrates a user joining a line late and receiving an email notifying the user that his final spot is not eligible to purchase the hero product. The email may include a discount for his next purchase or additional jumps for his next line. The fifth user story ("NO SALE/PROD NOT AVAILABLE") illustrates a user following a product and receiving a notification that the new hero product has been revealed with an option to get in line.

FIGS. 52A-52B illustrates similar user stories, except they include an introduction to VirginMega upon loading the application.

Hot Tub Mode

In some embodiments, the application allows users to interact with other users at a predetermined location in the line. The application stores and saves the user's spot in line while he goes to the interaction location. The interaction may take the form of a chat or of a game that is successfully completed by the group that is full in terms or participants. Once the group is full, the members of the group may be rewarded props for the line. In some examples the jump credit may be rewarded based on how long each user stayed in the interaction in hot tub mode. When a user is engaged in an interaction in hot tub mode, his avatar at his current spot may turn into a CTA for other users to tap and join the interaction at the designated location in the line.

Stampede

In some embodiments, the application may verify active users at the beginning of a line by providing them with a mission (known as a "stampede mission") to complete before they can be added to the line. Once the application displays a new line, which may be displayed days before line activity begins, the application may require a short mission to complete to join the line. If a user completes the mission, the application adds the user to the line. If the user does not complete the mission, the application adds the user to an inactive user line until the user completes the mission, in which case the user may be added to the back of the line. This way, all of the users the application admits into the line are active. The application may also use this method of admitting users into a line to avoid having automated users or spambots enter the line.

Hyper Jump

In some embodiments, the application may allow a user to navigate the line by "hyper jumping" to view different parts of the line. The application may receive an input on the right side of the screen to display a drawer. The drawer may offer different hyper jump options to allow a user to view different parts of the virtual line without giving up his spot. The parts of the line may include, among others, the front of the line, the back of the line, the focus entity in the line, and the user's spot in line.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 28:
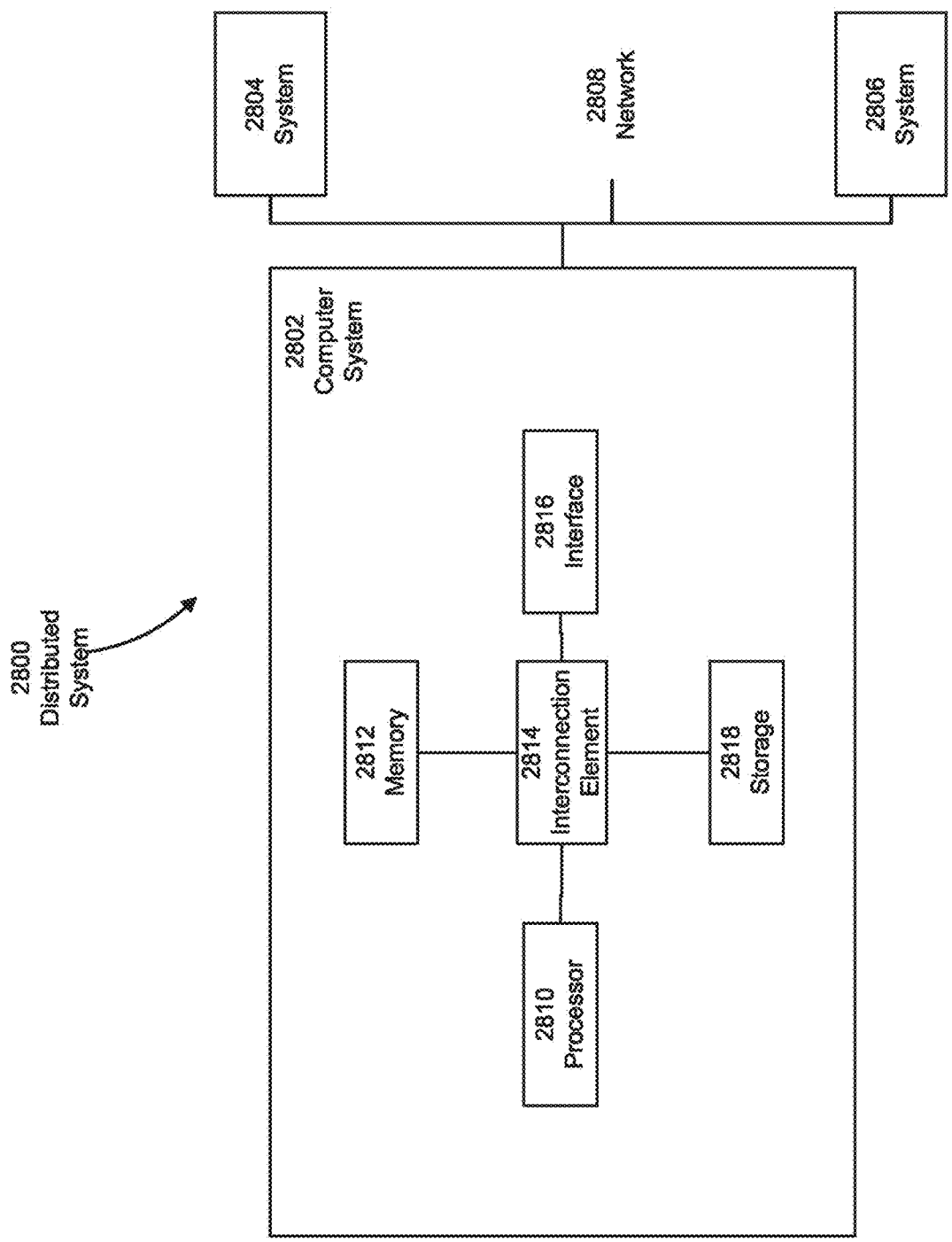
FIG. 28 is a schematic diagram of distributed computer system configured to execute aspects and embodiments disclosed herein.
Figure 29:
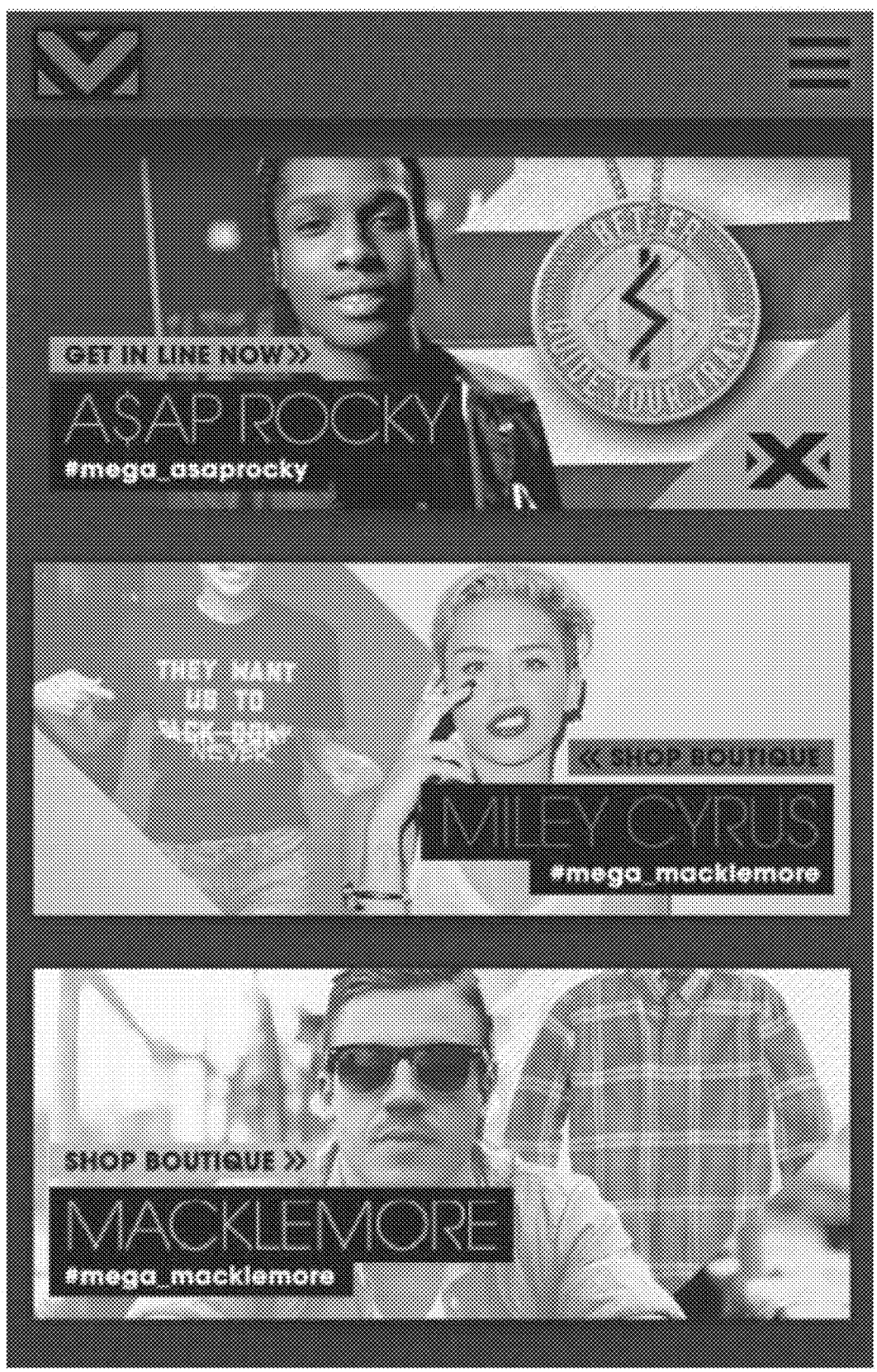
FIG. 29 is one example of user interface for a home screen of a mobile device.

Referring to FIG. 28, there is illustrated a block diagram of a distributed computer system 2800, in which various aspects and functions are practiced. As shown, the distributed computer system 2800 includes one more computer systems that exchange information. More specifically, the distributed computer system 2800 includes computer systems 2802, 2804 and 2806. As shown, the computer systems 2802, 2804 and 2806 are interconnected by, and may exchange data through, a communication network 2808. The network 2808 may include any communication network through which computer systems may exchange data. To exchange data using the network 2808, the computer systems 2802, 2804 and 2806 and the network 2808 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 2802, 2804 and 2806 may transmit data via the network 2808 using a variety of security measures including, for example, TLS, SSL or VPN. While the distributed computer system 2800 illustrates three networked computer systems, the distributed computer system 2800 is not so limited and may include any number of computer systems and computing devices, networked using any medium and communication protocol.

As illustrated in FIG. 28, the computer system 2802 includes a processor 2810, a memory 2812, an interconnection element 2814, an interface 2816 and data storage element 2818. To implement at least some of the aspects, functions and processes disclosed herein, the processor 2810 performs a series of instructions that result in manipulated data. The processor 2810 may be any type of processor, multiprocessor or controller. Some example processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 2810 is connected to other system components, including one or more memory devices 2812, by the interconnection element 2814.

The memory 2812 stores programs and data during operation of the computer system 2802. Thus, the memory 2812 may be a relatively high performance, volatile, random access memory such as a dynamic random access memory ("DRAM") or static memory ("SRAM"). However, the memory 2812 may include any device for storing data, such as a disk drive or other nonvolatile storage device. Various examples may organize the memory 2812 into particularized and, in some cases, unique structures to perform the functions disclosed herein. These data structures may be sized and organized to store values for particular data and types of data.

Components of the computer system 2802 are coupled by an interconnection element such as the interconnection element 2814. The interconnection element 2814 may include one or more physical busses, for example, busses between components that are integrated within a same machine, but may include any communication coupling between system elements including specialized or standard computing bus technologies such as IDE, SCSI, PCI and InfiniBand. The interconnection element 2814 enables communications, such as data and instructions, to be exchanged between system components of the computer system 2802.

The computer system 2802 also includes one or more interface devices 2816 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 2802 to exchange information and to communicate with external entities, such as users and other systems.

The data storage element 2818 includes a computer readable and writeable nonvolatile, or non-transitory, data storage medium in which instructions are stored that define a program or other object that is executed by the processor 2810. The data storage element 2818 also may include information that is recorded, on or in, the medium, and that is processed by the processor 2810 during execution of the program. More specifically, the information may be stored in one or more data structures specifically configured to conserve storage space or increase data exchange performance. The instructions may be persistently stored as encoded signals, and the instructions may cause the processor 2810 to perform any of the functions described herein. The medium may, for example, be optical disk, magnetic disk or flash memory, among others. In operation, the processor 2810 or some other controller causes data to be read from the nonvolatile recording medium into another memory, such as the memory 2812, that allows for faster access to the information by the processor 2810 than does the storage medium included in the data storage element 2818. The memory may be located in the data storage element 2818 or in the memory 2812, however, the processor 2810 manipulates the data within the memory, and then copies the data to the storage medium associated with the data storage element 2818 after processing is completed. A variety of components may manage data movement between the storage medium and other memory elements and examples are not limited to particular data management components. Further, examples are not limited to a particular memory system or data storage system.

Although the computer system 2802 is shown by way of example as one type of computer system upon which various aspects and functions may be practiced, aspects and functions are not limited to being implemented on the computer system 2802 as shown in FIG. 28. Various aspects and functions may be practiced on one or more computers having a different architectures or components than that shown in FIG. 28. For instance, the computer system 2802 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 2802 may be a computer system including an operating system that manages at least a portion of the hardware elements included in the computer system 2802. In some examples, a processor or controller, such as the processor 2810, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 2810 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C #(C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system comprising:

memory;

at least one processor coupled to the memory; and a virtual line simulator executable by the at least one processor and configured to:

output, to a display device, a first graphical user interface displaying a virtual line, an indication of a first position of a user in the virtual line, and a plurality of selectable icons, each of the selectable icons associated with a different user activity;

receive, via the display device and the first graphical user interface, a user input selecting a first selectable icon of the plurality of selectable icons;

determine that the user has completed a peer-to-peer activity associated with the first selectable icon by:

outputting, to the display device, a second graphical user interface comprising a first prompt for data associated with a second user in the virtual line; and receiving, via the second graphical user interface, the data;

in response to determining that the user has completed the peer-to-peer activity associated with the first selectable icon, determine a new position in the virtual line for the user;

in response to determining that the data identifies the second user in the virtual line, determine an updated position for the second user in the virtual line; and transmit, to a second computing device associated with the second user, a notification of the updated position for the second user in the virtual line.

2. The system according to claim 1, wherein the virtual line simulator is further configured to:

add the indication of the first position in the virtual line in response to determining that the user is within a range of a geographic location.

3. The system according to claim 2, wherein the virtual line simulator is further configured to:
receive an image of a physical identifier within a physical context; and
display virtual content in place of an image of the physical context.

4. The system according to claim 1, wherein the virtual line simulator is further configured to:
offer a reward to users in a top predetermined percentage of the virtual line, the reward having a duration limited to a predetermined period of time.

5. The system according to claim 4, wherein the virtual line simulator is further configured to:
rescind the reward when the reward is not redeemed within the predetermined period of time.

6. The system according to claim 1, wherein the virtual line simulator is further configured to:
receive data indicating that the user has found a hidden spot; and
offer a reward to the user.

7. The system according to claim 1, wherein the virtual line simulator is further configured to:
receive at least one interaction from the user addressed to at least one other user within the virtual line; and
forward the at least one interaction to a device associated with the at least one other user.

8. The system according to claim 1, wherein the virtual line simulator is further configured to:
add the indication of the first position of the virtual line in response to receiving data indicating that the user completed at least one other activity.

9. The system according to claim 1, wherein the virtual line simulator is further configured to:
receive a swipe on a user's avatar; and
display a user's spot number in the virtual line responsive to receiving the swipe.

10. The system according to claim 1, wherein the virtual line simulator is further configured to:
associate a reward with the user in response to the data indicating that the user completed the activity.

11. A method comprising:
outputting, to a display device of a computing device, a first graphical user interface displaying a virtual line, an indication of a first position of a user in the virtual line, and a plurality of selectable icons, each of the selectable icons associated with a different user activity;
receiving, via the display device of the computing device and the first graphical user interface, a first user input selecting a first selectable icon of the plurality of selectable icons;
determining that the user has completed a first peer-to-peer activity associated with the first selectable icon by:
outputting, to the display device, a second graphical user interface comprising a first prompt for data associated with a second user in the virtual line; and
receiving, via the second graphical user interface, the data;
determining, by the computing device and in response to determining that the user has completed the first user activity associated with the first selectable icon, a new position in the virtual line for the user;
in response to determining that the data identifies the second user in the virtual line, determining an updated position for the second user in the virtual line; and
transmitting, to a second computing device associated with the second user, a notification of the updated position for the second user in the virtual line.

12. The method according to claim 11, further comprising:
determining that the user is within a range of an event of geo-targeted product;
receiving an image of a visual identifier; and
displaying virtual content in a physical space of the visual identifier.

13. The method according to claim 11, further comprising:
offering, for a predetermined period of time, a reward to users in a top predetermined percentage of the virtual line; and
rescinding the offer when the offer is not redeemed within the predetermined period of time.

14. The method according to claim 11, further comprising: allowing the user to interact with other users from different parts of the virtual line while staying in the first position.

15. The method according to claim 11, further comprising: adding at least one identifier of at least one user to a waitlist in response to the virtual line being full.

16. The method according to claim 11, wherein an identifier of the user is received from at least one of Facebook, Twitter, Google+, and an email account.

17. The method according to claim 11, further comprising: associating a reward with the user in response to the data indicating that the user completed the activity.

18. A non-transitory computer readable medium having stored thereon computer-executable instructions that instruct at least one processor to:
output, to a display device, a first graphical user interface displaying a virtual line, an indication of a first position of a user in the virtual line, and a plurality of selectable icons, each of the selectable icons associated with a different user activity;
receive, via the display device and the first graphical user interface, a user input selecting a first selectable icon of the plurality of selectable icons;
determine that the user has completed a peer-to-peer activity associated with the first selectable icon by:
outputting, to the display device, a second graphical user interface comprising a first prompt for data associated with a second user in the virtual line; and
receiving, via the second graphical user interface, the data;
in response to determining that the user has completed the peer-to-peer activity associated with the first selectable icon, determine a new position in the virtual line for the user;
in response to determining that the data identifies a second user in the virtual line, determine an updated position for the second user in the virtual line; and
transmit, to a second computing device associated with the second user, a notification of the updated position for the second user in the virtual line.

19. The non-transitory computer readable medium according to claim 18, further comprising instructions that instruct the at least one processor to:
determine that the user is within a range of an event of geo-targeted product;
receive an image of a visual identifier; and display virtual content in a physical space of the visual identifier.

20. The non-transitory computer readable medium according to claim 18, further comprising instructions that instruct the at least one processor to:

offer, for a predetermined period of time, a reward to users in a top predetermined percentage of the virtual line; and rescind the offer if the offer is not redeemed within the predetermined period of time.

* * * * *